(12) United States Patent
Kondo

(10) Patent No.: US 6,970,508 B1
(45) Date of Patent: *Nov. 29, 2005

(54) IMAGE CODING AND DECODING USING MAPPING COEFFICIENTS CORRESPONDING TO CLASS INFORMATION OF PIXEL BLOCKS

(75) Inventor: Tetsujiro Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/607,205

(22) Filed: Jun. 29, 2000

Related U.S. Application Data

(62) Division of application No. 08/892,570, filed on Jul. 15, 1997, now Pat. No. 6,198,770.

(30) Foreign Application Priority Data

Jul. 17, 1996 (JP) .............................. P08-206555

(51) Int. Cl.[7] .............................................. H04N 7/12
(52) U.S. Cl. ............................................. 375/240.14
(58) Field of Search .................... 348/397.1, 399.1, 348/409.1, 410.1, 411.1, 412.1, 420.1, 421.1, 348/424.1, 445; 375/240.01, 240.12–240.16, 375/240.21, 240.24, 240.25; H04N 7/24, H04N 7/12

(56) References Cited

U.S. PATENT DOCUMENTS

| 4,703,352 | A | 10/1987 | Kondo | 358/135 |
|---|---|---|---|---|
| 5,020,120 | A | 5/1991 | Weldy | 382/56 |
| 5,122,873 | A | 6/1992 | Golin | 358/133 |
| 5,193,003 | A | 3/1993 | Kondo | 358/136 |
| 5,200,962 | A | 4/1993 | Kao et al. | 371/41 |
| 5,293,230 | A | 3/1994 | Golin | 348/410 |
| 5,331,414 | A | 7/1994 | Golin | 348/390 |
| 5,349,385 | A | 9/1994 | Glenn | 348/458 |
| 5,384,869 | A | 1/1995 | Wilkinson | 382/56 |
| 5,469,216 | A | 11/1995 | Takahashi et al. | 348/441 |
| 5,487,119 | A | 1/1996 | Kimura et al. | 382/239 |
| 5,488,618 | A | 1/1996 | Kondo et al. | 371/67.1 |
| 5,495,297 | A | 2/1996 | Fujimori et al. | 348/590 |
| 5,504,535 | A | 4/1996 | Abe | 348/565 |
| 5,517,245 | A | 5/1996 | Kondo et al. | 348/392 |

(Continued)

FOREIGN PATENT DOCUMENTS

EP  0 293 041 A1  11/1988  ............ H04N 7/13

(Continued)

OTHER PUBLICATIONS

& JP 07 147681 A (Sony Corp), Jun. 6, 1995 *Abstract*.

(Continued)

*Primary Examiner*—Richard Lee
(74) *Attorney, Agent, or Firm*—Bell, Boyd & Lloyd LLC

(57) ABSTRACT

It is possible to produce a decoded image with a high image quality from data of the lowermost hierarchy obtained during hierarchical coding operation. An image of a first hierarchy equal to an original image is successively thinned in thinning units so that an image of a second hierarchy and an image of a third hierarchy are formed. Then, in an optimum correction data calculating unit, the image of the second hierarchy is corrected, a prediction value of the image of the first hierarchy is predicted from the resultant correction data, and correction data of the image of the second hierarchy is generated to reduce a prediction error of the prediction value lower than a preselected threshold. In another optimum correction data calculating unit, correction data of the image of the third hierarchy is similarly obtained.

45 Claims, 48 Drawing Sheets

U.S. PATENT DOCUMENTS

| | | | | |
|---|---|---|---|---|
| 5,517,588 A | * | 5/1996 | Kondo | 348/445 |
| 5,528,606 A | | 6/1996 | Kondo et al. | 371/37.4 |
| 5,553,160 A | | 9/1996 | Dawson | 382/166 |
| 5,598,214 A | | 1/1997 | Kondo et al. | 348/414 |
| 5,610,658 A | | 3/1997 | Uchida et al. | 348/416 |
| 5,625,712 A | | 4/1997 | Schoenzeit et al. | 382/232 |
| 5,663,764 A | | 9/1997 | Kondo et al. | 348/414 |
| 5,666,164 A | | 9/1997 | Kondo et al. | 348/441 |
| 5,680,225 A | | 10/1997 | Hirabayashi et al. | 358/451 |
| 5,687,257 A | | 11/1997 | Paik et al. | 382/239 |
| 5,734,433 A | | 3/1998 | Kondo et al. | 348/421 |
| 5,739,873 A | | 4/1998 | Kondo | 348/720 |
| 5,754,702 A | | 5/1998 | Simpson | 382/240 |
| 5,796,442 A | | 8/1998 | Gove et al. | 348/556 |
| 5,812,699 A | | 9/1998 | Zhu et al. | 382/232 |
| 5,825,313 A | | 10/1998 | Kondo et al. | 341/67 |
| 5,859,667 A | * | 1/1999 | Kondo et al. | 375/240.21 |
| 5,867,593 A | | 2/1999 | Fukuda et al. | 382/176 |
| 5,870,434 A | | 2/1999 | Kondo et al. | 375/242 |
| 5,880,784 A | | 3/1999 | Lillevold | 348/404 |
| 5,912,708 A | | 6/1999 | Kondo et al. | 348/415 |
| 5,930,394 A | | 7/1999 | Kondo et al. | 382/232 |
| 5,960,116 A | | 9/1999 | Kajiwara | 382/238 |
| 5,966,179 A | | 10/1999 | Kondo et al. | 348/408 |
| 5,969,764 A | | 10/1999 | Sun et al. | 348/404 |
| 6,016,164 A | | 1/2000 | Kawaguchi et al. | 348/424 |
| 6,192,076 B1 | * | 2/2001 | Kondo | 375/240.12 |
| 6,198,770 B1 | * | 3/2001 | Kondo | 375/240.14 |
| 6,292,591 B1 | * | 9/2001 | Kondo | 375/240.12 |

FOREIGN PATENT DOCUMENTS

| | | | |
|---|---|---|---|
| EP | 0 571 180 A2 | 5/1993 | |
| EP | 0 546 845 A2 | 6/1993 | H04N 7/01 |
| EP | 0 635 978 A1 | 9/1993 | |
| EP | 0 571 180 A2 | 11/1993 | H04N 7/137 |
| EP | 0 635 978 A1 | 1/1995 | H04N 7/01 |
| EP | 07147681 | 6/1995 | |
| JP | 3-53778 | 3/1991 | H04N 7/13 |
| WO | WO 91/20159 | 12/1991 | H04N 7/13 |
| WO | WO 92/07445 | 4/1992 | H04N 7/13 |
| WO | WO 93/13624 | 7/1993 | H04N 7/13 |

OTHER PUBLICATIONS

Chang et al., "Adaptive Subsampling JPEG Image Coding," Proceeding of the 1995 IEEE International Conference on Consumer Electronics, Jun. 1995, pp. 264-265.
U.S. Appl. No. 08/893,022, filed Jul. 15, 1997.
U.S. Appl. No. 08/893,134, filed Jul. 15, 1997.
U.S. Appl. No. 08/893,202, filed Jul. 15, 1997.
U.S. Appl. No. 08/893,216, filed Jul. 15, 1997.
U.S. Appl. No. 09/213,460, filed Dec. 17, 1998.

* cited by examiner

IMAGE CODING AND DECODING USING MAPPING COEFFICIENTS CORRESPONDING TO CLASS INFORMATION OF PIXEL BLOCKS

This is a divisional of application Ser. No. 08/892,570, filed Jul. 15, 1997 now U.S. Pat. No. 6,198,770.

BACKGROUND OF THE INVENTION

1. Field of the Invention

The present invention relates to an image coding apparatus and image coding method, image decoding apparatus, recording medium and image processing apparatus and image transmitting method, and more particularly relates to the image coding apparatus and image coding method, image decoding apparatus, recording medium and image processing apparatus and image transmitting method capable of thinning-out (subsampling) and compression encoding an image in such a manner that a decoded image is almost identical to a source image.

2. Description of the Related Art

Conventionally, various methods have been proposed as methods for compressing images. One such method employs the original image data (i.e., the image to be encoded) as an image of a "first hierarchy" (uppermost hierarchy). An image of a second hierarchy and an image of a third hierarchy are formed by reducing the number of pixels (i.e., resolution is successively lowered).

In accordance with a conventional hierarchical coding system, images of plural hierarchies are transmitted from a transmitting device to a receiving device. At the receiving device, images of the respective hierarchies may be displayed (e.g., on a monitor) in response to each of these images of the plural hierarchies.

Moreover, in accordance with a conventional hierarchical decoding system, an error correction process operation is carried out for data about the image in the lowermost hierarchy (namely, the image with the lowest resolution) but not for the images of the other higher hierarchies. As a result, when an error happens to occur, no error correction can be made as to the images of the hierarchies other than the lowermost hierarchy. As a result, under any error condition, only the data of the image of the lowermost hierarchy can be acquired and corrected. Images of the hierarchies higher than the lowermost hierarchy do not have data for error recovery and,t thus, may be obtained only by way of, for example, an interpolation process operation from the data about the image of the lowermost hierarchy on the receiver end. Therefore, the robustness characteristic with respect to the error can be improved in accordance with the hierarchical coding system.

FIG. 36 illustrates one example of a conventional image coding apparatus for performing the above-described hierarchical coding operation. Image data to be coded is supplied as data of a first hierarchy (uppermost hierarchy) to a thinning (i.e., sub-sampling) unit 11 and a signal processing unit 501.

In the thinning unit 11, the pixel quantity of the image data of the first hierarchy is thinned, so that image data of a second hierarchy (lower than the first hierarchy by one hierarchy) is formed, and the formed image data is supplied to a thinning unit 12 and the signal processing unit 501. In the thinning unit 12, the pixel quantity of the image data of the second hierarchy is thinned, so that image data of a third hierarchy (further lower than the second hierarchy by one hierarchy) is formed, and this image data is supplied to the signal processing unit 501.

In the signal processing unit 501, an error correction process and other necessary signal processing operations are carried out with respect to the image data of the first hierarchy, the second hierarchy and the third hierarchy. Thereafter, the signal processed image data are multiplexed and the multiplexed image data is outputted as the coded data. It should be noted that in the signal processing unit 501, the image data of the third hierarchy is processed by executing the stronger error correction than that of the data of other hierarchies.

FIG. 37 illustrates an example embodiment of a conventional image decoding apparatus for hierarchically decoding the coded data outputted from the image coding apparatus of FIG. 36.

In a signal processing unit 601, the coded data is separated into the coded image data of the first hierarchy, the second hierarchy and the third hierarchy. In addition, the signal processing unit 601, the error correction process and other necessary process operations are carried out with respect to the separated image data. The image data of the first hierarchy is directly outputted as a decoded image of a first hierarchy. The image data of the second hierarchy is supplied to an interpolating unit 602. The interpolating unit 602 executes the interpolating process with respect to the image data of the second hierarchy so as to produce image data having the same pixel number as that of the image data of the first hierarchy (higher than that of the second hierarchy by one hierarchy). Then, this produced image data is outputted as a decoded image of a first hierarchy.

The image data of the third hierarchy is supplied to another interpolating unit 603. The interpolating unit 603 executes the interpolating process operation for the image data of the third hierarchy to thereby produce image data of the same pixel number as that of the image data of the second hierarchy (higher than this third hierarchy by one hierarchy), namely a decoded image of a second hierarchy. The decoded image of the second hierarchy is outputted to another interpolating unit 604. The interpolating unit 604 executes a similar interpolation process to that of the interpolating unit 602 on the output of the interpolating unit 603, so that image data having the same pixel number as that of the image data of the first hierarchy (further higher than the second hierarchy by one hierarchy) is produced, and then this image data is outputted as a decoded image of the first hierarchy.

As a result, even when the image data of the first hierarchy could not be obtained for some reason, the decoded image of the first hierarchy may be obtained from the image data of the second hierarchy in the image decoding apparatus. Similarly, even when the image data of the first hierarchy and the image data of the second hierarchy could not be obtained due to same reasons, it is possible to obtain the decoded images of the first hierarchy and the second hierarchy from the image data of the third hierarchy.

However, the image quality of the decoded image of the upper hierarchy, being interpolated from the image(s) of the lower hierarchies, is considerably deteriorated.

It would be desirable to provide a system capable of obtaining a decoded image with a high image quality even if only obtained from coded data of a lowermost hierarchy.

SUMMARY

An image coding apparatus and/or method in accordance with an embodiment of the invention corrects the image data of the second hierarchy to output correction data. A prediction value of the image data of the first hierarchy is predicted from the correction data. A prediction error of the prediction value is calculated with respect to the image data of the first hierarchy, a correction of the correction data outputted from the correcting means is judged based upon the prediction error. As a consequence, it is possible to obtain a decoded image with the high image quality from the correctly judged correction data on the decoded side.

In accordance with other embodiments of an image coding apparatus and method in accordance with the invention, the image data of the first hierarchy is a predetermined block, the block is classified into predetermined classes in accordance with a nature thereof, and the image data of the second hierarchy is calculated whose pixel number is smaller than that of the image data of the first hierarchy by executing a predetermined calculation by employing pixel values of pixels for constituting the block. The mapping coefficient is determined that corresponds to the class of this block. As a consequence, it is possible to produce the decoded image with the high image quality from the image data of the second hierarchy on the decoding side.

The invention also includes a recording medium having data recorded thereon so encoded. For example, a recording medium in accordance with an embodiment of the has recorded thereon coded data containing at least image data of a second hierarchy whose pixel number is smaller than that of image data of a first hierarchy. The coded data is produced by correcting image data of the second hierarchy to output correction data. A prediction value of the image data of the first hierarchy is predicted from the correction data. A prediction error of the prediction value is calculated with respect to the image data of the first hierarchy, a correction of the correction data outputted from the correcting means is judged based upon the prediction error. Accordingly, it is possible to produce the decoded image with the high image quality from this coded data.

An image decoding apparatus and/or method in accordance with an embodiment of the invention decodes the image of the first hierarchy based upon coded data containing at least such correction data produced by correcting image data of a second hierarchy whose pixel number is smaller than that of image data of a first hierarchy, and by being judged as correct data based upon a prediction error of a prediction value of the image data of the first hierarchy predicted from this correction data.

These and other aspects of the invention will become apparent when considered with reference to the following description and the accompanying drawings.

DETAILED DESCRIPTION

In order to clarify the corresponding relationship between each of the means of the various embodiments described herein, certain characteristics of the present invention are first briefly described with reference to the Figures. It is to be understood that the term "unit" is to be interpreted in its broadest sense, including a hard-wired unit, a main frame computer loaded with appropriate software, a programmed microprocessor or microcontroller, or a combination of these.

Figure 1:
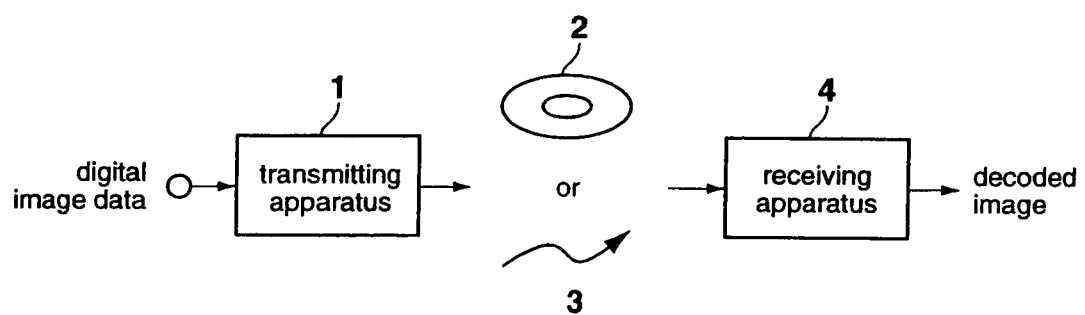
FIG. 1 is a block diagram for indicating an arrangement of an image processing system according to an embodiment of the present invention.

FIG. 1 illustrates an embodiment of an image processing system in accordance with the present invention. Digital image data is supplied to a transmitting apparatus 1. The transmitting apparatus 1 hierarchically codes the input image data to obtain coded image data, and records this coded data on a recording medium 2 such as a optical disk, a magneto-optical disk, a magnetic tape, and other recording media. Otherwise (or in addition), the coded data is transmitted via a transmission path 3 such as ground waves, a satellite line, a telephone line, a CATV network, and other paths.

In a receiver apparatus 4, the coded data which has been recorded on the recording medium 2 is reproduced, or the coded data which has been transmitted via the transmission path 3 is received, and this coded data is hierarchically decoded to obtain a decoded image which is supplied to a display (not shown).

It should also be noted that the above-described image processing system may be applied to image recording/reproducing apparatuses, for instance, an optical disk apparatus, a magneto-optical disk apparatus, a magnetic tape apparatus, and the like. Alternatively, this image processing system may be applied to image transferring apparatuses, for example, a television-telephone apparatus, a television broadcasting system, a CATV system and the like. Also, since a data amount of coded data outputted from the transmitting apparatus 1 is relatively small, the image processing system of FIG. 1 may be applied to, for example, a portable telephone, and other portable terminal.

Figure 2:
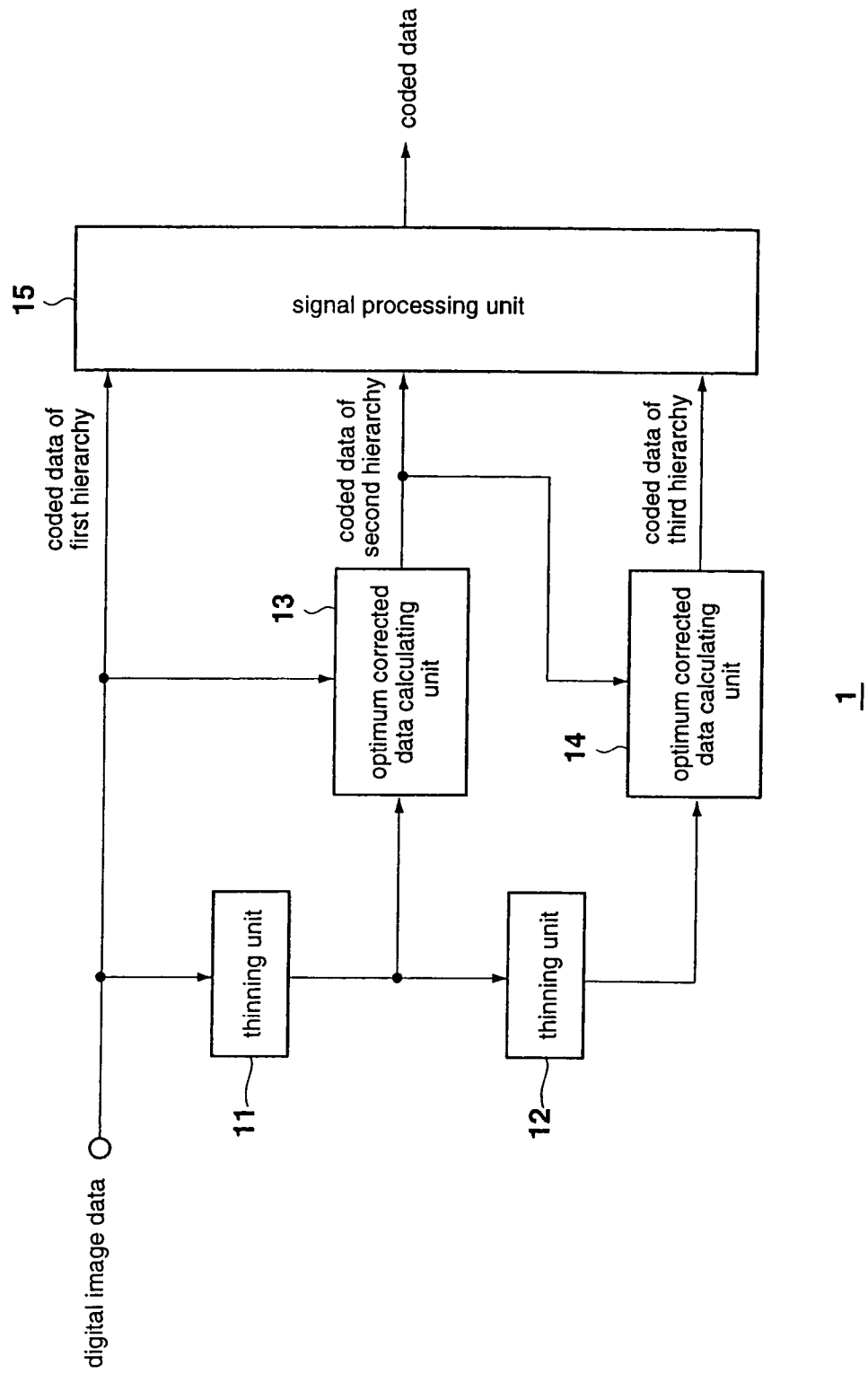
FIG. 2 is a block diagram for representing an arrangement of the transmitter apparatus of FIG. 1 according to a first embodiment.

FIG. 2 shows an example of an arrangement of the above-described transmitter apparatus 1.

Figure 3:
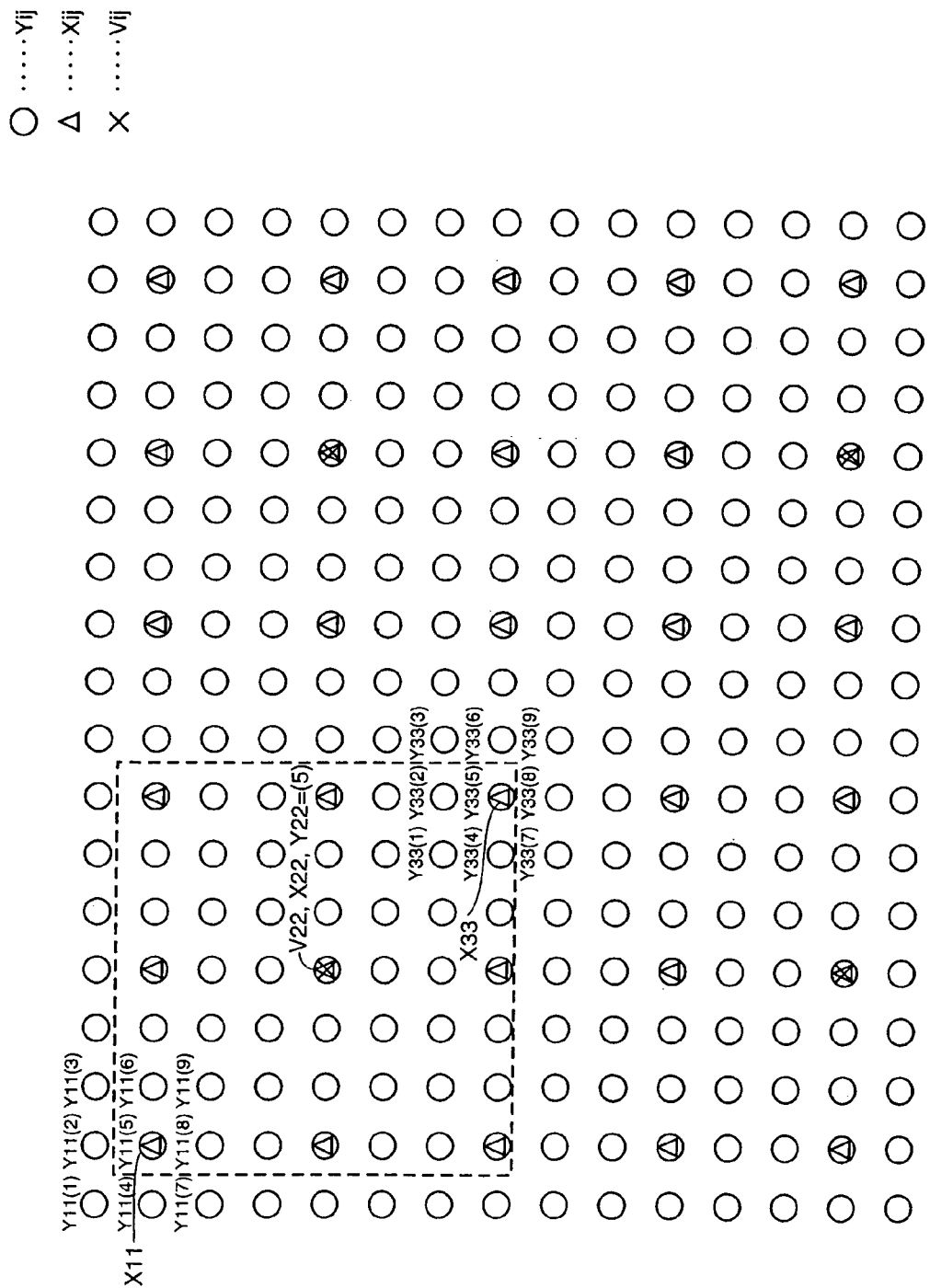
FIG. 3 is a diagram for explaining process operations of the thinning units 11 and 12 of FIG. 2.

The digital images data to be coded (i.e., the image data of the first, or uppermost, hierarchy) is directly supplied as the decoded data of the first hierarchy to the signal processing unit 15. The image data of the first hierarchy is also supplied to a thinning unit 11 and to an optimum correction data calculating unit 13. In the thinning unit 11, the pixel number of the image data of the first hierarchy is thinned, so that image data of a second hierarchy (lower than that of the first hierarchy by one hierarchy) is formed. In other words, for example, as shown in FIG. 3, in the thinning unit 11, the image data of the first hierarchy (in this drawing, a portion indicated by symbol "◉") is simply thinned (e.g., sub-sampled) by ⅑ (being thinned by ⅓ in both transverse direction and longitudinal direction). As a result, the image of the second hierarchy (in this drawing, a portion indicated by symbol "○") is formed. This image data of the second hierarchy is supplied to the thinning unit 12 and the optimum correction data calculating unit 13.

In the thinning unit 12, the pixel number of the image data of the second hierarchy is thinned, so that image data of a third hierarchy further lower than that of the second hierarchy by one hierarchy is formed. That is, in the thinning unit 12, for example, similar to the case in the thinning unit 11, the image data of the second hierarchy is simply thinned by ⅑, so that the image data of the third hierarchy indicated by symbol "X" in FIG. 3 is formed. This image data of the third hierarchy is supplied to another optimum correction data calculating unit 14.

Figure 4:
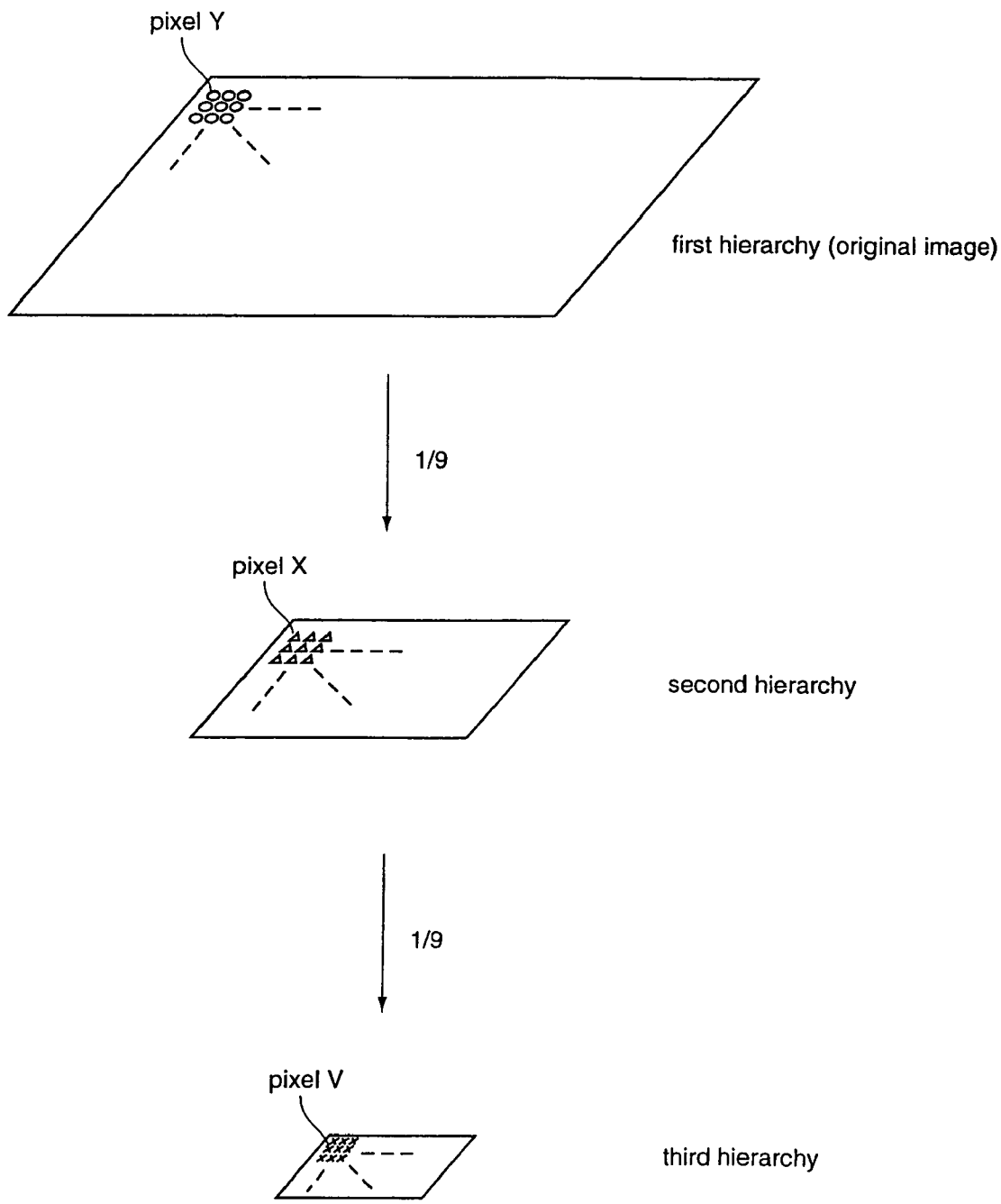
FIG. 4 is a diagram for explaining process operations of the thinning units 11 and 12 of FIG. 2.

As shown in FIG. 4, in the thinning units 11 and 12, both the image data of the second hierarchy and the image data of the third hierarchy are formed from the image data of the first hierarchy (namely, original image data) in the above-described manner.

The optimum correction data calculating unit 13 calculates optimum correction data (referred to herein as "optimum correction data of a second hierarchy") which is suitable to obtain a decoded image of a first hierarchy from the image data of the second hierarchy is calculated. This calculated optimum correction data is output as coded data of a second hierarchy to the signal processing unit 15. In the optimum correction data calculating unit 14, another optimum correction data (referred to herein as "optimum correction data of a third hierarchy") which is suitable to obtain optimum correction data outputted from this optimum correction data calculating unit 14 is calculated. This optimum correction data is supplied as coded data of a third hierarchy to the signal processing unit 15.

In this case, since the optimum correction data of the third hierarchy is suitable to obtain the optimum correction data of the second hierarchy, and also the optimum correction data of the second hierarchy is suitable to obtain the decoded image of the first hierarchy, the optimum correction data of the third hierarchy may be suitable to obtain the decoded image of the first hierarchy similar to the optimum correction data of the second hierarchy.

In the signal processing unit 15, a prediction coefficient (prediction coefficient of the first hierarchy, discussed later) is derived and the coded data of the second hierarchy includes the prediction coefficient of the first hierarchy. In addition, the coded data of the third hierarchy includes the prediction coefficient of the second hierarchy. Then, in the signal processing unit 15, an error correction process and other necessary signal processing operations are executed with respect to the coded data of the first hierarchy to the third hierarchy. Thereafter, the signal-processed coded data are multiplexed and then the multiplexed data is outputted as finally coded data. It should be understood that, as to the coded data of the third hierarchy (which is the lowermost hierarchy), the error correction process carried out is stronger than that for the coded data of other hierarchies.

The coded data which is outputted from the signal processing unit 15 in the above-described manner is recorded on the recording medium 2 and/or transferred through the transfer path 3.

As described above, the thinning operations are carried out at the same rate in both the thinning units 11 and 12. However, it is not required that the thinning rate of the thinning unit 11 be identical to that of the thinning unit 12.

Figure 5:
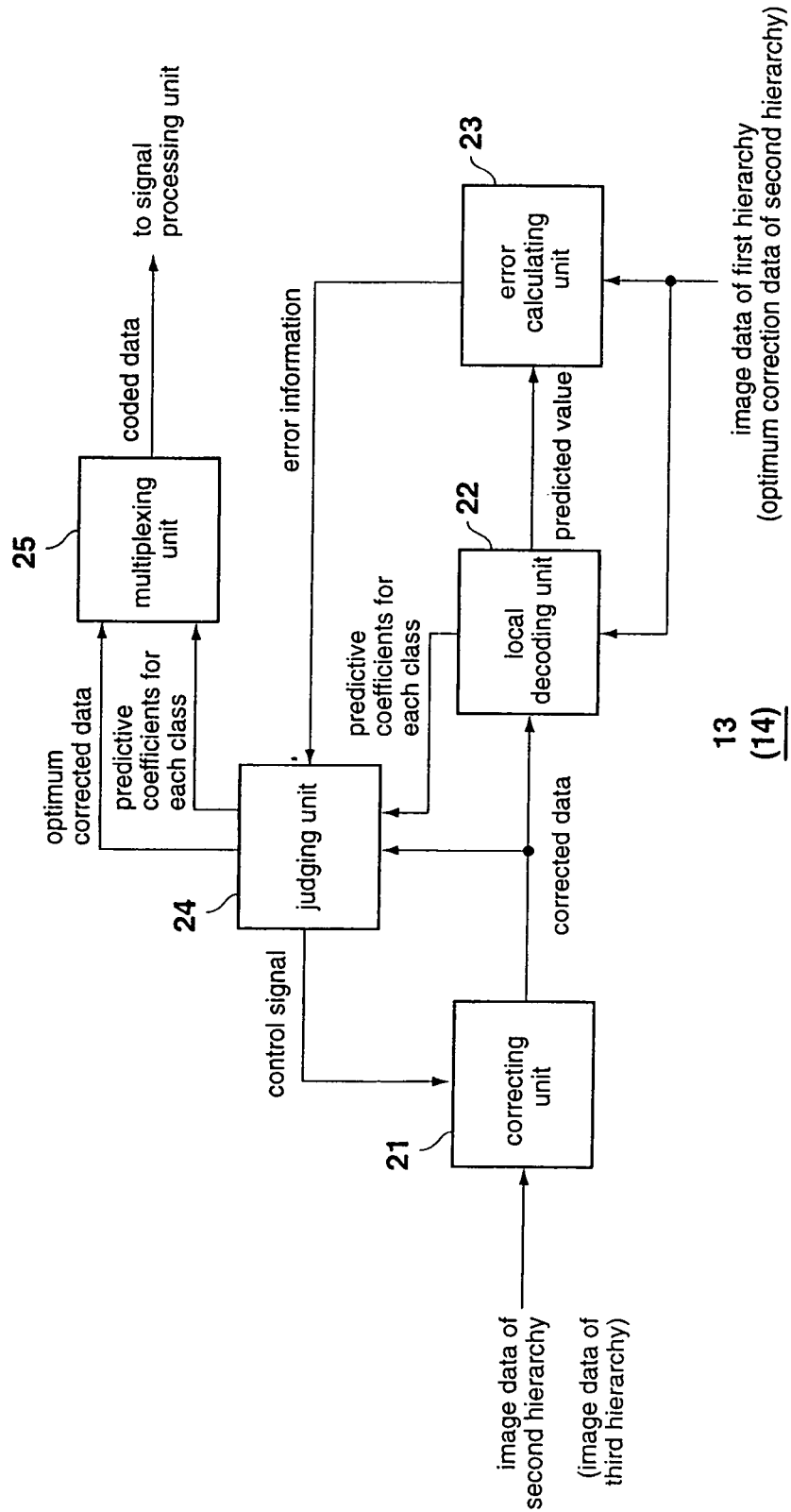
FIG. 5 is a block diagram for indicating a structural example of the optimum corrected data calculating unit 13 (14) of FIG. 2.

Next, FIG. 5 indicates an embodiment of an arrangement of the optimum correction data calculating unit 13 shown in FIG. 3. It should be noted that since the optimum correction data calculating unit 14 may be similarly arranged, the description thereof is omitted.

The image data of the second hierarchy derived from the thinning unit 11 is supplied to a correcting unit 21, and the image data of the first hierarchy is supplied to a local decoding unit 22. Further, the image data of the first hierarchy is also supplied to an error calculating unit 23.

The correcting unit 21 corrects the image data of the second hierarchy in response to a control signal supplied from a judging unit 24. The correction data obtained from the correcting operation by the correcting unit 21 is supplied to the local decoding unit 22 and the judging unit 24.

The local decoding unit 22 predicts predicted values of a first hierarchy (higher than the second hierarchy by one hierarchy) based upon the corrected data outputted from the correcting unit 21, namely, the correction result of the image data of the second hierarchy. The term "predicted values" is meant to include a plurality of pixel values, where each pixel value corresponds to a pixel of the image data of the second hierarchy. The predicted values are supplied to the error calculating unit 23.

As will be described later in this specification, the local decoding unit 22 executes a process operation so as to obtain prediction coefficients for each class used to calculate the predicted value of the first hierarchy by way of the linear coupling with the correction data using image data of the first hierarchy and the correction data. Based upon these prediction coefficients, the local decoding unit 22 executes an adaptive process operation so as to obtain the predicted values of the first hierarchy. The resultant prediction coefficients for each class is also supplied to the judging unit 24.

The error calculating unit 23 calculates a prediction error of the predicted values derived from the local decoding unit 22 with respect to the image data (original image) of the first hierarchy. This prediction error is supplied as error information to the judging unit 24.

Based on the error information derived from the error calculating unit 23, the judging unit 24 judges whether the corrected data outputted from the correcting unit 21 is substantially equal to the coded result of the original image (namely, in this case, the image of first hierarchy). When the judging unit 24 judges that the corrected data outputted from the correcting unit 21 is not substantially equal to the coded result of the original image, the judging unit 24 controls the correcting unit 21 to further correct the image data of the second hierarchy, so that newly obtained corrected data is outputted from this correcting unit 21. Also, when the judging unit 24 judges that the corrected data outputted by the correcting unit 21 is substantially equal to the coded result of the original image, the corrected data supplied from the correcting unit 21 is furnished to a multiplexing unit 25 as optimum correction data (optimum correction data of second hierarchy). In addition, the prediction coefficients supplied from the local decoding unit 22 is supplied to the multiplexing unit 25.

The multiplexing unit 25 multiplexes the optimum correction data derived from the judging unit 24 with the prediction coefficients for each class, and then outputs the multiplexed result as coded data of the second hierarchy.

Figure 6:
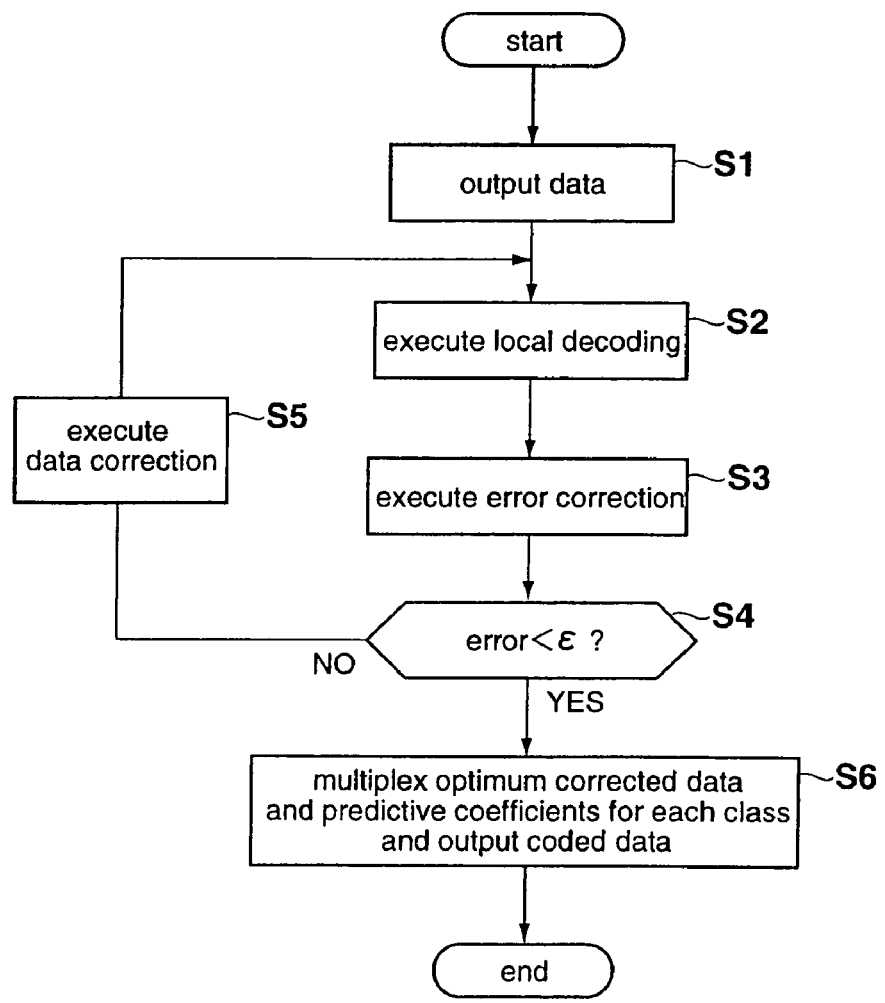
FIG. 6 is a flow chart for explaining process operation of the optimum corrected data calculating unit 13 of FIG. 5.

Referring now to the flow chart of FIG. 6, the operation of the optimum correction data calculating unit 13 is described. When the image data of the second hierarchy is supplied to the correcting unit 21, the correcting unit 21 first directly outputs the image data of the second hierarchy to the local decoding unit 22 and to the judging unit 24. At step S2, in the local decode unit 22, the corrected data derived from the correcting unit 21, namely, as previously explained, image data of second hierarchy is directly local-decoded.

In other words, at the step S2, the adaptive process operation for obtaining the prediction coefficients for each class is carried out on the image data of the first hierarchy, and using the corrected data, to calculate the predicted values of the first hierarchy (higher than the second hierarchy by one hierarchy) by way of the linear coupling with the corrected data derived from the correcting unit 21. Based upon the prediction coefficients, the predicted values are obtained and then supplied to the error calculating unit 23.

When the predicted values of the first hierarchy is received from the local decoding unit 22 by the error calculating unit 23, at step S3, the error calculating unit 23 calculates the prediction error of the predicted values derived from the local decoding unit 22 with respect to the image data of the first hierarchy, and supplies the prediction error as the error information to the judging unit 24. When the error information is received from the error calculating unit 23, the judging unit 24 judges at step S4 as to whether the corrected data outputted from the correcting unit 21 is substantially equal to the coded result of the image of the first hierarchy.

In other words, at step S4, a judgment is made as to whether the error information is smaller than a predetermined threshold value "ϵ". At step S4, when it is so judged that the error information is not smaller than the predetermined threshold value "ϵ", a recognition is made that the corrected data outputted from the correcting unit 21 is not substantially equal to the coded data of the image of the first hierarchy. Then, the process operation is advanced to step S5 at which the judging unit 24 controls the correcting unit 21 so as to correct the image data of the second hierarchy. The correcting unit 21 varies a correction amount (namely, correction value "Δ", which will be discussed later) under control of the judging unit 24 in order to correct the image data of the second hierarchy. The resultant corrected data is outputted to the local decoding unit 22 and the judging unit 24. Then, processing returns to the previous step S2, and a similar process operation is repeated.

On the other hand, at step S4, when it is so judged that the error information is smaller than the predetermined threshold value "ε", this indicates that the corrected data output from the correcting unit 21 is substantially equal to the coded result of the image of the first hierarchy. The judging unit 24 outputs the correction data when the error information smaller than, or equal to the predetermined threshold value "ε" as the optimum correction data in combination with the prediction coefficients for each class to the multiplexing unit 25. At step S6, the multiplexing unit 25 multiplexes the prediction coefficients for each class with the optimum correction data derived from the judging unit 24, and outputs the multiplexed result as the coded data of the second hierarchy. Then, the process operation is ended.

As previously explained, since the corrected data produced by correcting the image data of the second hierarchy under the condition that the error information becomes smaller than a preselected threshold value "ε" is used as the coded result of the image of the first hierarchy, it is possible to obtain from the coded image data of the second hierarchy an image substantially identical to the original image data (image data of first hierarchy) based on the corrected data (namely, optimum correction data) on the side of the receiver apparatus 4.

It should be noted that, as previously explained, the processing operation for obtaining the prediction coefficients for each class used to calculate the predicted values of the first hierarchy (higher than the second hierarchy by one hierarchy) by way of the linear coupling with the correction data is performed in the optimum correction data calculating unit 13 by employing the image data of the first hierarchy, whereas the adaptive processing operation is carried out by employing the optimum correction data outputted by the optimum correction data calculating unit 13. Alternatively, the optimum correction data calculating unit 14 may perform the adaptive process operation for the image data of the second hierarchy output from the thinning unit 11.

Figure 7:
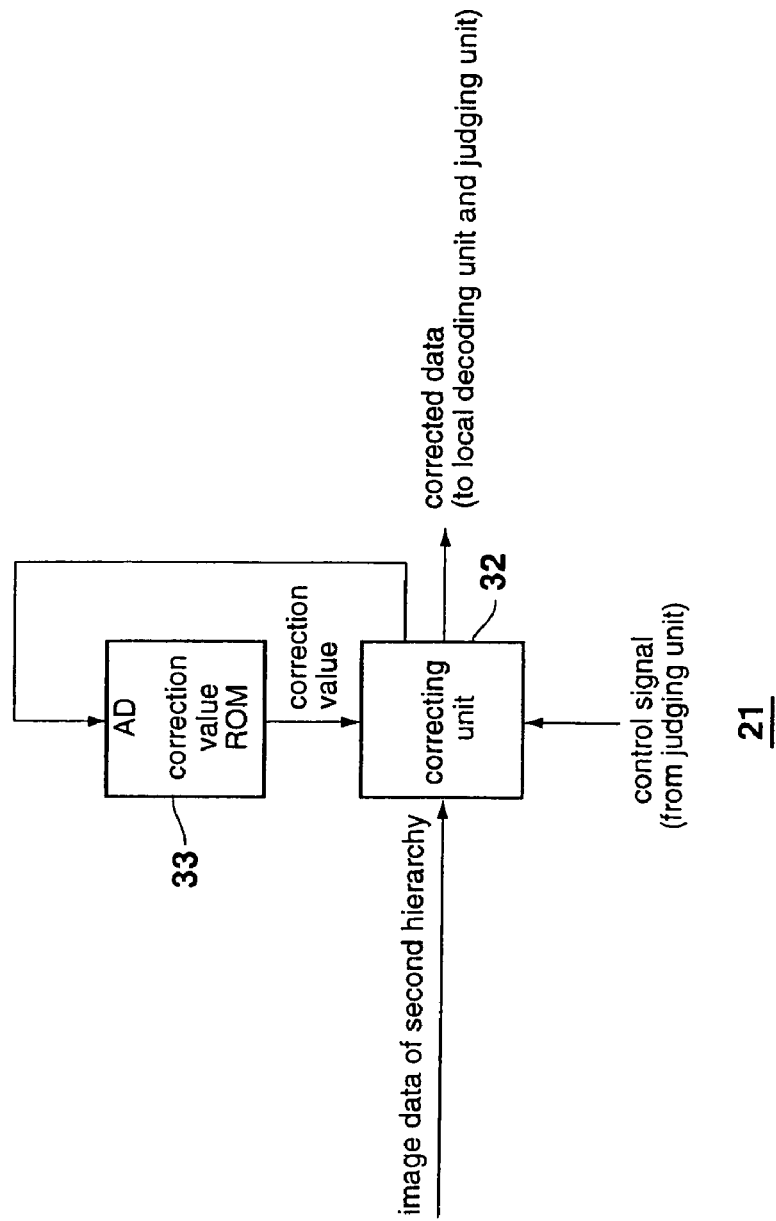
FIG. 7 is a block diagram for showing a structure example of the correcting unit 21 of FIG. 5.

Next, FIG. 7 indicates an example of an arrangement of the correcting unit 21 shown in FIG. 5.

The image data of the second hierarchy is supplied to a correcting unit 32. In response to a control signal provided from the judging unit 24 (FIG. 5), the correcting unit 32 supplies an address to a correction value ROM 33, so that the correction value "Δ" is read out from the ROM 33. Then, the correcting unit 32 produces the corrected data by, for example, adding the correction value Δ read from the correction value ROM 33 to the image data of the second hierarchy, and then supplies the produced corrected data to the local decoding unit 22 and the judging unit 24. The correction value ROM 33 stores therein combinations of various sorts of correction values Δ (for instance, a combination of corrected values for correcting image data of the second hierarchy for 1 frame) so as to correct the image data of the second hierarchy. A combination of correction values Δ corresponding to the address supplied from the correcting unit 32 is read from the correction value ROM 33 to be supplied to the correcting unit 32.

Figure 8:
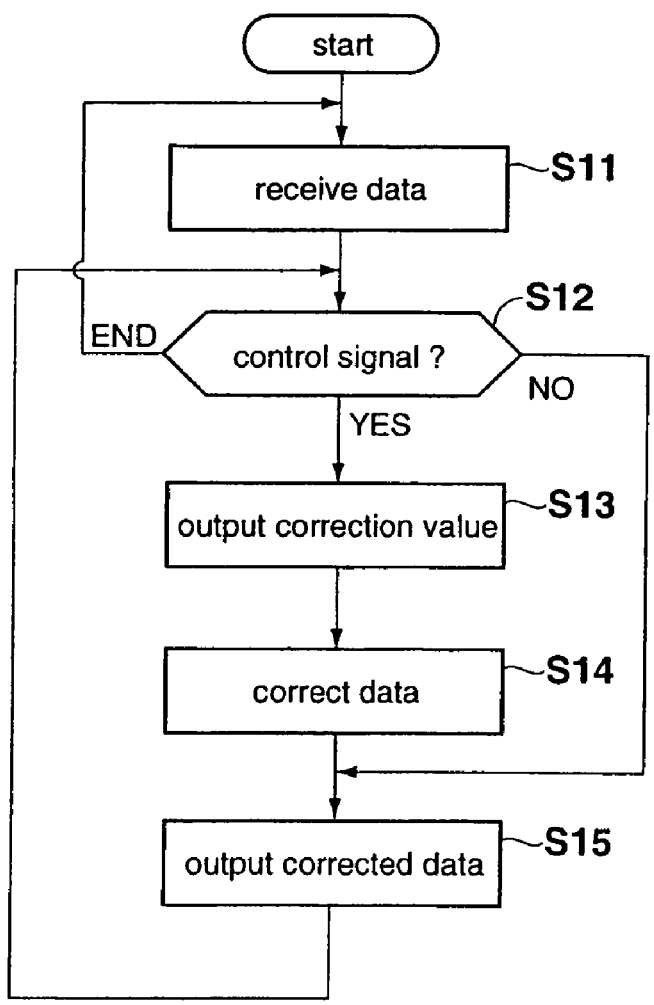
FIG. 8 is a flow chart for explaining operations of the correcting unit 21 of FIG. 7.

Referring now to FIG. 8, processing of the correcting unit 21 shown in FIG. 7 will be explained.

For example, when the image data of the second hierarchy for one frame is supplied to the correcting unit 32, the correcting unit 32 receives this image data of the second hierarchy at step S11, and at step S12, judges as to whether or not the control signal is received from the judging unit 24 (FIG. 5). At step S12, when it is so judged that the control signal is not received, the process operation skips over the steps S13 and S14, and continues at step S15, at which the correcting unit 32 directly outputs the image data of the second hierarchy as the corrected data to the local decoding unit 22 and the judging unit 24. Then, processing returns to the previous step S12.

In other words, as described above, the judging unit 24 controls the correcting unit 21 (correcting unit 32) based on the error information. Since the error information has not yet been acquired immediately after the image data of the second hierarchy is received by the correcting unit 32 (because the error information is not outputted from the error calculating unit 23), no control signal is outputted from the judging unit 24. As a result, just after the image data of the second hierarchy is received, the correcting unit 32 does not correct this image data of the second hierarchy but, rather, directly outputs this image data as the corrected data to the local decoding unit 22 and the judging unit 24.

On the other hand, when it is judged at step S12 that the control signal from the judging unit 24 is received, the correcting unit 32 outputs an address defined in accordance with the control signal to the correction value ROM 33 at step S13. As a result, at step S13, the combination (set) of the correction values Δ stored at the address is read at from the correction value ROM 33, and then is supplied to the correcting unit 32. Upon receipt of the combination of the correction value Δ read from the correction value ROM 33, the correcting unit 32 adds the corresponding correction values Δ to the respective image data of the second hierarchy for 1 frame, so that the corrected data produced by correcting the image data of the second hierarchy is calculated at step S14. Thereafter, the process operation is advanced to step S15, at which the correction data is output from the correcting unit 32 to the local decoding unit 22 and the judging unit 24, and processing returns to step S12.

As previously discussed, the correcting unit 21 repeatedly outputs the corrected data obtained by correcting the image data of the second hierarchy into the various values under control of the judging unit 24.

It should be noted that, when the coding operation as to one frame of the image is accomplished, the judging unit 24 supplies to the correcting unit 21 a control signal for indicating the completion of the coding operation. Upon receipt of this control signal in step S12, the correcting unit 21 finishes the processing operation with respect to an image of the present frame, and executes the process operation defined in the flow chart of FIG. 8 for the next frame of the image.

Figure 9:
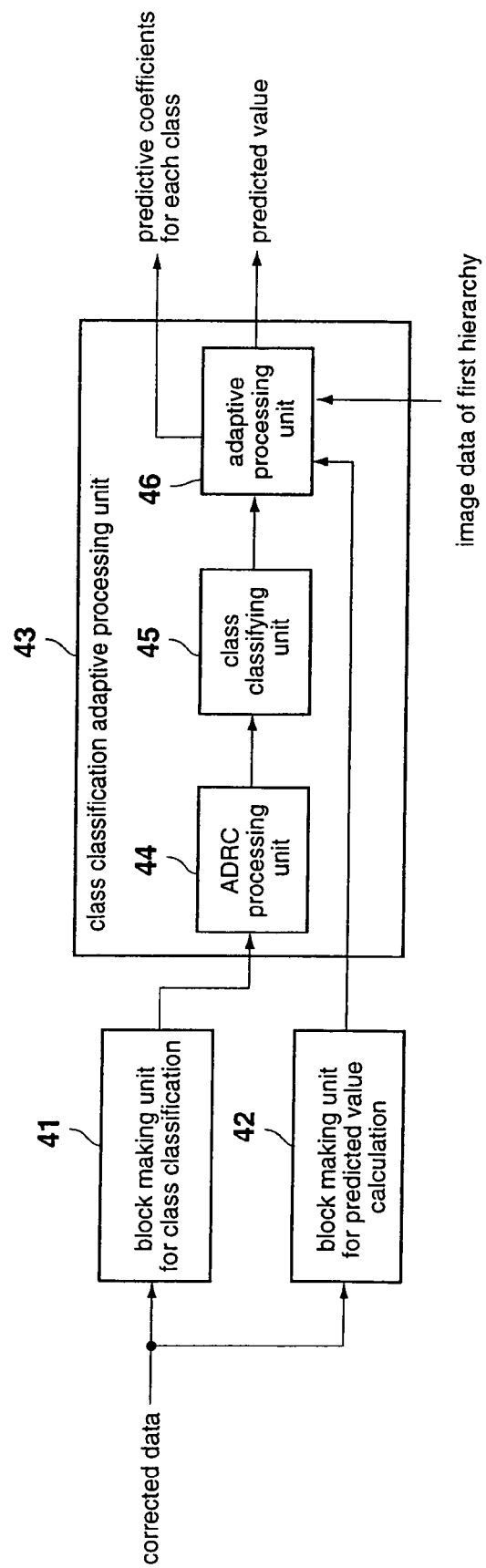
FIG. 9 is a block diagram for indicating a structural example of the local decoding unit 22 of FIG. 5.

Next, FIG. 9 illustrates an example embodiment of an arrangement of the local decode unit 22 shown in FIG. 5.

The corrected data derived from the correcting unit 21 is supplied to a block making unit for class classification 41 and a block making unit for predicted value calculation 42. The block making unit for class classification 41 makes class classifying blocks used centered about the noted corrected data to classify the corrected data into a preselected class, depending upon a nature thereof.

Figure 10:
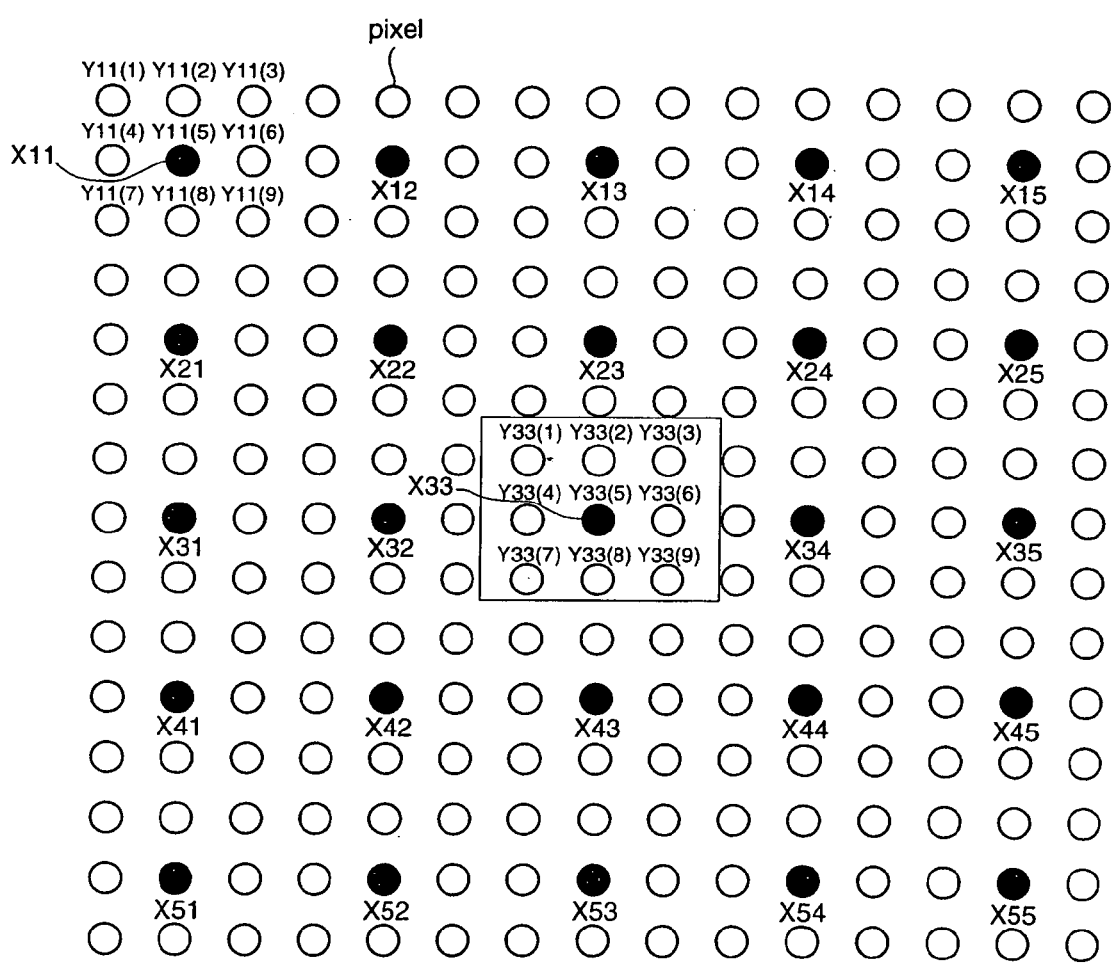
FIG. 10 is a diagram for explaining process operations of the class classifying block making unit 41 of FIG. 9.

For example, assuming now that in FIG. 10, while a pixel indicated by symbol "○" constitutes the image of the first hierarchy, and another pixel indicated by symbol "●" constitutes the image of the second hierarchy (corrected data), corrected data (otherwise, pixel) located at an i-th position from the upper position and at a j-th position from the left position is expressed as "$X_{ij}$", the block making unit for class classification 41 will generate a class classifying block having 9 pixels in total, namely, a pixel "$X_{ij}$" of interest and the following 8 pixels adjacent to this pixel of interest at upper left, upper, upper right, left, right, lower left, and lower right positions: $X_{(i-1)(j-1)}$, $X_{(i-1)j}$, $X_{(i-1)(j+1)}$, $X_{i(j-1)}$, $X_{i(j+1)}$, $X_{(i-1)(j-1)}$, $X_{(i-1)j}$, $X_{(i+1)(j+1)}$. The class classifying block is supplied to a class classification adaptive processing unit 43.

It should be noted that, in this case, the class classifying block is a regular square-shaped block having 3×3 pixels, but the shape of the class classifying block is not required to be such a regular square. Alternatively, other shapes, for example, a rectangular shape, a cross shape, and other arbitrary shapes may be employed. Also, a total number of the pixels for constituting the class classifying block is not limited to 9 pixels (=3×3 pixels).

The block making unit 42 for predicted value calculation processes the corrected data to make a predicted value calculating block, centered about the noted corrected data, used to calculate the predicted value of the image of the first hierarchy. In other words, in FIG. 10, assuming now that pixel values of 9 pixels (=3×3) in an original image data (in this case, image data of first hierarchy), while positioning the corrected data $X_{ij}$ (portion denoted by symbol "●" in FIG. 10) are expressed from the leftmost direction to the rightmost direction, and from the upper direction to the lower direction, by: $Y_{ij}(1)$, $Y_{ij}(2)$, $Y_{ij}(3)$, $Y_{ij}(4)$, $Y_{ij}(5)$, $Y_{ij}(6)$, $Y_{ij}(7)$, $Y_{ij}(8)$, $Y_{ij}(9)$, the block making unit 42 for the predicted value calculation constitutes a square-shaped prediction value calculating block in order to calculate predicted values of the pixels $Y_{ij}(1)$ through the pixel $Y_{ij}(9)$. This predicted value calculating block is arranged by, for example, the below-mentioned 25 pixels (=5×5), while a pixel $X_{ij}$ is set as a center: $X_{(i-2)(j-2)}$, $X_{(i-2)(j-1)}$, $X_{(i-2)j}$, $X_{(i-2)(j+1)}$, $X_{(i-2)(j+2)}$, $X_{(i-1)(j-2)}$, $X_{(i-1)(j-1)}$, $X_{(i-1)j}$, $X_{(i-1)(j+1)}$, $X_{(i-1)(j+2)}$, $X_{i(j-2)}$, $X_{i(j-1)}$, $X_{ij}$, $X_{i(j+1)}$, $X_{i(j+2)}$, $X_{(i+1)(j-2)}$, $X_{(i+1)(j-1)}$, $X_{(i+1)j}$, $X_{(i+1)(j+1)}$, $X_{(i+1)(j+2)}$, $X_{(i+2)(j-2)}$, $X_{(i+2)(j-1)}$, $X_{(i+2)j}$, $X_{(i+2)(j+1)}$, $X_{(i+2)(j+2)}$.

Referring to a concrete example using FIG. 10, to calculate the predicted values of the nine pixels Y33(1) to Y33(9) in the image data of the first hierarchy surrounded by a rectangular, the predicted value calculating block is constructed by the following corrected data: $X_{11}$, $X_{12}$, $X_{13}$, $X_{14}$, $X_{15}$, $X_{21}$, $X_{22}$, $X_{23}$, $X_{24}$, $X_{25}$, $X_{31}$, $X_{32}$, $X_{33}$, $X_{34}$, $X_{35}$, $X_{42}$, $X_{43}$, $X_{44}$, $X_{45}$, $X_{51}$, $X_{52}$, $X_{53}$, $X_{54}$, $X_{55}$.

The predicted value calculating block obtained in the block making unit 42 for the predicted value calculation is supplied to the class classification adaptive processing unit 43.

Similar to the case of the class classifying block, the pixel number and the shape as to the predicted value calculating block are not limited to the above-described examples. It should be noted, though, that the total number of pixels of the predicted value calculating block is preferably made larger than the total number of pixels of the class classifying block.

Also, when the above-explained block making process is carried out (similar to process operations other than block making), there are no corresponding pixels near the image frame of the image data. In this case, for example, the process operation may be performed, assuming now that the same pixels as those for constituting the image frame are located outside this image frame.

The class classification adaptive processing unit 43 includes an ADRC (adaptive dynamic range coding) processing unit 44, a class classifying unit 45, and an adaptive processing unit 46, and performs a class classification adaptive processing operation.

By class classification adaptive processing operation, it is meant that an input signal is classified into several classes based on features thereof, and an adaptive process operation suitable for each of these classes is executed for the input signal of each of these classes. Roughly speaking, the class classification adaptive process operation is subdivided into a class classification process operation and an adaptive process operation.

Now, both the class classification process operation and the adaptive process operation are described.

Figure 11A:
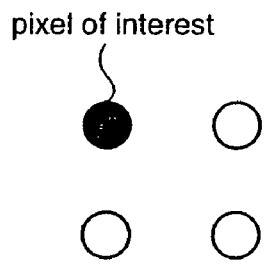
FIGS. 11A and 11B are diagrams for explaining the class classifying process operation.
Figure 11B:
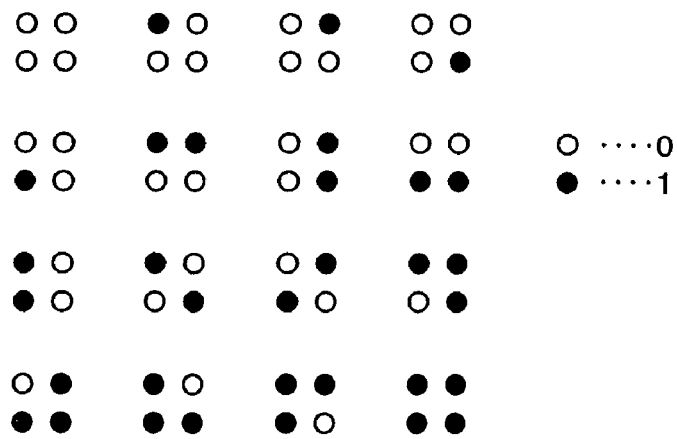

First, the class classification processing operation will now be explained. For the purposes of discussion, it is assumed that, as indicated in FIG. 11A, a block (class classifying block) made of 2×2 pixels is constructed of a pixel of interest, and three pixels located adjacent thereto, and each of these pixels is expressed by 1 bit (having either a level "0" or a level "1"). In this case, as indicated in FIG. 11B, a block of 4 pixels (2×2) may be classified into 16 (= $(2_1)_4$), depending upon level distributions of the respective pixels. Such a pattern classification corresponds to the class classification process, which is performed in the class classifying unit 45.

It should be noted that the class classification process operation preferably takes into account characteristics of the image, e.g., complexity of the image and strength of change of the image within the block.

Normally, in this example, for instance, 8 bits or more are allocated to each of pixels. Also, in this embodiment, as previously explained, the class classifying block is arranged by 9 pixels (=3×3). As a result, when the class classification process operation is performed with respect to such a class classifying block, this block is classified into such a huge number of classes, i.e., $(2_8)_9$.

Therefore, according to this embodiment, the ADRC process operation is carried out for the class classifying block in the ADRC processing unit 44. As a result, the class number is reduced by decreasing the bit number of the pixels in the class classifying block.

Figure 12A:
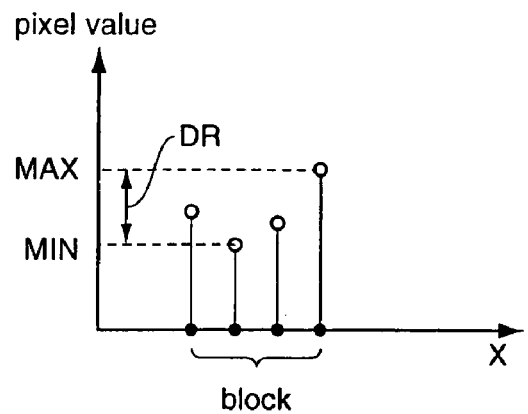
FIGS. 12A–12C are diagrams for explaining the ADRC processing operation.

That is to say, for example, for the sake of simple explanation, as indicated in FIG. 12A, considering a block that is constructed of 4 pixels aligned on a straight line, both a maximum value "MAX" and a minimum value "MIN" of this pixel value are detected in the ADRC process operation. Then, assuming now that DR=MAX–MIN is used as a local dynamic range of the block, the pixel values of the pixels for constituting the block are requantized to k bits, based on this dynamic range DR.

Figure 12B:
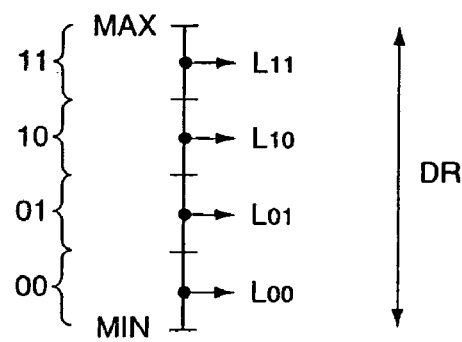

In other words, the minimum value MIN is subtracted from each of the pixel values within the block, and then the subtraction value is divided by $DR/2_K$. As a result, the resultant value is converted into a code (ADRC code) corresponding to the divided value. Using a concrete example, if k=2, as indicated in FIG. 12B, a judgment is made as to whether or not the divided value belongs to any one of such ranges obtained by equally dividing the dynamic range DR by 4 (=$2_2$). In the case that the divided value belongs to the lowermost level range, the second lowermost level range, the third lowermost level range, or the uppermost level range, each of the divided values is coded into 2 bits such as 00B, 01B, 10B, or 11B (symbol "B" represents binary number) that represent the range. Then, on the decoding side, the ADRC code 00B, 01B, 10B, or 11B is converted into a center value $L_{00}$ of the lowermost level range, a center value $L_{01}$ of the second lowermost level range, a center value $L_{10}$ of the third lowermost level range, or a center value L11 of the uppermost level range. Then, the minimum value MIN is added to each of these values, so that the decoding operation is carried out.

Figure 12C:
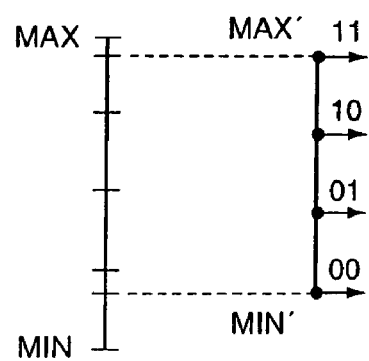

In this case, such an ADRC process operation is referred to as "non-edge matching". As indicated in FIG. 12C, contrary to this non-edge matching, there is another ADRC processing technique called improved non-edge matching. In the improved non-edge matching ADRC processing operation, either the ADRC code 00B or the ADRC code 11B is converted into an average value MIN' of the pixel values belonging to the lowermost level range obtained by equally dividing the dynamic range DR by 4, or another average value MAX' of the pixel values belonging to the uppermost level range. Also, both the ADRC codes 01 B and 10B are converted into a level obtained by equally dividing a dynamic range DR' defined by MAX'−MIN' by 3, so that the ADRC codes are decoded.

It should be noted that a detailed description about this ADRC processing operation is disclosed in, for example, Japanese Laid-open Patent Application No. 3-53778 opened in 1991, which has been previously filed by the assignee of the present application.

As previously explained, the number of classes may be reduced by executing the ADRC processing operation such that the quantization is performed based on a bit number smaller than the bit number which is allocated to the pixels for constituting the block. Such an ADRC processing operation is carried out in the ADRC processing unit 44.

In this embodiment, the class classification processing operation is carried out based upon the ADRC code outputted from the ADRC processing unit 44 in the class classifying unit 45. Alternatively, the class classification process operation may be carried out with respect to such data which are processed by way of other processing operations, for example, DPCM (predictive coding), BTC (block truncation coding), VQ (vector quantization), DCT (discrete cosine conversion), and Hadamard conversion.

The adaptive process operation is now described.

For instance, considering now that a predicted value of a pixel value "y" of the image data of the first hierarchy is calculated by a linear primary coupling model. This linear primary coupling model is defined by pixel values $X_1$, $X_2$, - - - of several pixels located around this pixel value (in this case, corrected data obtained by correcting image data of second hierarchy, will be referred to as "learning data" hereinafter, if required), and also linear coupling of preselected prediction coefficients $W_1$, $W_2$, - - - . In this case, the predicted value may be expressed by the following formula:

$$= W_1 X_1 + W_2 X_2 + \cdots, \tag{1}$$

Thus, to generalize this formula, when a matrix W made of a set of the prediction coefficient w, a matrix X made of a set of the learning data, and a matrix Y' made of a set of the predicted value are defined by, $$X = \begin{pmatrix} X_{11} & X_{12} & \ldots & X_{1n} \\ X_{21} & X_{22} & \ldots & X_{2n} \\ \ldots & \ldots & \ldots & \ldots \\ X_{m1} & X_{m2} & \ldots & X_{mn} \end{pmatrix}, W = \begin{pmatrix} W_1 \\ W_2 \\ \ldots \\ W_n \end{pmatrix}, Y' = \begin{pmatrix} E[y_1] \\ E[y_2] \\ \ldots \\ E[y_n] \end{pmatrix}$$

the following observation equation can be satisfied:

$$XW = Y' \tag{2}$$

The predicted value approximated to the pixel value y of the image data of the first hierarchy is obtained by applying the minimum squaring method to this observation equation.

In this case, when a matrix Y made of a set of pixel values of the image data of the first hierarchy (will be referred to as "teacher data" hereinafter, if necessary), and another matrix E made of a set of remainder of the predicted value with respect to the pixel value y of the image data of the first hierarchy are defined by, the below-mentioned remainder equation may be satisfied from the formula (2): . . . (2).

$$E = \begin{pmatrix} e_1 \\ e_2 \\ \ldots \\ e_m \end{pmatrix}, Y = \begin{pmatrix} y_1 \\ y_2 \\ \ldots \\ y_n \end{pmatrix}$$

$$XW = Y + E \tag{3}$$

In this case, a prediction coefficient Wi of the first hierarchy used to calculate the predicted value approximated to the pixel value y of the image data of the first hierarchy may be calculated by minimizing the square error.

$$\sum_{i=1}^{m} e_i^2$$

As a consequence, the above-described square error is differentiated by the prediction coefficient and the square error is set to 0. The prediction coefficient Wi capable of satisfying the following formula becomes an optimum value used to calculate the predicted value approximated to the pixel value "y" of the image data of the first hierarchy.

$$e_1 \frac{\partial e_1}{\partial w_i} + e_2 \frac{\partial e_2}{\partial w_i} + \ldots + e_m \frac{\partial e_m}{\partial w_i} = 0 \ (i = 1, 2, \ldots, n). \tag{4}$$

Thus, first, since the formula (3) is differentiated by the prediction coefficient Wi of the first hierarchy, the below-mentioned formula can be satisfied:

$$\frac{\partial e_i}{\partial w_i} = x_{i1}, \ \frac{\partial e_i}{\partial w_2} = x_{i2}, \ \ldots, \ \frac{\partial e_i}{\partial w_n} = x_{in}, \ (i = 1, 2, \ldots, m). \tag{5}$$

Based on the formulae (4) and (5), formula (6) may be obtained:

$$\sum_{i=1}^{m} e_i x_{i1} = 0, \ \sum_{i=1}^{m} e_i x_{i2} = 0, \ \ldots \sum_{i=1}^{m} e_i x_{in} = 0. \tag{6}$$

Furthermore, considering the relationship among the learning data "L", the prediction coefficient "w", the teacher data "y", and the remainder "e" contained in the remainder equation defined in the formula (3), it is possible to obtain the following normal equation from the formula (6):

$$\begin{cases} \left(\sum_{i=1}^{m} x_{i1}x_{i1}\right)w_1 + \left(\sum_{i=1}^{m} x_{i1}x_{i2}\right)w_2 + \ldots + \left(\sum_{i=1}^{m} x_{i1}x_{in}\right)W_n = \left(\sum_{i=1}^{m} x_{i1}y_i\right) \\ \left(\sum_{i=1}^{m} x_{i2}x_{i1}\right)w_1 + \left(\sum_{i=1}^{m} x_{i2}x_{i2}\right)w_2 + \ldots + \left(\sum_{i=1}^{m} x_{i2}x_{in}\right)w_n = \left(\sum_{i=1}^{m} x_{i2}y_i\right) \\ \left(\sum_{i=1}^{m} x_{in}x_{i1}\right)w_1 + \left(\sum_{i=1}^{m} x_{in}x_{i2}\right)w_2 + \ldots + \left(\sum_{i=1}^{m} x_{in}x_{in}\right)w_n = \left(\sum_{i=1}^{m} x_{in}y_i\right) \end{cases} \quad (7)$$

The number of normal equations defined in the formula (7) is the same as the number of the prediction coefficients w to be calculated. As a result, an optimum prediction coefficient w can be obtained by solving the formula (7). It should be noted that one way of solving the formula (7) is to use the sweep-out method (Gauss-Jordan's erasing method).

As previously described, the adaptive processing operation is carried out in such a manner that the optimum prediction coefficient w of the first hierarchy for each class, and further, the predicted value approximated to the pixel value y of the image data of the first hierarchy is calculated based on the formula (1) by using this prediction coefficient w. This adaptive processing operation is performed in the adaptive processing unit 46.

It should be noted that the adaptive processing operation is different from the interpolation processing operation. That is, in the adaptive processing operation, a component is reproduced which is contained in an original image data (in this embodiment, the image data of the first hierarchy), but is not contained in a thinned image (in this embodiment, the image data of the second hierarchy). In other words, the adaptive processing operation is identical to the interpolation processing operation with employment of a so-called "interpolation filter" if only the formula (1) is considered. However, since the prediction coefficient w corresponding to the tap coefficient of this interpolation filter is calculated by using the teacher data "y", namely the learning system, the component contained in the original image data can be reproduced. In view of this technical point, the adaptive processing operation may be referred to as a process operation with an image forming effect.

Figure 13:
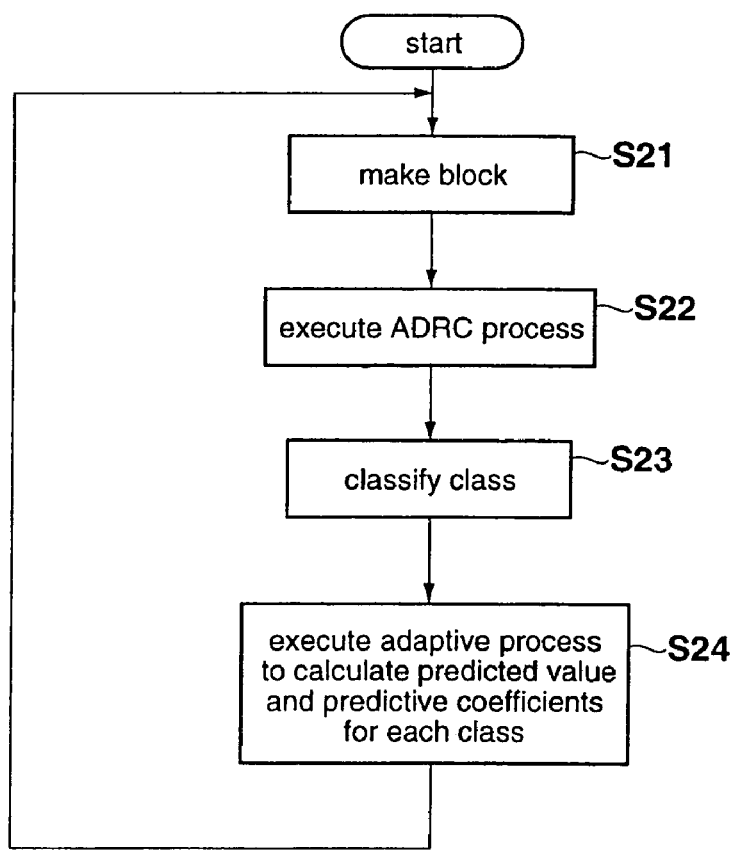
FIG. 13 is a flow chart for describing operations of the local decoding unit 22 of FIG. 9.

Referring now to a flow chart shown in FIG. 13, the process operations of the local decoding unit 22 of FIG. 9 will be explained.

First, in the local decoding unit 22, at step S21, the corrected data derived from the correcting unit 21 is processed to make blocks. In other words, in the block making unit 41 for the class classification, the corrected data is subdivided into a class classifying block of 3×3 pixels centered about the noted corrected data, which will then be supplied to the class classification adaptive processing unit 43. In the block making unit 42 for the predicted value calculation, the corrected data is subdivided into a predicted value calculating block made of 5×5 pixels centered about the noted corrected data, which will be then supplied to the class classification adaptive processing unit 43.

As previously explained, in addition to the class classifying block and the predicted value calculating block, the image data of the first hierarchy is supplied to the class classification adaptive processing unit 43. The class classifying block is supplied to the ADRC processing unit 44, and the predicted value calculating block and the image data of the first hierarchy are supplied to the adaptive processing unit 46.

Upon receipt of the class classifying block, the ADRC processing unit 44 executes the ADRC processing operation of, e.g., 1 bit (ADRC for executing requantization by 1 bit) with respect to this class classifying block at step S22. As a result, the corrected data is converted into 1 bit (namely, coded) which is outputted to the class classifying unit 45. At step S23, the class classifying unit 45 executes the class classification processing operation with respect to the ADRC-processed class classifying block (namely, detects a state of distribution of each of the pixel levels in the block), and judges to which class this class classifying block belongs. This class judgement result is supplied as class information to the adaptive processing unit 46.

It should be understood that in this embodiment, since the class classification processing operation is performed with respect to the class classifying block constructed of 9 pixels (=3×3) to which the ADRC processing operation of 1 bit has been carried out, each of the class classifying blocks is classified into any one of 512 classes (=$(2^1)^9$).

Then, the process operation is advanced to step S24, at which the adaptive processing operation is carried out for every class based on the class information supplied from the class classifying unit 45 in the adaptive processing unit 46. As a result, both the prediction coefficients for each class of the first hierarchy and the predicted values of one frame are calculated.

That is, according to this embodiment, 25×9 prediction coefficients for each class are calculated, from the corrected data and the image data of the first hierarchy, for one certain corrected data. In addition, predicted values as to a total of 9 pixels, namely a pixel of an image data of a first hierarchy corresponding to this corrected data of interest, and also 8 pixels adjacent to this pixel, are calculated by executing the adaptive processing operation, employing the prediction value calculating block having 5×5 pixels, where the pixel corresponding to the corrected data is centered within the predicted value calculating block.

Now, using the example of class information C being outputted from the class classifying unit 45, and this class information C being related to a class classifying block having by 3×3 corrected data X22, X23, X24, X32, X33, X34, X42, X43, X44, where corrected data X33 shown in FIG. 10 is centered. Also, it is now assumed that as the predicted value calculating block, a predicted value calculating block corresponding to the class classifying block is outputted from the predicted value calculating block making unit 42. This predicted value calculating block is arranged by $X_{11}$, $X_{12}$, $X_{13}$, $X_{14}$, $X_{15}$, $X_{21}$, $X_{22}$, $X_{23}$, $X_{24}$, $X_{25}$, $X_{31}$, $X_{32}$, $X_{33}$, $X_{34}$, $X_{35}$, $X_{41}$, $X_{42}$, $X_{43}$, $X_{44}$, $X_{45}$, $X_{51}$, $X_{52}$, $X_{53}$, $X_{54}$, $X_{55}$, where corrected data X33 is centered. First, while the corrected data of the predicted value calculating block is set to the learning data, and the pixel values $Y_{33}$ (1) to $Y_{33}$ (9) of the 3×3 pixels (a portion surrounded by a rectangular in FIG. 10) where the corrected data X33 is centered in the image data of the first hierarchy are set to the teacher data, the normal equation indicated in the formula (7) may be established.

Moreover, the normal equation, for example for one frame, is similarly established as to other predicted value calculating blocks corresponding to other class classifying blocks which are classified into the class information C. When the normal equations are established by which a prediction coefficient (k) to a prediction coefficient $W_{25}(k)$ used to calculate a predicted value of a pixel value $Y_{33}(k)$ (k=1, 2, - - - , 9) can be calculated, these normal equations are solved, so that an optimum prediction coefficient $w_1(k)$ to an optimum prediction coefficient $w_5(k)$ are calculated which are suitable for calculating the predicted value of the pixel value $Y_{33}(k)$ as to the class information C. The above-described prediction coefficients $w_1(k)$ to $w_{25}(k)$ require 25, since 25 pieces of the learning data for obtaining one predicted value are used in this embodiment. Also, the process operations for establishing the normal equations are executed at step S24 until the above-described number of normal equations can be obtained. This process is carried out for each class—25×9 predictive coefficients are calculated for each class. Then, in accordance with the below-mentioned formula corresponding to the formula (1), the predicted value is obtained using the 25×9 predicted coefficients corresponding to class information c and the 25 corrected data in the predicted value calculating block:

$$w_1(k)X_{11}+w_2(k)X_{12}+w_3(k)X_{13}+w_4(k)X_{14}+w_5(k)X_{15}+w_6(k)X_{21}+w_7(k)X_{22}+w_8(k)X_{23}+w_9(k)X_{24}+w_{10}(k)X_{25}+w_{11}(k)X_{31}+w_{12}(k)X_{32}+w_{13}(k)X_{33}+w_{14}(k)X_{34}+w_{15}(k)X_{35}+w_{16}(k)X_{41}+w_{17}(k)X_{42}+w_{18}(k)X_{43}+w_{19}(k)X_{44}+w_{20}(k)X_{45}+w_{21}(k)X_{51}+w_{22}(k)X_{52}+w_{23}(k)X_{53}+w_{24}(k)X_{54}+w_{25}(k)X_{55} \quad (8).$$

In step S23, after 25×9 prediction coefficients for each class are calculated, 3×3 predicted values are calculated in units of 3×3 pixels centered about the noted corrected data. Thereafter, in step S24, the 25×9 prediction coefficients for each class are provided to the determining unit 24 and predicted values are provided for an error calculation for each 3×3 pixels. Processing then returns to step S21, and processing is repeated for the next frame.

Figure 14:
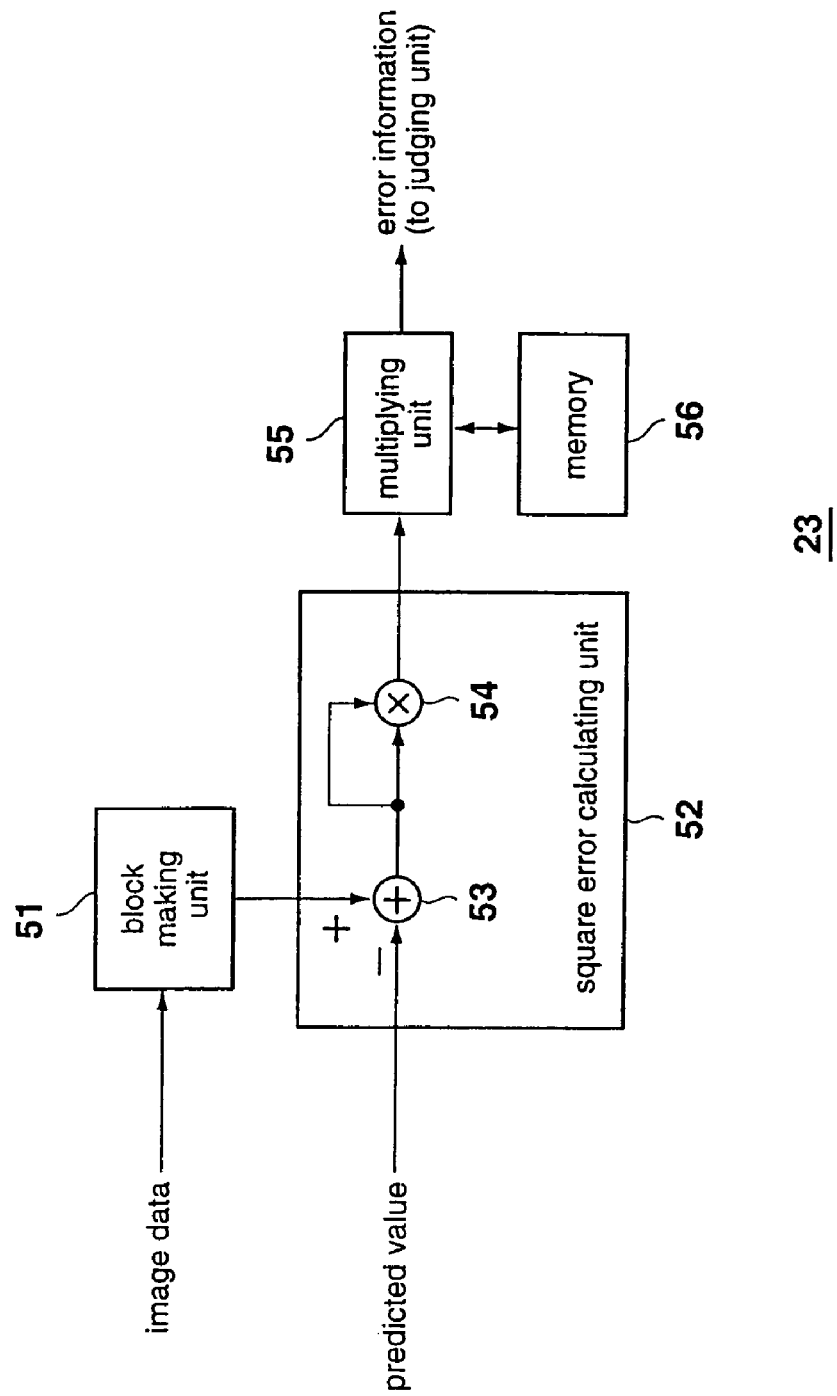
FIG. 14 is a block diagram for showing a structural example of the error calculating unit 23 of FIG. 5.

Next, FIG. 14 indicates an embodiment of the error calculating unit 23 of FIG. 5.

The original image data (namely the image data of the first hierarchy) is supplied to the block making unit 51. In this case, the block making unit 51 processes the input image data to make 9 blocks that correspond with the predicted values of the first hierarchy output from the local decoding unit 22. The resultant image blocks, constructed of 3×3 pixels, are supplied from the block making unit 51 to a square error calculating unit 52. As previously described, in addition to the blocks supplied from the block making unit 5, the predicted value of the first hierarchy derived from the local decoding unit 22 is supplied in units of 9 pieces (block unit of 3×3 pixels) to the square error calculating unit 52. This square error calculating unit 52 calculates a square error as a prediction error of this predicted value with respect to the image data of the first hierarchy, and then supplies this calculated square error to a multiplying unit 55.

The square error calculating unit 52 includes calculators 53 and 54. The calculator 53 subtracts the corresponding predicted value from each of the block-processed image data output from the block making unit 51, and then supplies the result of the subtraction to the calculator 54. The calculator 54 squares the output of the calculator 53, and supplies the squared value to the multiplying unit 55.

Upon receipt of the square error from the square error calculating unit 52, the multiplying unit 55 reads a stored value of a memory 56, adds this stored value to the square error, and again supplies the added value to the memory 56 for storage in the memory 56. Then, the multiplying unit 55 repeats the above-described operation to produce a multiplied value of the square error (error distribution). Furthermore, when the multiplication for a preselected amount (for instance, for one frame) of square errors is completed by the multiplying unit 55, the multiplying unit 55 the multiplied value from the memory 56, and then supplies the multiplied value as the error information to the judging unit 24. The values in the memory 56 are cleared every time each frame is processed, and the output values of the multiplying unit 55 are stored into the memory 56.

Figure 15:
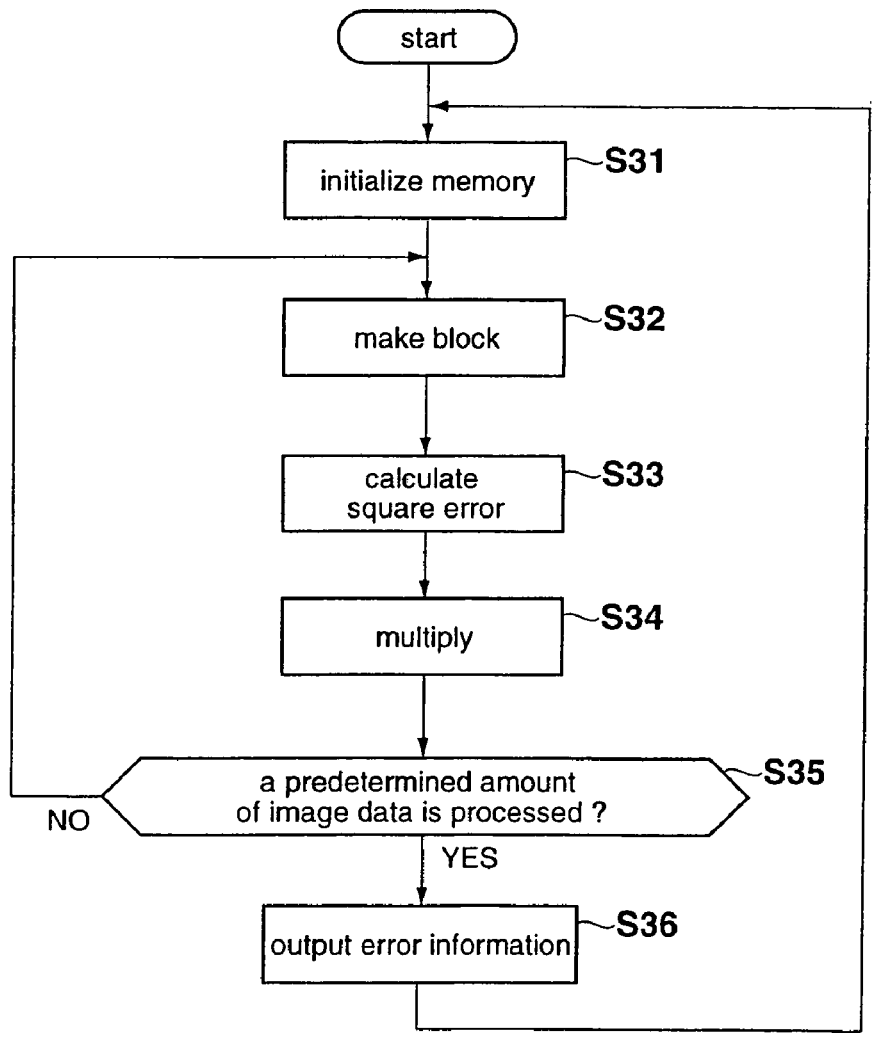
FIG. 15 is a flow chart for describing operations of the error calculating unit 23 of FIG. 14.

Referring now to the flow chart in FIG. 15, operation of the error calculating unit 23 is described. First, at step 31, in the error calculating unit 23, the stored value of the memory 56 is cleared (e.g., to "0"). Then, processing continues at step S32, where the image data of the first hierarchy is block-processed by the block making unit 51. The resulting block is supplied to the square error calculating unit 52. At step S33, the square error calculating unit 52 calculates the square of the error between the image data of the image of the first hierarchy, which constitutes the block supplied from the block making unit 51, and the predicted value of the first hierarchy supplied from the local decoding unit 22.

In other words, at step S33, in the calculator 53, the corresponding predicted values are subtracted from each of the image data of the first hierarchy, which has been block-processed and supplied by the block making unit 51, and then the subtraction value is furnished to the calculator 54. Further, at step S33, the output from the calculator 52 is squared by the calculator 54, and the squared value is supplied to the multiplying unit 55.

Upon receipt of the square error supplied from the square error calculating unit 52, at step S34 the multiplying unit 55 reads out the stored value from the memory 56 and calculates the multiplied value of the square error by adding this value read from the memory 56 to the square error. The multiplied value of the square error calculated in the multiplying unit 55 is supplied to the memory 56, where the multiplied value of the square error is written over the previously stored value.

Then, at step S35 in the multiplying unit 55, a judgment is made as to whether the multiplications of the square errors as to a preselected amount, for instance, one frame data are completed. At step S35, when it is judged that the multiplications of the square errors for one frame data have not been accomplished, processing returns to step S32. On the other hand, when at step S35 it is judged that the multiplications of the square errors for one frame data have been accomplished, processing proceeds at step S36. At step S36, the multiplying unit 55 reads out, from the memory 56, the multiplied value of the square errors for one frame data, and then outputs this multiplied value as the error information to the judging unit 24. Then, processing returns to step S31.

As a consequence, in the error calculating unit 23, assuming now that the image data of the first hierarchy is $Y_{ij}(k)$, and the predicted value of the first hierarchy processed from the corrected data in the local decoding unit 22 is, the error information Q may be calculated by executing a calculation in accordance with the following formula:

$$Q = \Sigma(Y_{ij}(k) - 2,$$

where symbol "$\Sigma$" implies a summation of 1 frame data.

Figure 16:
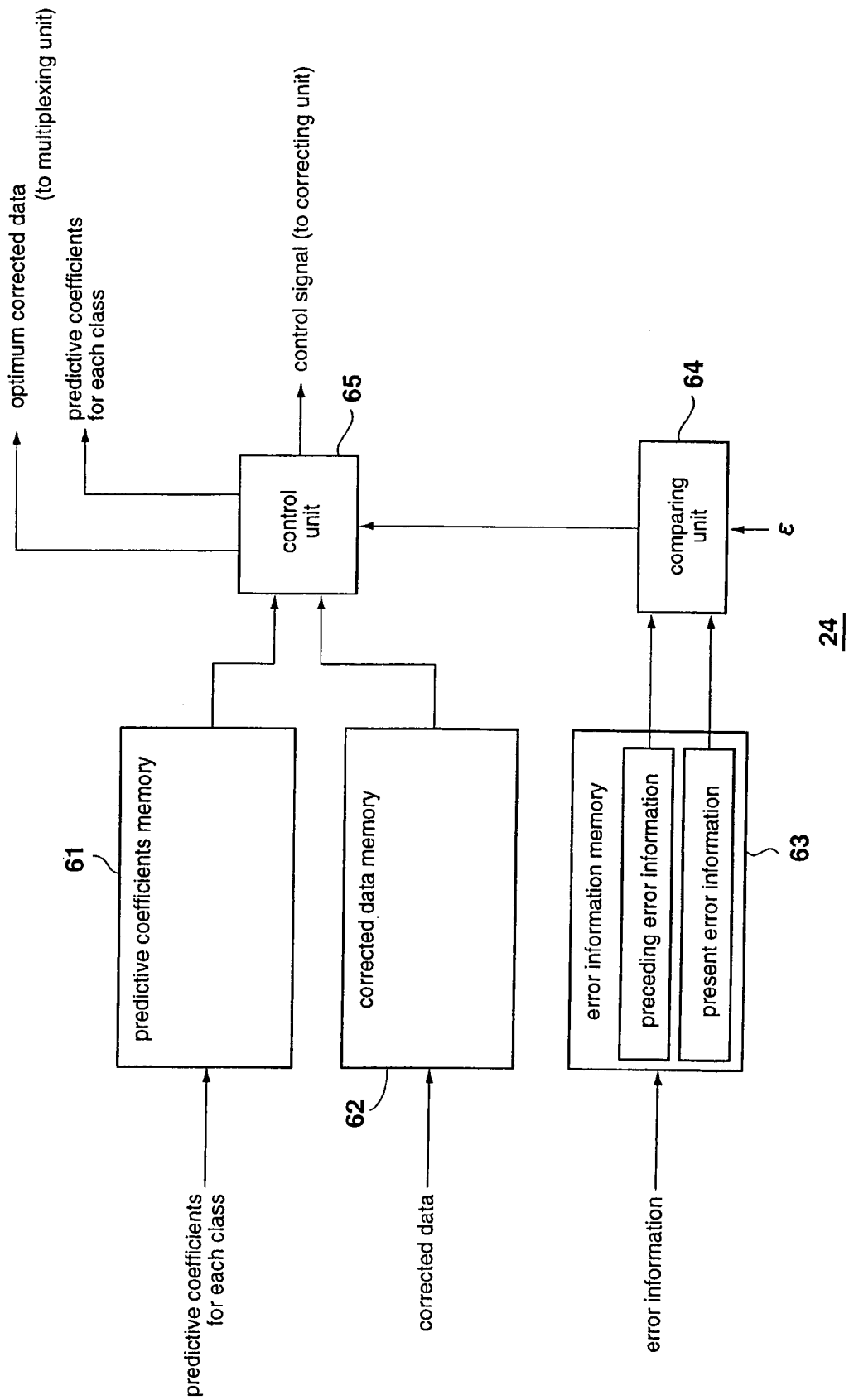
FIG. 16 is a block diagram for showing a structural example of the judging unit 24 unit 23 of FIG. 5.

Next, FIG. 16 is an illustration of one embodiment of the judging unit 24 of FIG. 5.

A prediction coefficient memory 61 stores therein the prediction coefficients for each class supplied from the local decoding unit 22. A corrected data memory 62 stores therein the corrected data supplied from the correcting unit 21.

It should be noted that when the image data of the second hierarchy is newly corrected, and therefore the newly corrected data is supplied in the correcting unit 21, the corrected data memory 62 stores therein the newly corrected data instead of the previously stored corrected data (i.e., previous corrected data). Also, after the corrected data has been replaced by the newly corrected data, a set of new prediction coefficients for each class corresponding to the newly corrected data is output from the local decoding unit 22. Also, when a new prediction coefficients for each class are supplied to the prediction coefficient memory 61, the new prediction coefficients for each class are stored in place of the previously stored prediction coefficients (i.e., preceding prediction coefficient for each class).

The error information memory 63 stores therein the error information supplied from the error calculating unit 23. It should also be noted that the error information memory 63 stores therein the error information which has been supplied from the error calculating unit 23 in the previous case (the preceding error information), in addition to the presently supplied error information (present error information). That is, even when the new error information is supplied, the previously stored error information is saved until the further new error information is supplied. Also, the content of the error information memory 63 is cleared every time a new frame is processed (e.g., at commencement of processing a new frame).

A comparing unit 64 compares a predetermined threshold value "$\epsilon$" with the presently supplied error information stored in the error information memory 63, and further, may compare the presently supplied error information with the previously supplied error information, if required. A comparison result obtained from the comparing unit 64 is supplied to a control unit 65.

The control unit 65 judges whether the corrected data stored in the corrected data memory 62 is substantially (optimally) equal to the coded result of the image based on the comparison result obtained from the comparing unit 64. When it is judged that the corrected data is not substantially equal to the coded result, the control unit 65 supplies a control signal for requesting an output of new corrected data to the correcting unit 21 (FIG. 5). On the other hand, when the control unit 65 recognizes that the corrected data stored in the corrected data memory 62 is substantially equal to the coded result of the image, the prediction coefficients for each class stored in the prediction coefficient memory 61 are read out for output to the multiplexing unit 25, and also the corrected data stored in the corrected data memory 62 is read to be output to the multiplexing unit 25 as the optimum corrected data. Furthermore, in this case, the control unit 65 outputs a control signal to the correcting unit 21, and this control signal indicates that the coding operation for one frame image has been accomplished. As a result, as previously explained, the control unit 65 causes the correcting unit 21 to commence the process operation for the next frame.

Next, operations of the judging unit 24 are described with reference to FIG. 17. At a first step S41, in the judging unit 24, the comparing unit 64 judges whether the error information is received from the error calculating unit 23. When the comparing unit 64 judges that the error information is not received, the processing returns to step S41. On the other hand, when the comparing unit 64 judges that the error information is received, namely when the error information is stored in the error information memory 63, the process operation is advanced to step S42. At step S42, the comparing unit 64 compares a predetermined threshold value "$\epsilon$" with the presently stored error information (present error information) so as to judge whether the present error information is smaller than the predetermined threshold value.

At step S42, when it is judged that the present error information is not less than the predetermined threshold value "$\epsilon$", the comparing unit 64 reads out the preceding error information stored in the error information 63. Then, at step S43, the comparing unit 64 compares the preceding error information with the present error information to judge whether the preceding error information is larger than the present error information.

When the processing is commenced, and the error information is first supplied, since the preceding error information is not stored into the error information memory 63, in this case, the process operations defined after the step S43 will not be performed in the judging unit 24. The control unit 65 outputs a control signal for controlling the correcting unit 32 (FIG. 7) to output a predetermined initial address.

When it is judged at step S43 that the present error information is less than or equal to the preceding error information, namely, when the image data of the second hierarchy is corrected to thereby reduce the error information, the processing continues at step S44. At step S44, the control unit 65 outputs to the correcting unit 32, a control signal to instructing that the correction value is changed in a similar manner to that of the preceding case. Then, processing returns to step S41. On the other hand, when it is judged at step S43 that the present error information is larger than the preceding error information (i.e., that the error information is increased by correcting the image data of the second hierarchy, the processing advances to step S45. At step S45, the control unit 65 outputs, to the correcting unit 32, a control signal to instruct that the correction value $\Delta$ is changed in a manner opposite to that of the preceding case. Then, processing continues at step S41.

It should also be noted that when the continuously reduced error information is increased with a certain timing, the control unit 65 outputs a control signal for instructing that the correction value $\Delta$ is decreased by, for example, ½, and is changed in a manner opposite to that of the previous case.

Then, since the processing of step S41 to step S45 is repeated, the error information is decreased. As a result, in the case that it is judged at the step S42 that the present error information is smaller than the predetermined threshold value "$\epsilon$", the process operation is advanced to step S46. At step S46, the control unit 64 reads out the prediction coefficients for each class, stored in the prediction coefficient memory 61, and also reads out the corrected data of one frame stored in the corrected data memory 62. Then, these prediction coefficients for each class and corrected data are supplied to the multiplexing unit 25, and the processing is ended.

Figure 17:
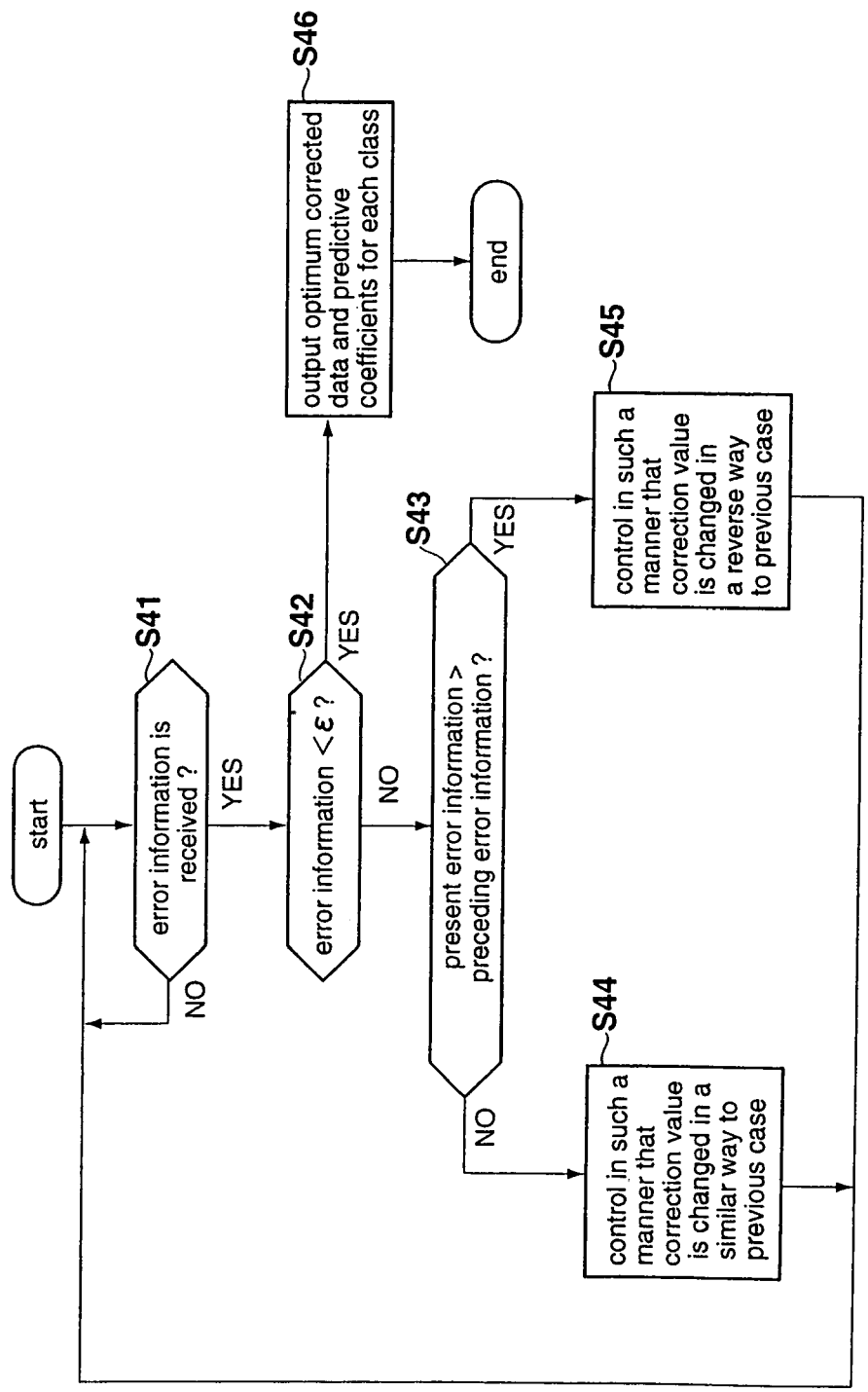
FIG. 17 is a flow chart for describing operations of the judging unit 24 of FIG. 16.

Thereafter, the process operations are repeated in accordance with the flow chart of FIG. 17, while waiting for the supply of the error information about the next frame.

It should also be noted that in the correcting unit 32, as to the correction of the image data of the second hierarchy, either all of the image data for one frame may be corrected, or only a portion of the image data for one frame may be corrected. When only a portion of the image data of the second hierarchy is corrected (e.g., when pixels capable of giving a strong influence to the error information are detected by the control unit 65), only the data about this portion (e.g., about the pixels capable of giving a strong influence) may be corrected. An example of the manner in which pixels capable of giving the strong influence to the error information may be detected is now discussed. First, the process operation is carried out by directly utilizing the image data of the second hierarchy, so that the error information is acquired. Then, a control signal is supplied from the control unit 65 to the correcting unit 32, which executes processing for correcting the image data of the second hierarchy by the same correction value $\Delta$ every one pixel.

The resulting error information is compared with such the error information that is obtained when the image data of the second hierarchy is directly utilized. Then, a pixel about the error information where a comparison difference becomes larger than, or equal to a predetermined value may be detected as the pixel capable of giving the strong influence to the error information.

As previously described, the correcting operation of the image data of the second hierarchy is repeated until the error information is reduced, or decreased to be smaller than the preselected threshold value "$\epsilon$". The corrected data obtained when the error information becomes smaller than the preselected threshold value "$\epsilon$" is output as the coded result of the image. Accordingly, in the receiver apparatus 4 (FIG. 1), it is possible to produce the decoded image identical to (or, substantially identical to) the original image data from the corrected data (optimum corrected data) where the pixel values of the pixels of the thinned image data are made as the most proper values used to recover the original image data.

Since the image is compressed by way of the thinning process operation, and also by the ADRC process operation and the class classification adaptive process operation, it is possible to obtain coded data with the very high compression rate. It should be noted that the above-described coding processing executed in the transmitting apparatus 1 may be referred to as a "combined coding process operation", since the compression process operation by the thinning operation is organically combined with the class classification adaptive process operation so as to realize the high efficiency compression.

Figure 18:
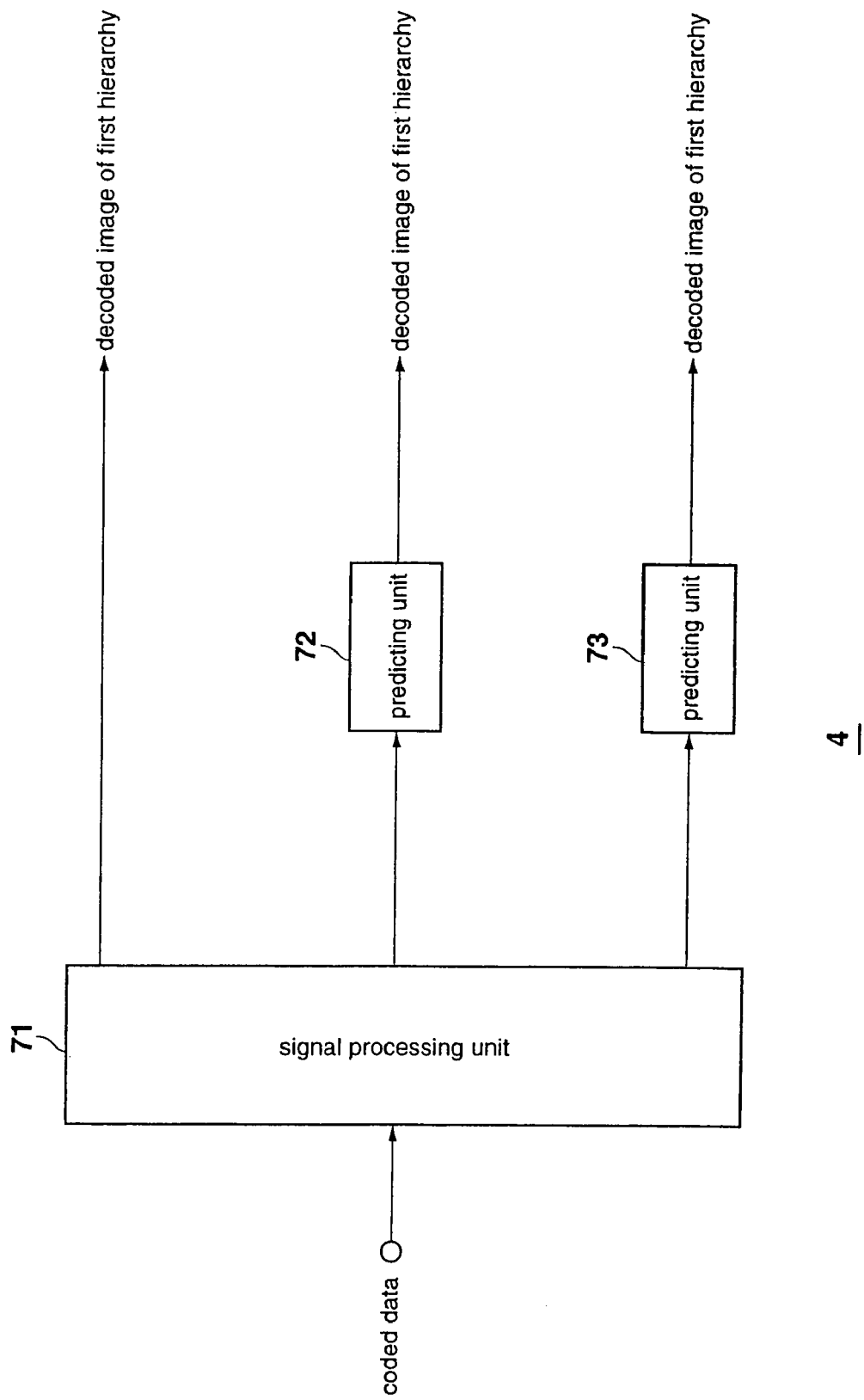
FIG. 18 is a block diagram for showing an arrangement of the receiver apparatus 4 of FIG. 1.

Then, FIG. 18 indicates an example of an arrangement of the receiving apparatus 4 shown in FIG. 1.

The coded data recorded on the recording medium 2 is reproduced in the signal processing unit 71, and also, the coded data which is transmitted via the transmission path 3 is received to be supplied to the signal processing unit 71. In this signal processing unit 71, the coded data is separated into the coded data of the first hierarchy, of the second hierarchy and of the third hierarchy. In addition, the error correcting process operation and other process operations are performed by the signal processing unit. 71. Also, the signal processing unit 71 copies the prediction coefficients for each class of the first hierarchy from the coded data of the third hierarchy to be used in coding the coded data of the second hierarchy. The signal processing unit thereafter outputs the coded data of the first hierarchy through the coded data of the third hierarchy.

The coded data of the first hierarchy is directly output as a decoded image data of a first hierarchy. Also, the coded data of the second hierarchy and of the third hierarchy is outputted to a predicting unit 72 and predicting unit 73, respectively.

Based upon the coded data of the second hierarchy, a predicted values of the image of the first hierarchy are calculated in the predicting unit 72, and then are outputted as the decoded image of the first hierarchy. Also, in the predicting unit 72, a predicted values of a first hierarchy are calculated based on the decoded image data of the third hierarchy to be outputted.

Figure 19:
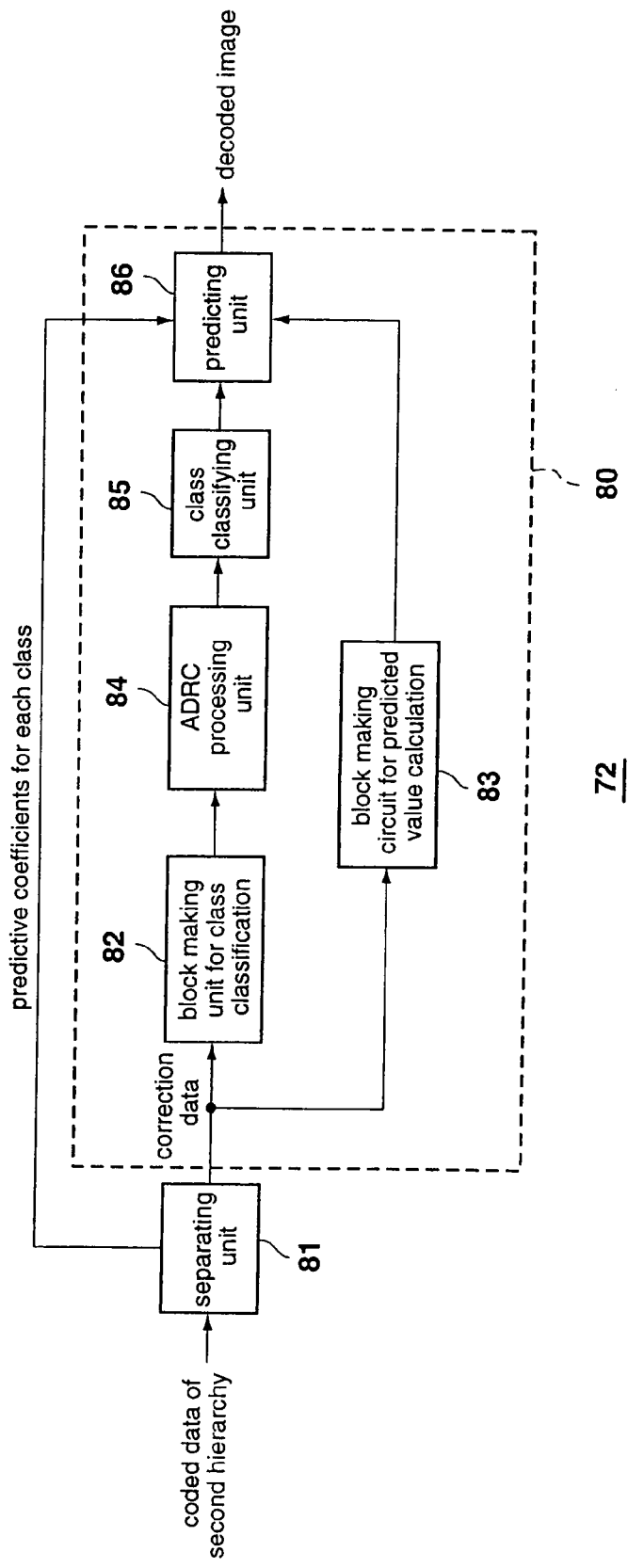
FIG. 19 is a block diagram for indicating a structural example of the predicting unit 72 shown in FIG. 18.

FIG. 19 illustrates an embodiment of the predicting unit 72.

The coded data of the second hierarchy derived from the signal processing unit 71 (FIG. 18) is supplied to a separating unit 81 that separates out optimum correction data of the second hierarchy and prediction coefficients for each class of the first hierarchy. The corrected data of the second hierarchy and the prediction coefficients for each class of the first hierarchy are supplied to a decode unit 80.

The decoding unit 80 includes a block making unit for class classification 82, a block making unit for predicted value calculation 83, an ADRC processing unit 84, a class classifying unit 85, and a predicting unit 86. These elements of the decoding unit 80 are arranged in a manner similar to the arrangement of the block making unit for class classification 41, the block making unit for predicted value calculation 42, the ADRC processing unit 44, and the class classifying unit 45 respectively. As a consequence, in these blocks operate in a similar manner.

The optimum corrected data provided from the separating unit 81 is input to the block making unit for class classification 82 and the block making unit for predicted value calculation 83, whereas the prediction coefficients, for each class, of the first hierarchy are input to the predicting unit 86 and then are stored in a memory (not shown).

The predicted value calculating block output from the block making unit for prediction value calculation 83 supplied to the predicting unit 896. The class information outputted from the class classifying unit 85 is ADRC processed by the ADRC processing unit 84. The ADRC processed class information is also provided to the predicting unit 86.

In the predicting unit 86, a 3×3 predicted values of a first hierarchy are calculated in accordance with the formula (1) by employing the read 25×9 prediction coefficients of the first hierarchy corresponding to the class information among the prediction coefficients for each class of the first hierarchy stored in the memory (not shown) in response to the class information, and also employing the 5×5 optimum corrected data of the predicted value calculating block supplied from the block making unit 83 for the predicted value calculation. The calculated predicted value of the first hierarchy is outputted from the decoding unit 80 as the decoded image of the first hierarchy.

As described above, the optimum corrected data of the second hierarchy is used to execute the prediction in the predicting unit 86, so that the error between the predicted value of the first hierarchy and the image data of the first hierarchy is made to be smaller than the threshold value "$\epsilon$". As a consequence, in accordance with the optimum corrected data of the second hierarchy, it is possible to obtain the decoded image data of the first hierarchy with high resolution.

Figure 20:
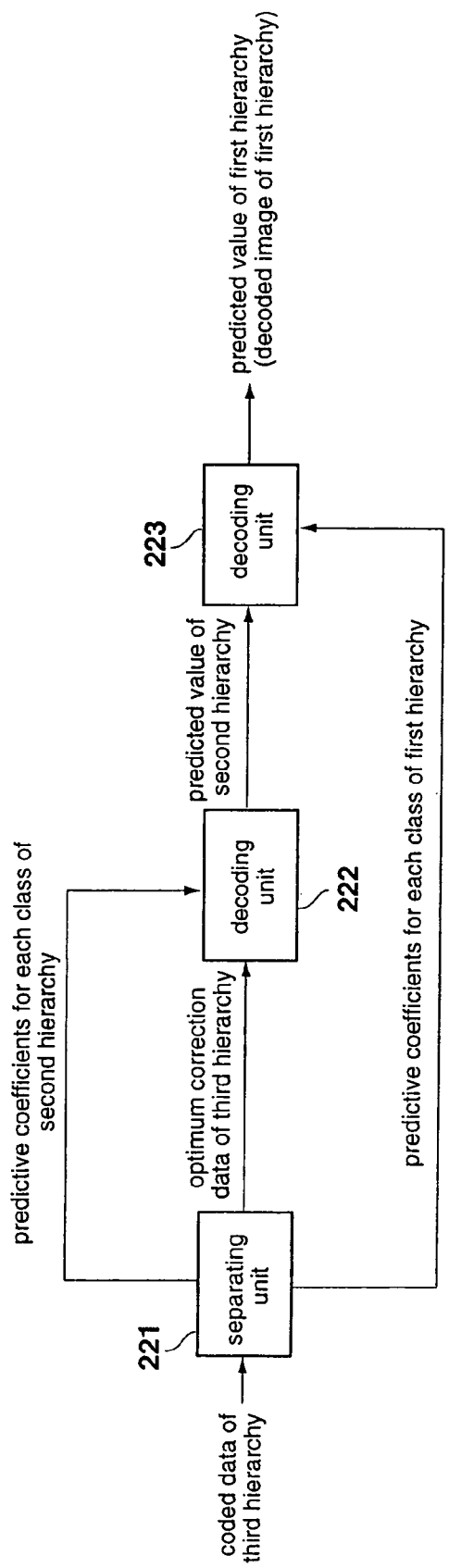
FIG. 20 is a block diagram for indicating a structural example of the predicting unit 73 shown in FIG. 18.

Then, FIG. 20 shows an example embodiment of the predicting unit 73 of FIG. 18.

The coded data of the third hierarchy derived from the signal processing unit 71 (FIG. 18) is supplied to a separating unit 221 that separates the coded data of the third hierarchy into optimum corrected data of the third hierarchy, a prediction coefficients for each class of a second hierarchy, and a prediction coefficients for each class of a first hierarchy. Both the optimum corrected data of the third hierarchy and the prediction coefficient for each class of the second hierarchy are supplied to a decode unit 222, whereas the prediction coefficients for each class of the first hierarchy are supplied to another decoding unit 223.

The decoding unit 222 is arranged in a similar to that of the decoding unit 80 shown in FIG. 19. As a consequence, similar to the above-explained case, in this decoding unit 222, a predicted value of the image corrected data of the second hierarchy is calculated from the optimum correction data of the third hierarchy and the prediction coefficients for each class of the second hierarchy, and then the calculated predicted value is supplied to the decoding unit 223. The decoding unit 223 is also arranged similar to the decoding unit 80. Thus, a predicted value of the first hierarchy is calculated from the predicted value of the second hierarchy and the prediction coefficient of the first hierarchy, and then the calculated prediction value is outputted as a decoded image of the first hierarchy.

The prediction coefficients for each class of the second hierarchy are calculated in the optimum correction data calculating unit 14 of FIG. 2 in order to obtain optimum data as the optimum corrected data of the second hierarchy. As previously explained, since the decoded image data of the first hierarchy having the high resolution can be obtained in accordance with the optimum corrected data of the second hierarchy, it is also possible to obtain the decoded image data of the first hierarchy with high resolution in accordance with the coded data of the third hierarchy.

As previously explained, when a portion, or even all, of the coded data of the first hierarchy and the coded data of the second hierarchy are lost due to some reason, the decoded image having the high resolution can be obtained from the coded data of the third hierarchy (the lowermost hierarchy), namely the optimum corrected data of the first hierarchy in combination with the prediction coefficients for each class of the first hierarchy and of the second hierarchy.

Also, for example, in the case of the receiving apparatus which can receive only the coded data of a third hierarchy (that is, the optimum corrected data of the third hierarchy, predicted coefficients for each class of a first and second hierarchy), it is possible to decode a decoded image having high resolution. Furthermore, in the case of the receiving apparatus which can receive only the coded data of the second hierarchy and the coded data of a third hierarchy (that is, the optimum corrected data of a second hierarchy, predicted coefficients for each class of a first and second hierarchy), it is possible to decode a decoded image having a high resolution.

It should be understood that in the described embodiment, the optimum correction data of the second hierarchy is contained in the coded data of the second hierarchy. Alternatively, the image data of the second hierarchy itself, as opposed to the optimum corrected data of the second hierarchy, may be contained in the coded data of the second hierarchy.

Also, the coded data of the first hierarchy, the coded data of the second hierarchy and the coded data of the third hierarchy are contained in the coded data output from the signal processing unit 15. As previously described, since the coded image with the high image quality can be produced only from the coded data of the third hierarchy (optimum corrected data of the third hierarchy and prediction coefficients for each class of first hierarchy and of second hierarchy), it is alternatively acceptable to include only the coded data of third hierarchy in the coded data outputted from the signal processing unit 15.

Furthermore, as shown in FIG. 2, the optimum corrected data of the second hierarchy output from the optimum corrected data calculating unit 13 is supplied to the optimum corrected data calculating unit 14, so that the optimum prediction coefficient for each class is calculated to obtain the optimum corrected data of the second hierarchy. Alternatively, instead of the optimum corrected data of the second hierarchy, the image data of the second hierarchy itself may be supplied to the optimum correction data calculating unit 14, so that the optimum prediction coefficient for each class for obtaining the image data of the second hierarchy may be obtained.

In the above-described case, the prediction coefficients for each class of the first hierarchy are obtained in the local decoding unit 22 of FIG. 9 (and the prediction coefficients for each class of the second hierarchy in local decode unit 22 for constructing optimum corrected data calculating unit 14), and then the prediction values of the first hierarchy are calculated by using the prediction coefficients for each class of the first hierarchy. Alternatively, the respective prediction values of the first hierarchy may be calculated without obtaining the prediction coefficients for each class in the local decode unit 22.

Figure 21:
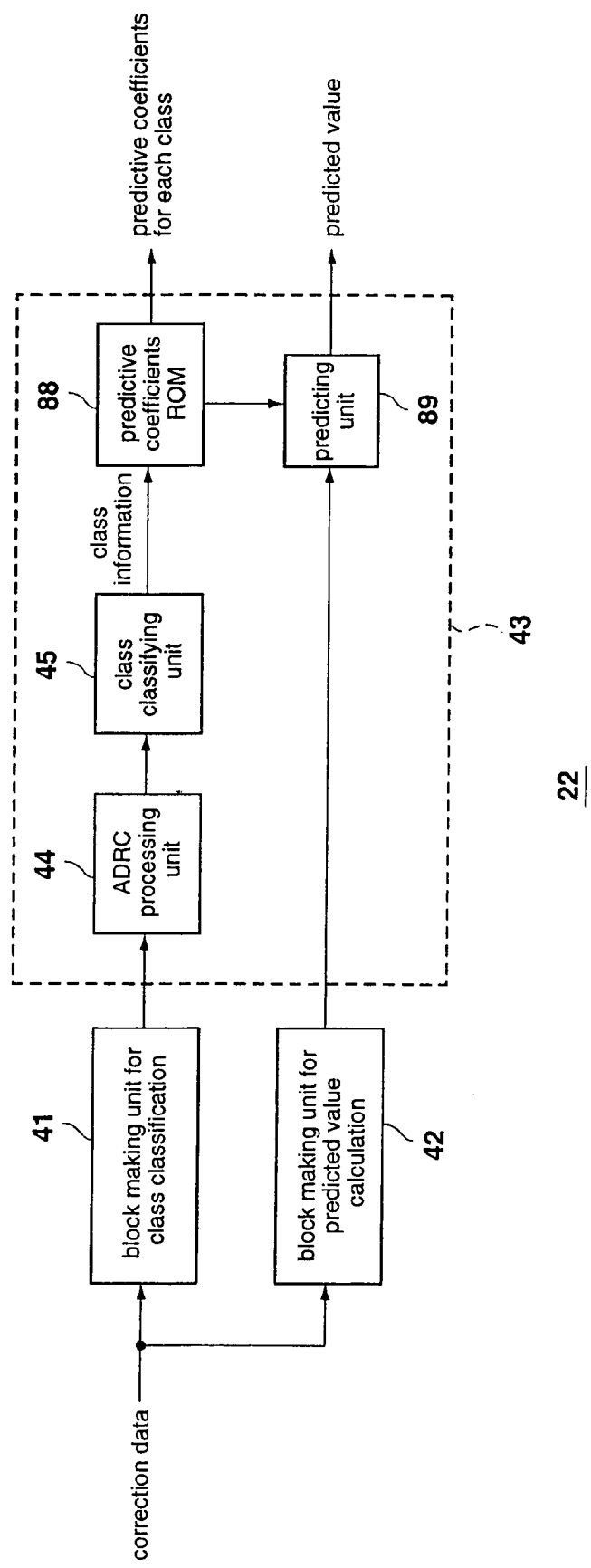
FIG. 21 is a block diagram for indicating another structural example of the local decoding unit 22 of FIG. 5.

That is, FIG. 21 illustrates another embodiment of the local decode unit 22. It should be understood that the same reference numerals shown in FIG. 9 will be employed as those for indicating the corresponding portions. Specifically, in place of the adaptive processing unit 46, a prediction coefficient ROM 88 and a predicting unit 89 are employed in the local decoding unit 22 of FIG. 21, and other units may be arranged similar to those of FIG. 9.

Figure 38:
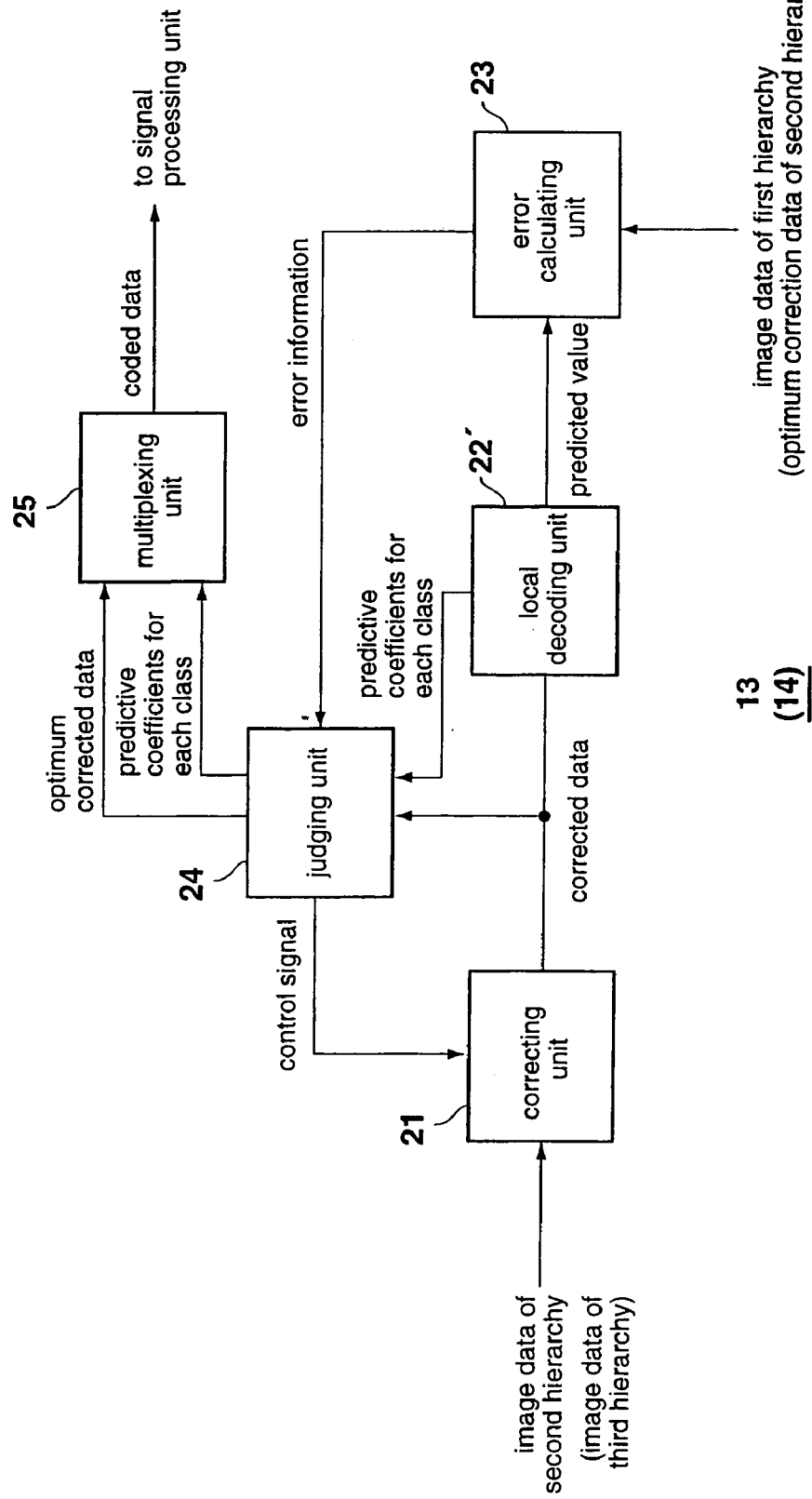
FIG. 38 is a block diagram showing an alternate embodiment of an optimum corrected data unit.

The optimum corrected data calculating unit 13 that may include the FIG. 21 local decoding unit 22 is shown in FIG. 38. The FIG. 38 optimum corrected data calculating unit 13 is similar to the FIG. 5 optimum corrected data calculating unit 13 except that the image data of the first hierarchy (optimum correction data of the second hierarchy) is not provided to the local decoding unit 22 of the FIG. 38 optimum correction data calculating unit. As discussed in detail below, the embodiment of the local decode unit of FIG. 21 does not require the image data of the first hierarchy (optimum correction data of the second hierarchy).

Referring now to FIG. 21, the prediction coefficient ROM 88 stores therein prediction coefficients with respect to classes, which have been obtained by way of learning (to be described later in the specification). Upon receipt of class information output from the class classifying unit 44, the prediction coefficients stored at an address corresponding to this class information are read out from this prediction coefficient ROM 88 and is supplied to the predicting unit 89.

In the predicting unit 89, a calculation is made of a linear equation indicated in the formula (1) (formula (8) shows a concrete application of formula (1)) by employing the predicted value calculating block derived from the block making unit 42 for the prediction value calculation, and also the prediction coefficient ROM 88. As a result, a prediction value of the original image is calculated without employing the original images of the respective hierarchies.

As a result, in accordance with the class classification adaptive processing unit 43 shown in FIG. 21, this prediction value can be calculated without employing the original images of the respective hierarchies. 25×9 predictive coefficients for each class stored in the predictive coefficients ROM 81 are output to determining unit 24 in a manner similar to the manner previously described.

Figure 39:
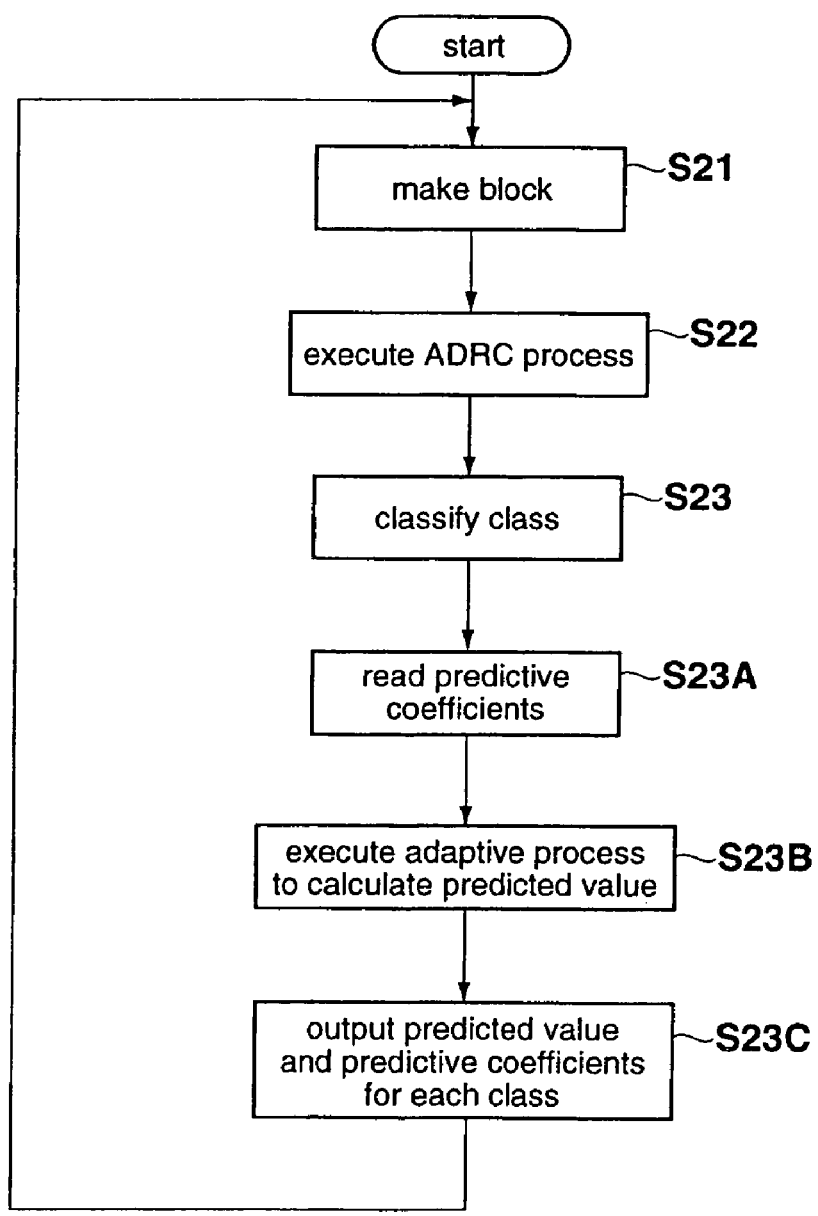
FIG. 39 is a flow chart describing operations of the optimum corrected data calculating unit of FIG. 38.

FIG. 39 is a flowchart that illustrates the process by which the FIG. 21 local decoding unit 22' operates. The process by which the FIG. 21 local decoding unit 22' operates is similar in some sense to the process illustrated in FIG. 13. For example, steps S21–S23 are identical. However, at step S23A, the prediction coefficients for the classified class are read from the prediction coefficient ROM 88. Then, at step S23B, in the predicting unit 89 executes an adaptive process to calculate a predicted value. Meanwhile, at step 23C, the prediction coefficients ROM provides the prediction coefficients for the classified class are provided to the judging unit.

Figure 22:
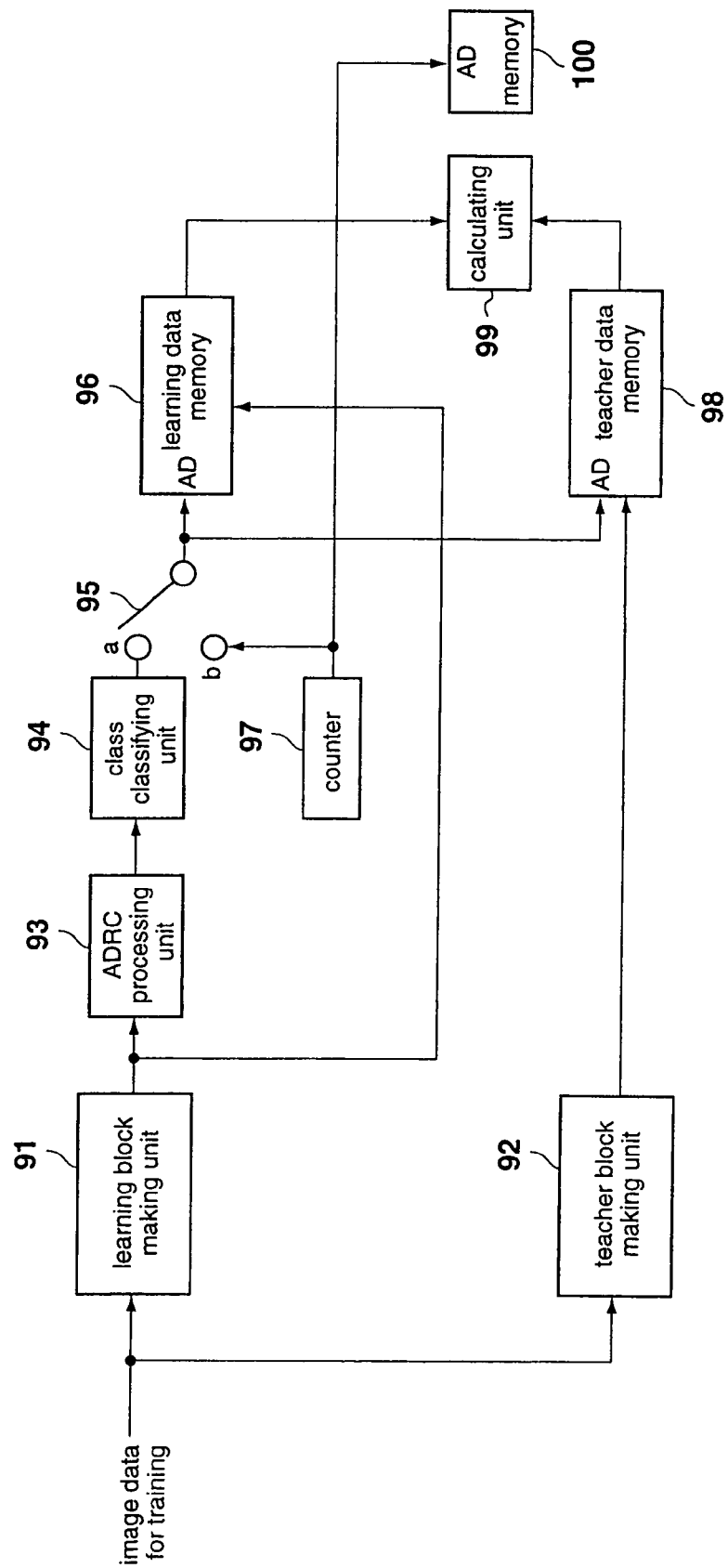
FIG. 22 is a block diagram for representing an arrangement of an image processing apparatus, according to an embodiment, for calculating the prediction coefficients stored in the prediction coefficient ROM 88 of FIG. 21.

Next, FIG. 22 illustrates an embodiment of an image processing apparatus for executing a learning operation so as to obtain the prediction coefficients stored in the prediction coefficient ROM 88 shown in FIG. 21.

Image data for a learning purpose (learning image) is supplied to a block making unit 91 for learning and a block making unit 92 for a teacher. As described below, these image data are used to obtain prediction coefficients applicable to any images. It should be noted that when the prediction coefficients for each class of the first hierarchy is obtained, the image data of the first hierarchy is supplied as the learning image to the learning block making unit 91 and the teacher block making unit 92. Also, when the prediction coefficients, for each class, of the second hierarchy are obtained, the image data of the second hierarchy is supplied as the learning image to the learning block making unit 91 and the teacher block making unit 92.

The learning block making unit 91 extracts, for example, 25 pixels (5×5 pixels) centered about the noted pixel of a positional relationship indicated by symbol "●" in FIG. 10, from the inputted image data, and thereafter supplies a block having these 25 pixels as a learning block to the ADRC processing unit 93 and a learning data memory 96.

Also, in the teacher block making unit 92, for example, a block constituted by 9 pixels (3×3 pixels) is produced from the input image data, and then a block having these 9 pixels is supplied as a teacher block to a teacher data memory 98.

It should also be noted that when the learning block constructed of, for example, the 25 pixels located in the positional relationship indicated by symbol "●" shown in FIG. 10 centered about the noted pixel in the learning block making unit 91, the teacher block of 3×3 pixels surrounded by a rectangle shown in FIG. 10 is produced from the teacher block making unit 92.

The ADRC processing unit 93 extracts central 9 pixels (3×3 pixels) from the 25 pixels for constituting the learning block, and then executes an ADRC process operation of 1 bit with respect to the block made of these 9 pixels in a similar manner to the ADRC processing unit of FIG. 21. The block of 3×3 pixels processed by the ADRC processing operation is supplied to a class classifying unit 94. In the class classifying unit 94, the block from the ADRC processing unit 93 is class-classified to obtain class information. This class information is supplied via a terminal "a" of a switch 95 to the learning data memory 96 and the teacher data memory 98.

In the learning data memory 96, or the teacher data memory 98, the learning block outputted from the learning block making unit 91, or the teacher block outputted from the teacher block making unit 92 is stored at an address corresponding to the class information supplied thereto.

As a result, assuming now that, for example, the block having 5×5 pixels shown by symbol "●" in FIG. 10 is stored as the learning block at a certain address of the learning data block 96, the block constructed of 3×3 pixels indicated in this drawing and surrounded by the rectangle is stored as the teacher block at the same address as the above-described address.

Subsequently, a similar process is repeated for all of the prepared learning images, so that the learning block and the teacher block are stored at the same addresses in the learning data memory 96 and the teacher data memory 98. The teacher block is arranged by 9 pixels, in which the predicted value is calculated in the local decoding unit 22 of FIG. 21 by employing the predicted value calculating block constituted by 25 corrected data having the same positional relationship as that of the 25 pixels of the learning block.

Since a plurality of information is stored at the same addresses in the learning data memory 96 and the teacher data memory 98, a plurality of learning blocks and a plurality of teacher blocks can be stored at the same addresses.

When the learning blocks and the teacher blocks for all of the learning images are stored into the learning data memory 96 and the teacher data 98, the switch 95 which has been selected to the terminal "a" is changed to be selected to the terminal "b", so that an output of a counter 97 is supplied as an address to the learning data memory 96 and the teacher data memory 98. The counter 97 counts a predetermined clock to output a sequential count value thereof, whereas in the learning data memory 96, or the teacher data memory 98, either the learning block or the teacher block stored at an address corresponding to this count value is read out to be supplied to a calculating unit 99.

As a result, a set of learning blocks and a set of teacher blocks of the class are provided to the calculating unit 99, corresponding to the count value of the counter 97 are supplied.

Upon receipt of a set of learning blocks and a set of teacher blocks as to a certain class, the calculating unit 99 calculates prediction coefficients to able of minimizing an error by way of the minimum square method by using these block sets.

In other words, for instance, assuming now that pixel values of pixels for constituting a learning block are $X_1$, $X_2$, $X_3$, - - - , and also prediction coefficients to be required are $w_1$, $w_2$, $w_3$, - - - , the prediction coefficients $w_1$, $w_2$, $w_3$, - - - , must satisfy the following formula in order to obtain a pixel value "y" of a certain pixel for constituting a teacher block by way of a linear equation of these values:

$$y = w_1 x_1 + w_2 x_2 + w_3 x_3 + - - -$$

As a consequence, the prediction coefficients $w_1$, $w_2$, $w_3$, - - - , may be calculated in the calculating unit 99 in such a way that the normal equation indicated in the above-described formula (7) is established and solved, while these prediction coefficients minimize a square error of the predicted values $w_1 x_1 + w_2 x_2 + w_3 x_3 +$ - - - with respect to a true value "y" from both the learning block in the same class and the teacher block corresponding thereto. Therefore, 25×9 predictive coefficients are calculated for each class by carrying out the above-described process for each class.

The prediction coefficients with respect to the respective classes, which are calculated in the calculating unit 99, are supplied to a memory 100. The count value is supplied from the counter 97 to the memory 100, in addition to the prediction coefficients derived from the calculating unit 99. As a result, in the memory 100, the prediction coefficients derived from the calculating unit 99 are stored at the addresses corresponding to the count values outputted from the counter 97.

As described above, the 25×9 optimum prediction coefficients used to predict the 3×3 pixels of the block in this class are stored at the addresses corresponding to the respective classes in the memory 100.

The prediction coefficients for each class stored in the memory 100 in the above-described manner are stored in the prediction coefficient ROM 88 of FIG. 21.

It should be understood that the prediction coefficients are not stored at the addresses corresponding to the respective classes in the prediction coefficient ROM 88. However, average values of the pixel values of the teacher blocks may be stored. In this case, when the class information is supplied, the pixel value corresponding to this class is outputted. Accordingly, in the local decoding unit 22 of FIG. 21, neither the block making unit 42 for the predicted value calculation, nor the predicting unit 89 is provided.

Figure 23:
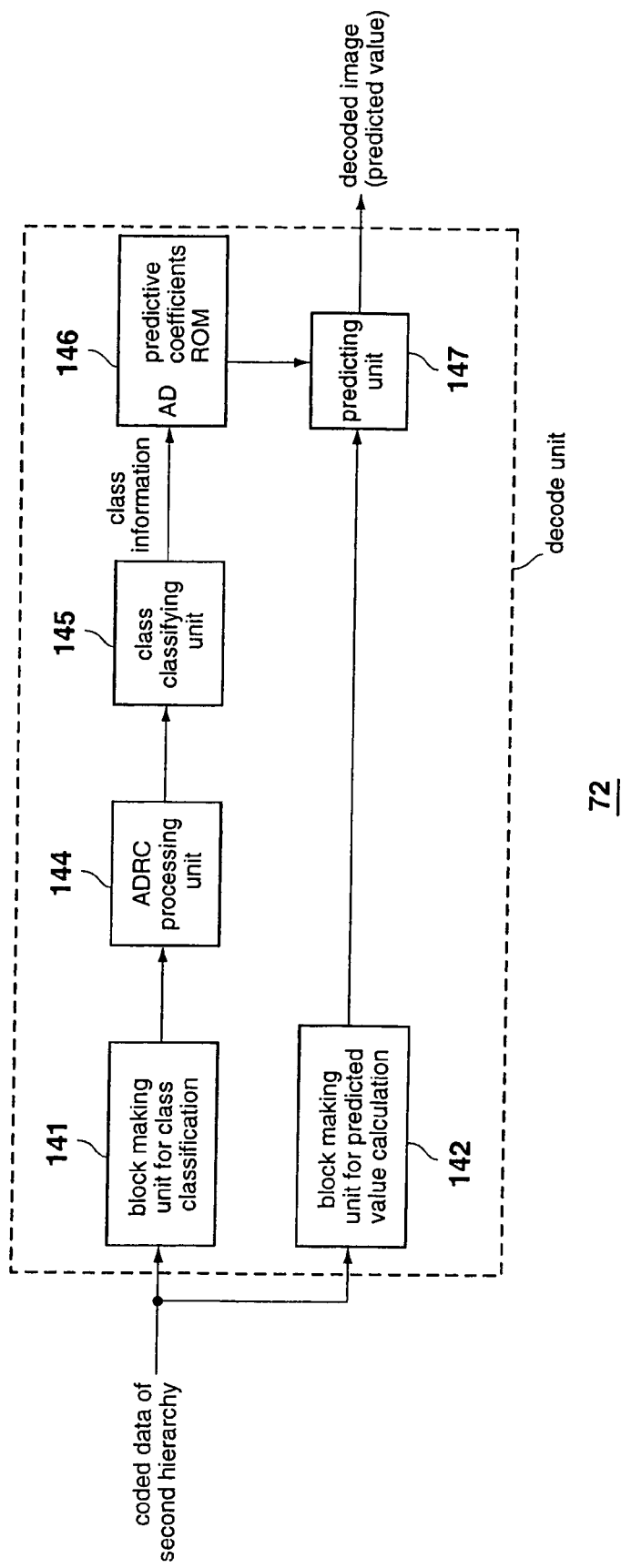
FIG. 23 is a block diagram for showing another structural example of the decoding unit 80 shown in FIG. 19.

As a consequence of using the local decoding unit shown in FIG. 21, either the predicting unit 72 or the predicting unit 73 shown in FIG. 19 or FIG. 20 may be such as not to employ either the separating unit 81 or the separating unit 221. In addition, the decoding unit 80 of FIG. 19 (similar to decoding units 222 and 223 of FIG. 20) should be arranged as shown in FIG. 23. In other words, in this case, the decoding unit 80 may include the class classification block making unit 41, the predicted value calculation block making unit 42, the ADRC processing unit 44, the class classifying unit 45 and the prediction coefficient ROM 88 employed in the local decoding unit 22 shown in FIG. 21; or the decoding unit 80 may include the class classification block making unit 141, the predicted value calculation block making unit 142, the ADRC processing unit 144, the class classifying unit 145, the prediction coefficient ROM 146, or the predicting unit 147, which correspond thereto in the predicting unit 89.

It should be understood that, as previously discussed with reference to FIG. 9, the prediction coefficients are successively calculated to thereby obtain the prediction values, which will be referred to as a "sequential method", whereas as previously discussed with reference to FIG. 21, the prediction coefficients for each class are previously stored in the prediction coefficient ROM 88, and these stored prediction coefficients for each class are used to obtain the prediction value, which will be referred to as an "ROM method".

Figure 40:
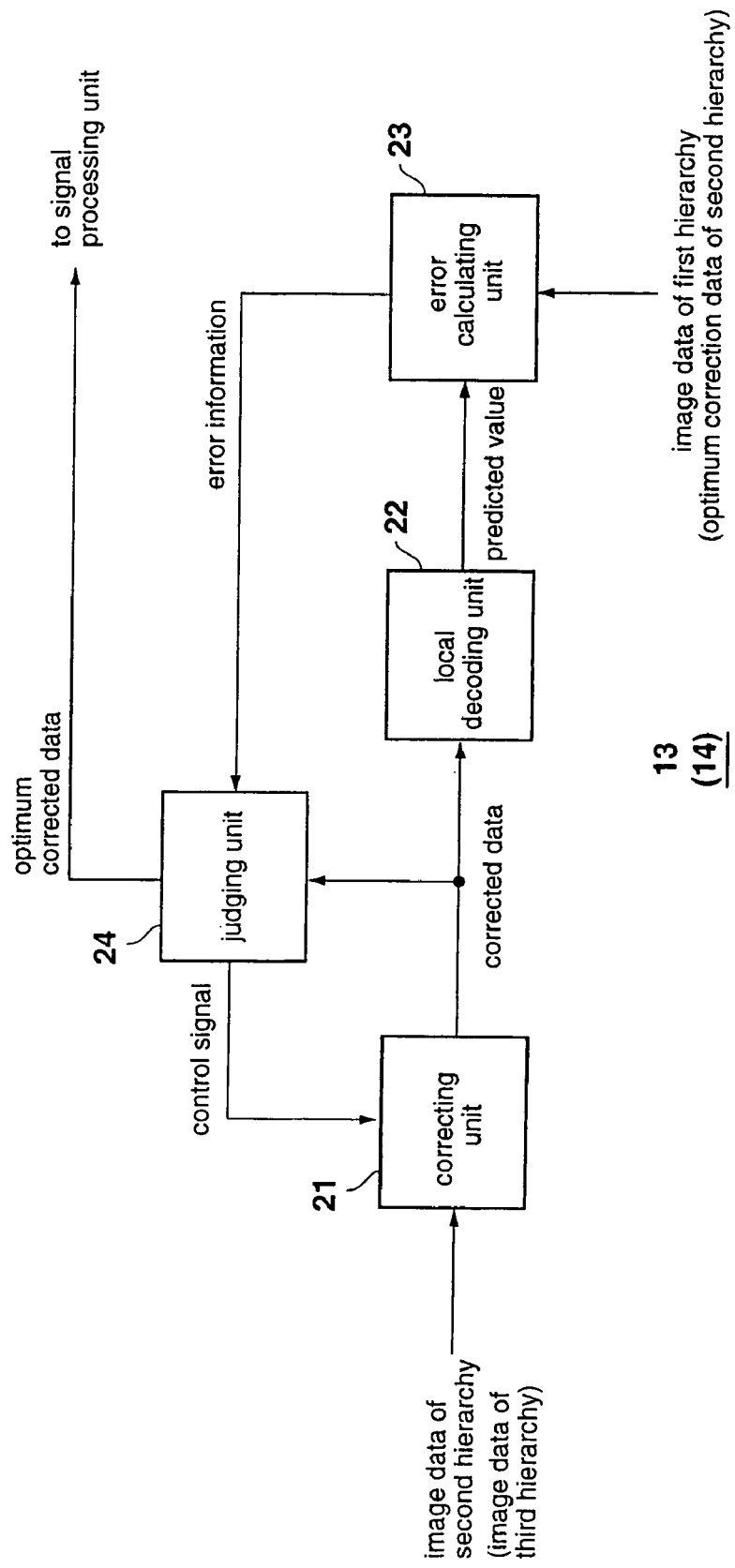
FIG. 40 is a block diagram showing another alternate embodiment of an optimum corrected data unit.

In accordance with a third embodiment of a transmitting apparatus 1 of the invention, as shown in FIG. 40, an optimum correction data calculating unit 13 is provided for use with the local decoding unit 22 shown in FIG. 21. Referring to FIG. 40, in this further embodiment, in the transmitting apparatus 1 (FIG. 2), the image data of the first hierarchy need not be supplied to the local decoding unit 22'. Further, unlike the optimum corrected data calculating unit 13 shown in FIG. 5, with the FIG. 40 optimum correction data calculating unit 13, the prediction coefficients for each class are not provided to the signal processing unit. Furthermore, the image data of the first hierarchy (or the optimum corrected data of the second hierarchy) is not needed by the local decoding unit and, thus, is not provided thereto.

Figure 41:
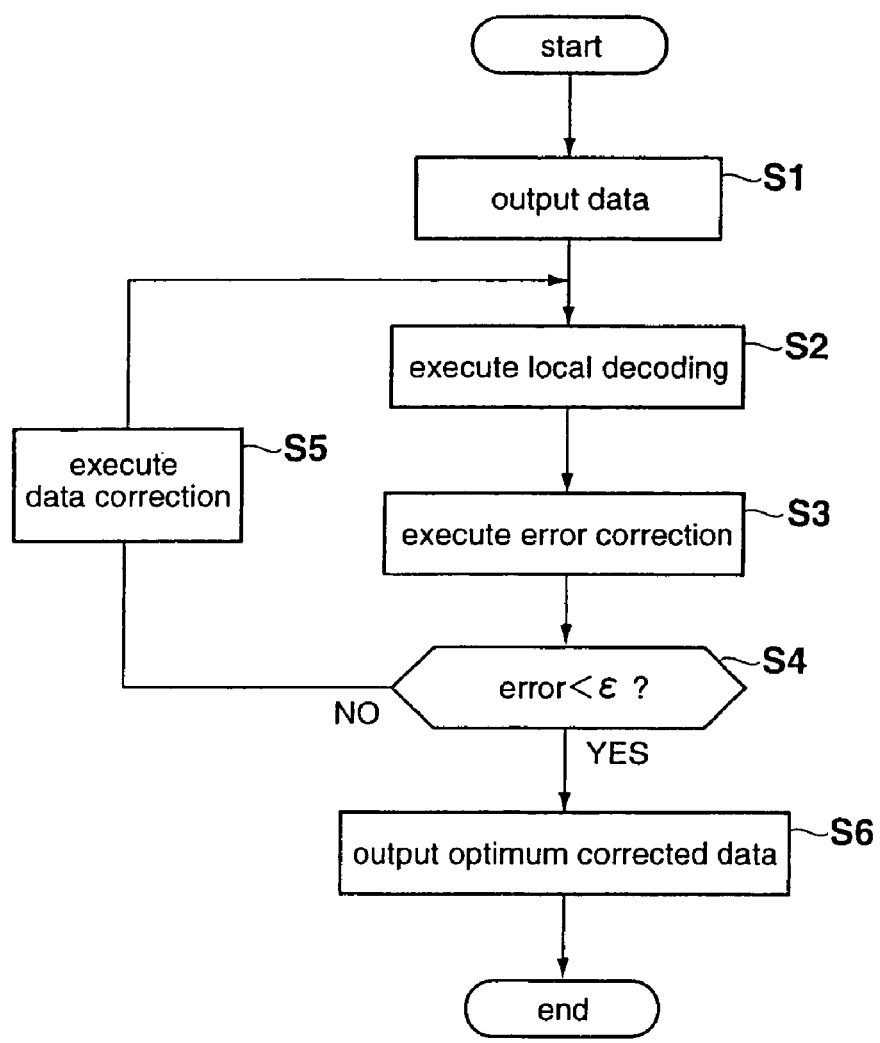
FIG. 41 is a flow chart describing operations of the optimum corrected data calculating unit of FIG. 40.

FIG. 41 is a flowchart that illustrates the processing performed by the optimum corrected data calculating unit 13' of FIG. 40. Referring to FIG. 41, the flowchart is similar to the flowchart of FIG. 6, except that at step S6' (as opposed to step S6 in FIG. 6) of the FIG. 40 flowchart, while the optimum corrected data as the coded data is output, the predictive coefficients for each class are not output.

Figure 42:
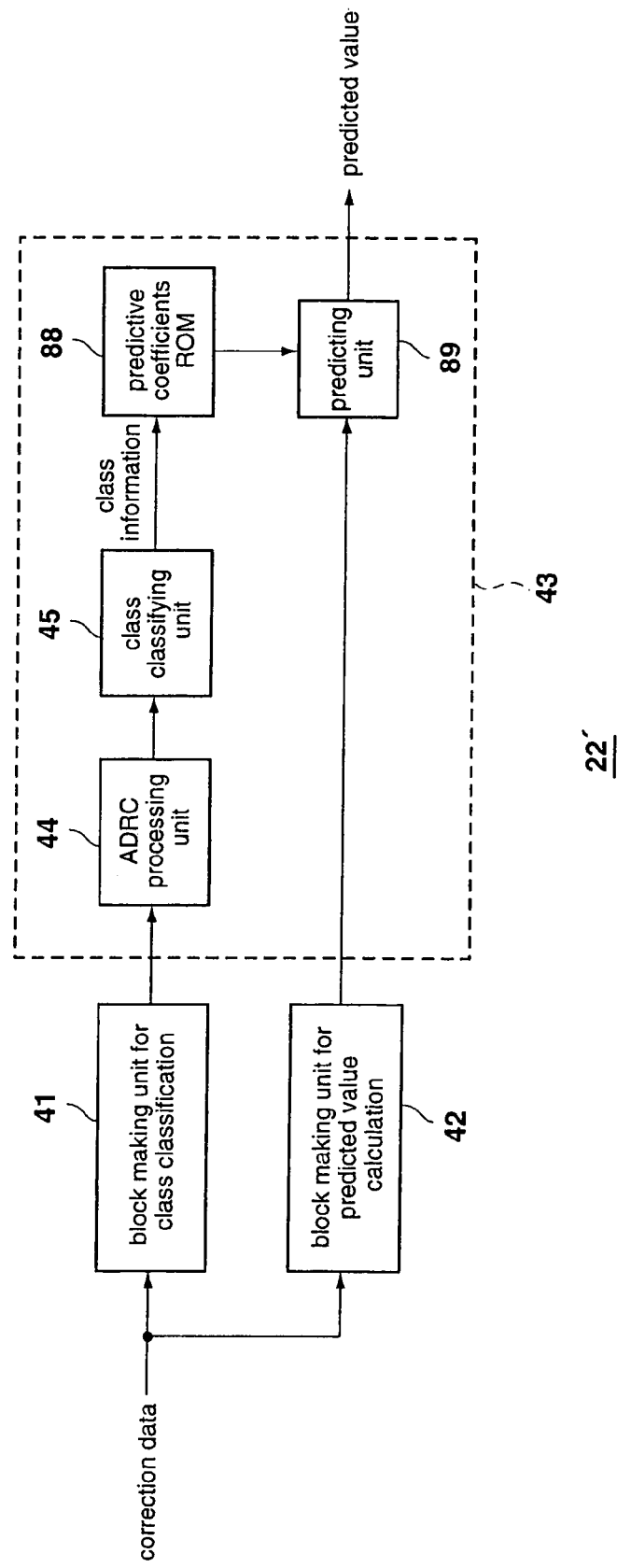
FIG. 42 is a block diagram showing an alternate embodiment of a local decoding unit.

FIG. 42 illustrates the local decoding unit 22 of the FIG. 40 optimum corrected data calculating unit 13. The local decoding unit 22 illustrated in FIG. 42 is similar to the local decoding unit 22 illustrated in FIG. 21, except that the predictive coefficients are not provided outside the local decoding unit 22.

Figure 43:
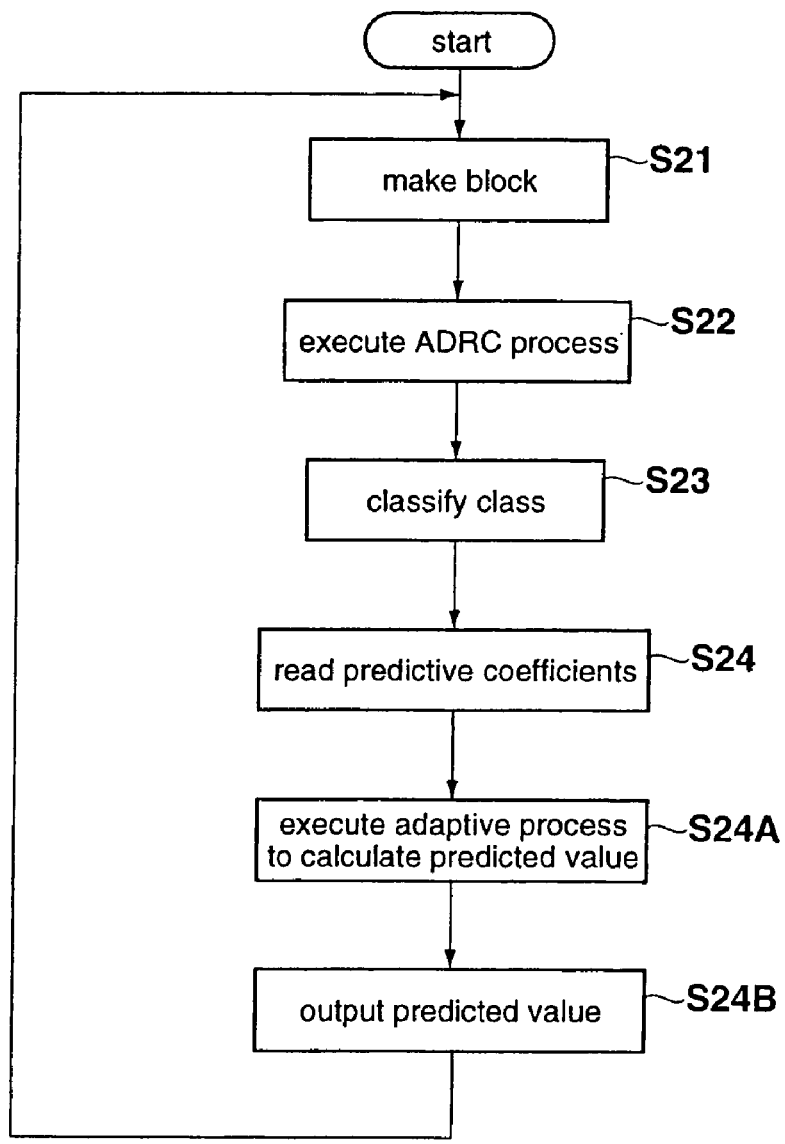
FIG. 43 is a flow chart describing operations of the local decoding unit of FIG. 42.

FIG. 43 illustrates a procedure for operating the local decoding unit 22' shown in FIG. 42. The FIG. 43 flowchart is very similar to the flowchart of FIG. 13 that illustrates the operation of the FIG. 9 local decoding unit. For example, steps S21–S23 are identical. However, at step S24, the predictive coefficients for the classified class are read from the predictive coefficients ROM 88. Then, at step S24A, the predicting unit 89 executes an adaptive process to calculate predicted values. At step S24B, the predicted values are output.

Figure 44:
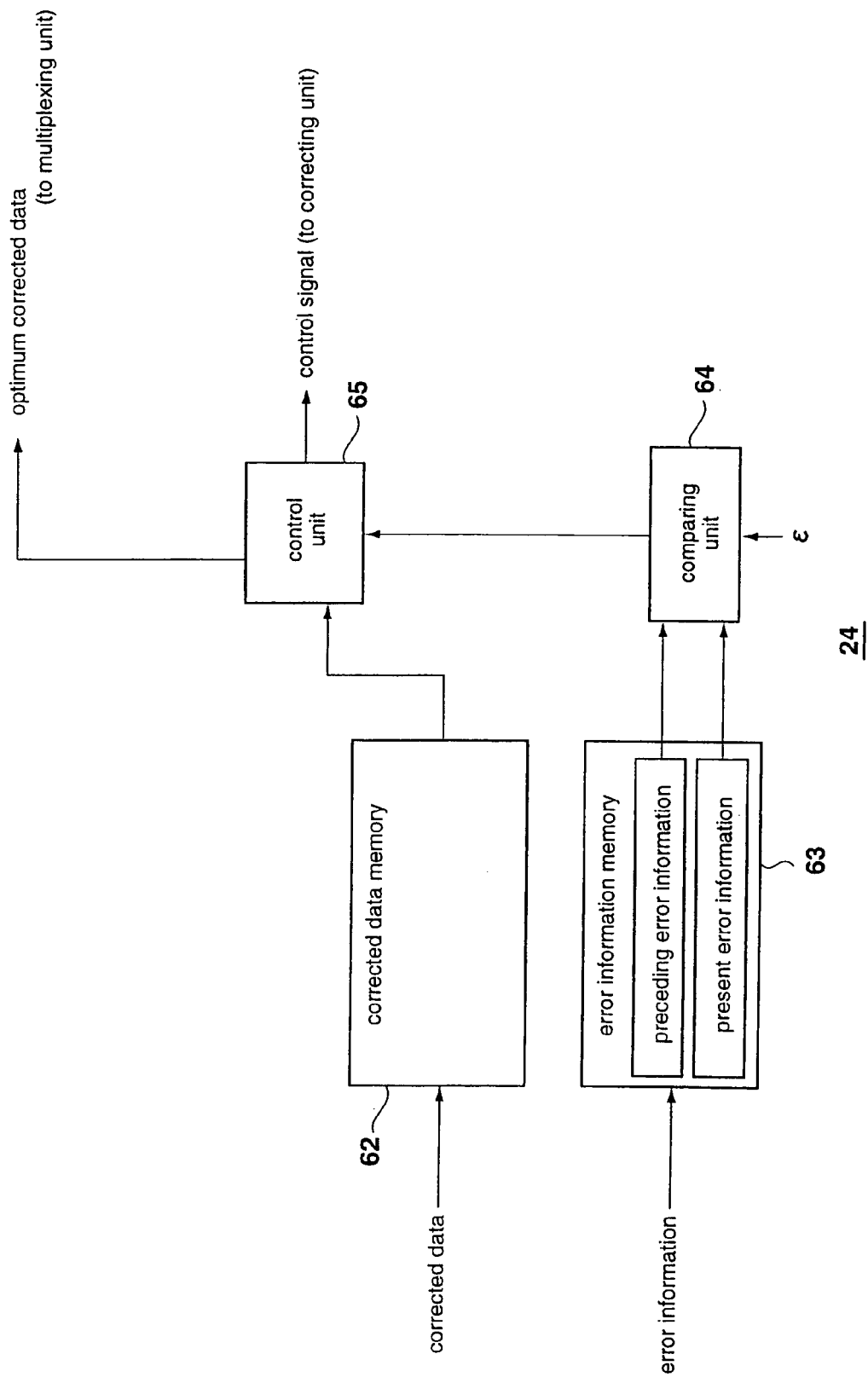
FIG. 44 is a block diagram of a determining unit 24.

FIG. 44 illustrates the judging unit 24 of the FIG. 42 local decoding unit. The FIG. 44 judging unit 24 differs from the FIG. 24 judging unit 24 in that the FIG. 44 judging unit 24 does not include a prediction coefficient memory 61. Likewise, the FIG. 44 judging unit 24 does not provide prediction coefficients to the multiplexing unit.

Figure 45:
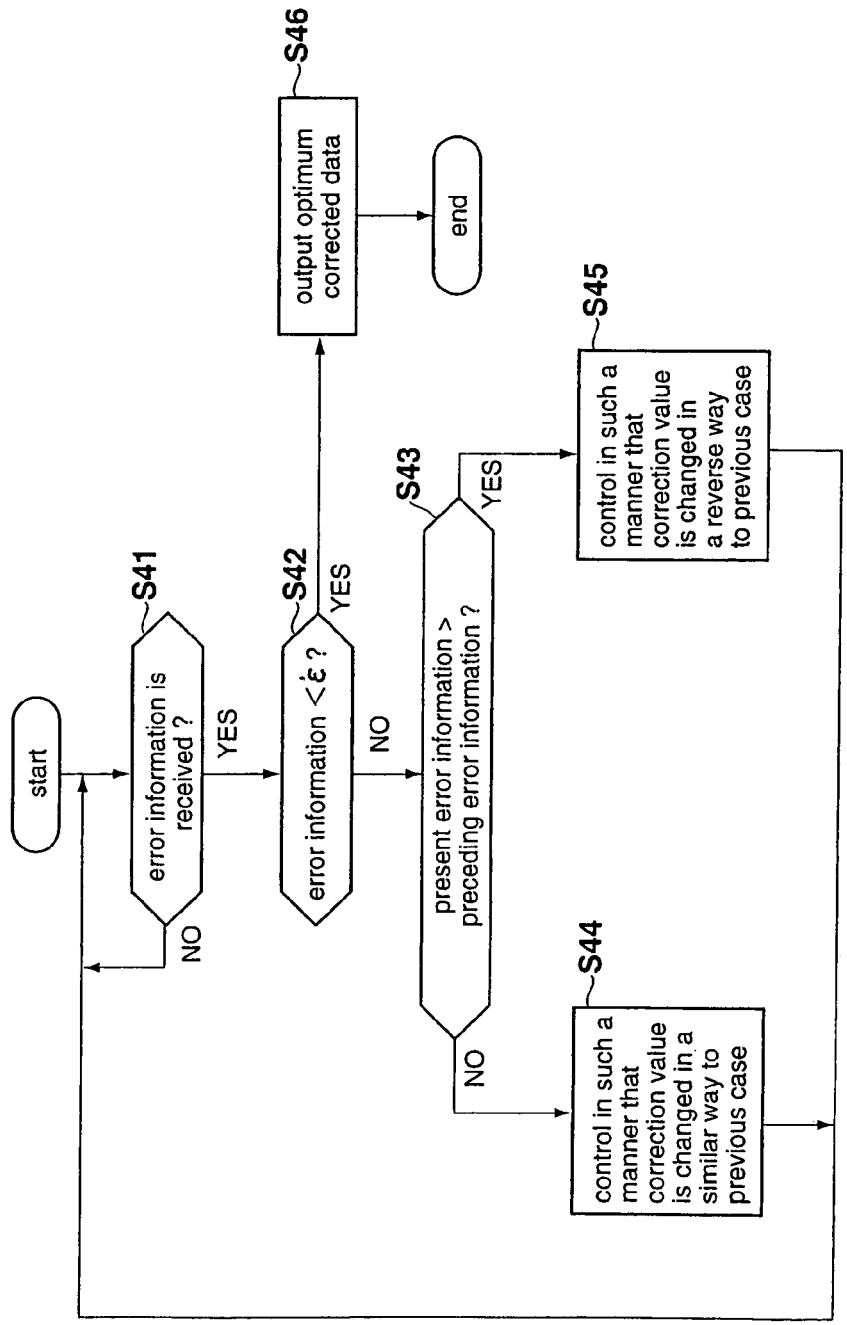
FIG. 45 is a flow chart describing operations of the determining unit 24.

FIG. 45 is a flowchart illustrating the operation of the FIG. 44 judging unit 24 of the FIG. 42 local decoding unit. The FIG. 45 flowchart is similar to the FIG. 17 flowchart (which illustrates the operation of the FIG. 16 judging unit, except that at step S46, the prediction coefficients for each class (which are not generated by the FIG. 44 judging unit) are not output.

Figure 46:
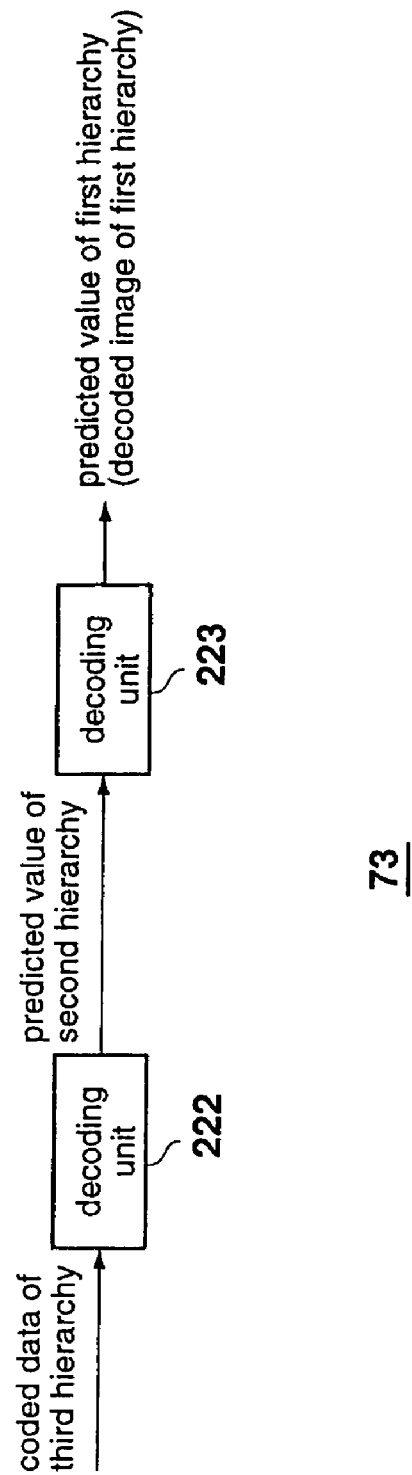
FIG. 46 is a block diagram of an alternate embodiment of a predicting unit.

FIG. 46 illustrates a predicting unit for third hierarchy for use in the receiving apparatus 4 that is complementary to the third embodiment transmitting apparatus discussed above. In particular, as can be seen from FIG. 46, no corrected data or prediction coefficients for each class are passed between the decoding unit 222 and the decoding unit 223. Rather, the decoding unit 222 receives coded data of the third hierarchy, and provides to the decoding unit 223 predicted values of the second hierarchy. From the predicted values of the second hierarchy, the decoding unit 223 determines predicted values of the first hierarchy (which, in fact, is the decoded image of the first hierarchy).

Figure 24:
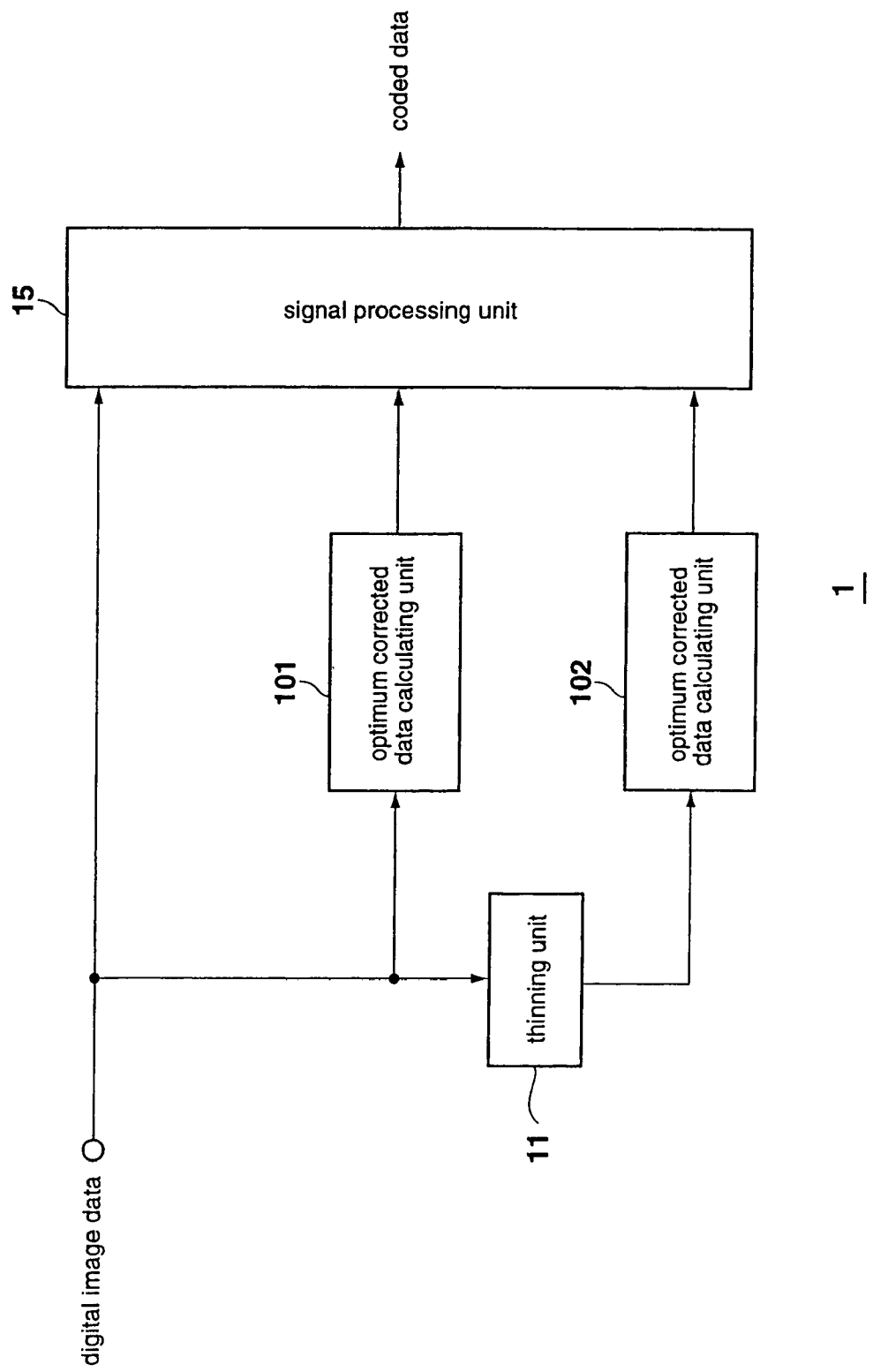
FIG. 24 is a block diagram for indicating an arrangement of the transmitter apparatus 1 of FIG. 1, according to a second embodiment.

FIG. 24 illustrates a fourth embodiment of the transmitting apparatus 1 shown in FIG. 1. It should be noted that the same reference numerals shown in FIG. 2 are employed as those for denoting the same or similar components of FIG. 24.

In the FIG. 24 embodiment, only the image data of the first hierarchy is supplied to an optimum corrected data calculating unit 101, and then optimum corrected data of a second hierarchy is calculated from the image of the first hierarchy wherein. Then, this calculated optimum correction data of the second hierarchy is supplied as coded data of the second hierarchy to a signal processing unit 15. Only image data of the second hierarchy outputted from a thinning unit 11 is supplied to an optimum corrected data calculating unit 102, in which optimum corrected data of a third hierarchy is calculated from the image data of the second hierarchy. Then, this calculated optimum corrected data of the third hierarchy is supplied as coded data of a third hierarchy to the signal processing unit 15.

Figure 25:
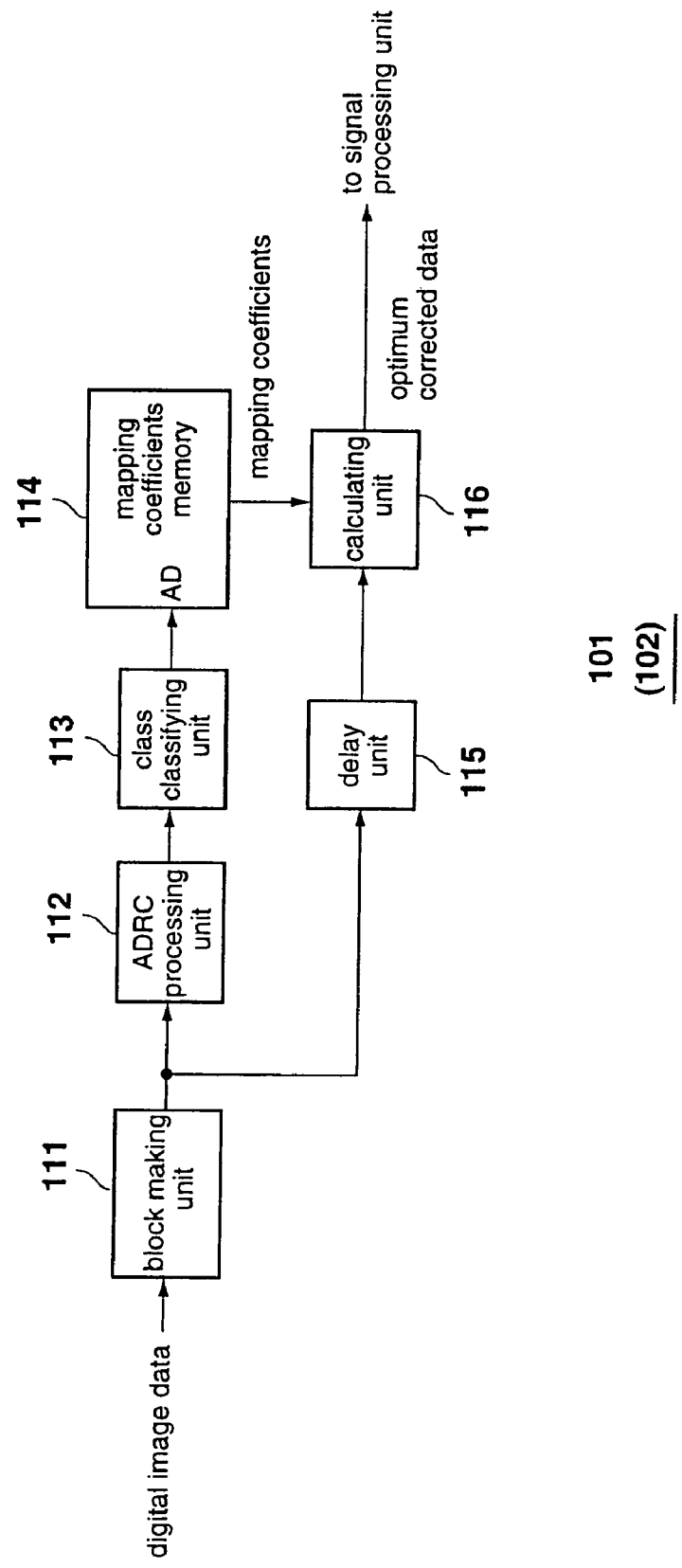
FIG. 25 is a block diagram for indicating a structural example of the optimum correction data calculating unit 101 (102) of FIG. 24.

Next, FIG. 25 represents an example of an arrangement of the optimum correction data calculating unit 101 shown in FIG. 24. Since this optimum correction data calculating unit 102 is arranged similar to the optimum correction data calculating unit 101, the explanation thereof is omitted.

The image data of the first hierarchy (image data of second hierarchy, in case of optimum corrected data calculating unit 102) is provided to a block making unit 111. The block making unit 111 processes the image data of the first hierarchy to make a class classifying block centered about the noted pixel which is a unit for classifying this image data of the first hierarchy into a predetermined class, depending upon its nature, and thus supplies the image block to an ADRC processing unit 112 and to a delay unit 115.

The ADRC processing unit 112 executes an ADRC processing operation for the block (class classifying block) derived from the block making unit 111, and thereafter supplies the resulting block constituted by an ADRC code to a class classifying unit 113.

The class classifying unit 113 executes a class classifying process operation for classifying the block outputted from the ADRC processing unit 112 into a predetermined class, depending upon a nature thereof, and then supplies such information for indicating that this block belongs to any class as class information to a mapping coefficient memory 114.

As will be discussed later, the mapping coefficient memory 114 stores therein the mapping coefficients obtained from learning operations (mapping coefficient learning) every class information. While using the class information supplied from the class classifying unit 113, the mapping coefficients stored at this address are read out from this memory 111 to be supplied to a calculating unit 116.

The delay unit 115 delays the block supplied from the block making unit 111 until the mapping coefficients corresponding to the class information of this block is read out from the mapping coefficients memory 114, and then supplies the delayed block to the calculating unit 116.

The calculating unit 116 performs a predetermined calculation by employing the pixel values of the pixels for constructing the block supplied from the delay unit 115, and further, the mapping coefficient corresponding to the class of this block, which is supplied from the mapping coefficient memory 114. From these, the coded data is calculated, which is obtained by thinning (or reducing) the pixel number of this image to code this image. In other words, the calculating unit 116 calculates a preselected function value "f" ($y_1$, $Y_2$, - - -, $k_1$, $k_2$, - - -), while using the following values as arguments. That is, the pixel values of the respective pixels for constructing the block outputted from the block making unit 111 are $y_1$, $y_2$, - - -, and the mapping coefficients corresponding to the class of this block, which are outputted from the mapping coefficient memory 114 are $k_1$, $k_2$, - - - . This calculated function value " f" ($y_1$, $y_2$, - - -, $k_1$, $k_2$, - - -) is outputted as, for instance, a pixel value of a center pixel among the pixels for constructing the block (class classifying block) outputted from the block making unit 111.

Accordingly, assuming now that the number of pixels for constructing the class classifying block outputted from the block making unit 111 is equal to N pixels, the calculating unit 16 thins the image data by 1/N, and outputs the 1/N-thinned data as the coded data.

It should be understood that the coded data output from the calculating unit 116 is not such data which is produced by extracting the center pixel of the block arranged by the N pixels, namely produced by executing a simple thinning process operation, but, as previously described, is equal to the function value "f" ($y_1$, $y_2$, - - -, $k_1$, $k_2$, - - -) defined by the N pixels for constituting this block. In other words, this function value "f" ($y_1$, $y_2$, - - -, $k_1$, $k_2$, - - -) determines an optimum value. That is, the pixel value of the central pixel in the block, which is obtained from the simple thinning process operation, is corrected as the optimum value capable of obtaining the original image data based on the pixel values located around this central pixel. Accordingly, the data obtained by calculating the mapping coefficients and the pixels for constituting the block may be referred to as "optimum correction data".

Also, the calculation process executed in the calculating unit 116 may be conceived as such a process operation for mapping the pixel values of the respective pixels for constituting the class classifying block outputted by the block making unit 111 into the function "f" ($y_1$, $y_2$, - - -, $k_1$, $k_2$, - - -). Accordingly, the coefficients $k_1$, $k_2$, - - -, used in such a process operation will be referred to as "mapping coefficients".

Figure 26:
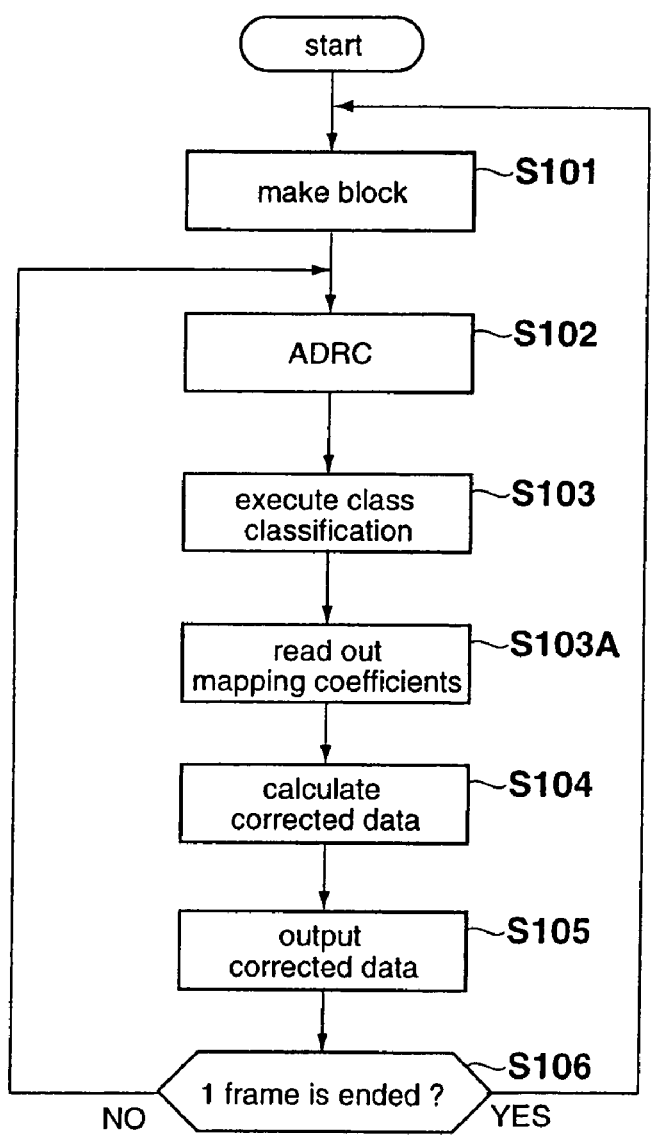
FIG. 26 is a flow chart for explaining operations of the optimum correction data calculating unit 101 of FIG. 25.

Referring now to a flow chart of FIG. 26, operations of the process operation will be explained.

The image data of the first hierarchy is supplied in units of one frame (for example) to the block making unit 111. In the block making unit 111, at step S101, the image of the first hierarchy for one frame is processed to make the class classifying block. That is, for example, as indicated in FIG. 10 by the pixels surrounded by a rectangular, the block making unit 111 subdivides the image data into the class classifying block constituted by 9 pixels centered about the noted pixel (3×3 pixels along transverse direction and longitudinal direction), and successively supplies this class classifying block to the ADRC processing unit 112 and the delay unit 115.

In this case, the class classifying block is arranged by the square-shaped block made of 3×3 pixels. Alternatively, the shape of this class classifying block is not limited to the square shape, but may be made from, for instance, a rectangular, a cross-shape, and other arbitrary shapes. Also, a total number of pixels for constituting the class classifying block is not limited to 9 pixels (namely, 3×3 pixels). Furthermore, the class classifying block need not be adjoining pixels, but may be alternatively arranged by such pixels located apart from each other. It should be noted that the shape and the pixel quantity of the class classifying block must be made coincident with the shape and pixel quantity of the class classifying block used during the learning operation (i.e., the mapping coefficient learning operation, which is discussed later in this specification).

At step S102, upon receipt of the class classifying block from the block making unit 111, the ADRC processing unit 112 executes the ADRC process operation of one bit with respect to this block, so that a block of pixels expressed by one bit results. The class classifying block which has been ADRC-processed is furnished to the class classifying unit 113.

In the class classifying unit 113, at step S103, the class classifying block derived from the ADRC processing unit 112 is classified into a class, and thus the resultant class information is supplied as an address to the mapping coefficient memory 114. As a consequence, at step S103A, the mapping coefficients corresponding to the class information furnished from the class classifying unit 113 are read out from the mapping coefficient memory 114 and then is supplied to the calculating unit 116.

On the other hand, in the delay unit 115, the class classifying block derived from the block making unit 111 is delayed, and the delayed class classifying block is supplied, while waiting for the mapping coefficients corresponding to the class information of this block are read out from the mapping coefficient memory 114. At step S104, in the calculator 116, the above-described function "f(●)" (symbol "●" appearing in this function "f" indicates a set of pixel values $y_1$, $y_2$, - - -, and mapping coefficients $k_1$, $k_2$, - - -) is calculated based upon the pixel values of the respective pixels for constituting the class classifying block derived from the delay unit 115, and also based upon the mapping coefficients read out from the mapping coefficient memory 114. Thus, it is possible to calculate an optimum corrected data produced by correcting the pixel value of the central pixel of the class classifying block to generate an optimum pixel value. This optimum corrected data is outputted as the coded data of the second hierarchy to the signal processing unit 15 (FIG. 24) at step S105.

Then, at step S106, a judgment is made as to whether the processing for the image data of the first hierarchy for one frame has been accomplished. At step S106, when it is judged that the process operation for the image data of the first hierarchy for one frame is not yet completed, processing returns to the previous step S102, at which the process operation defined after the step S102 is repeated for the next class classifying block. On the other hand, when it is judged at step S106 that the process operation for the image data of the first hierarchy for one frame is completed, the process operation is returned to the step S101, at which the process operation defined after the step S101 is repeated for the next frame.

Figure 27:
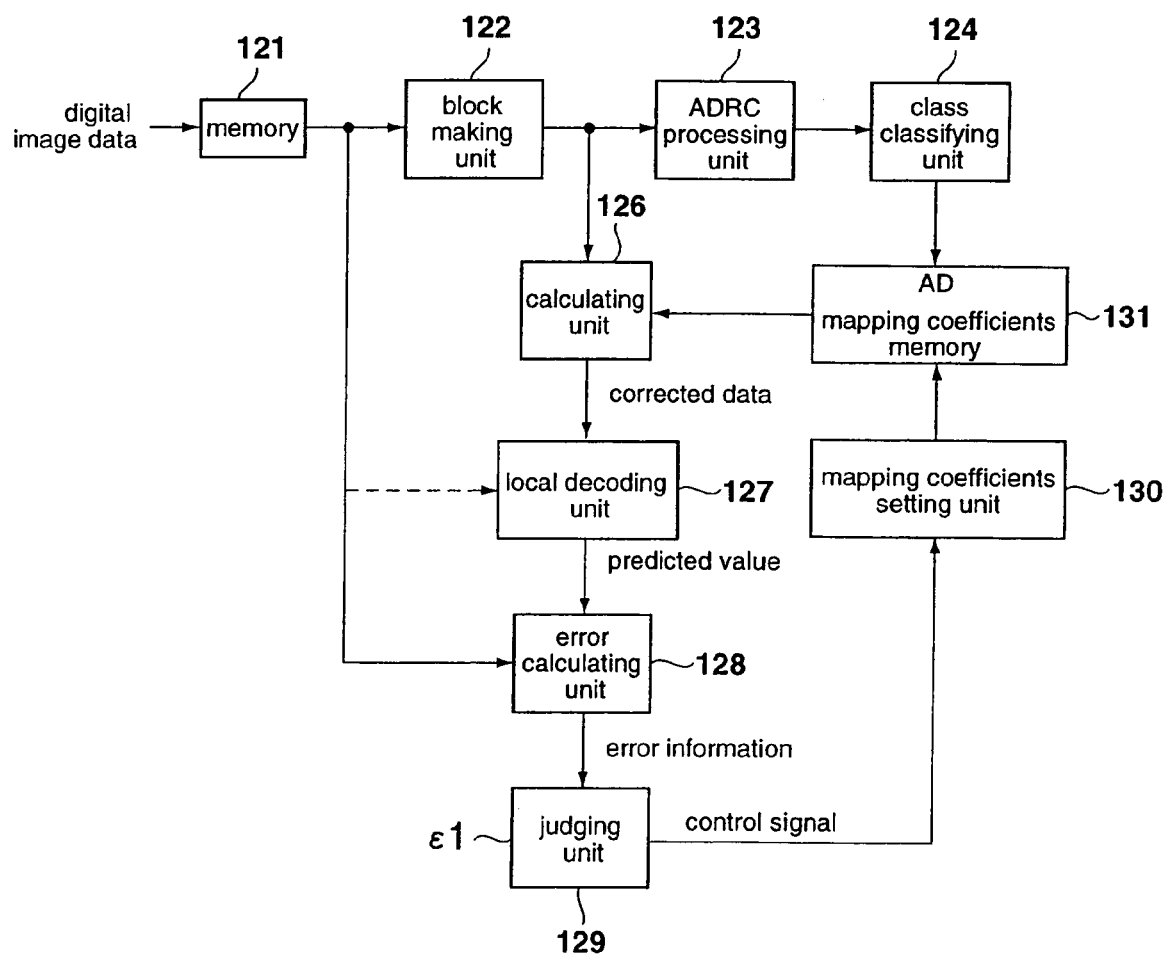
FIG. 27 is a block diagram for showing an arrangement of an image processing apparatus, according to a first embodiment, for performing the learning operation used to obtain the mapping coefficient.

Next, FIG. 27 indicates a structural example of an image processing apparatus for executing a learning (mapping coefficient learning) process operation used to calculate the mapping coefficients stored in the mapping coefficient memory 114 (FIG. 25).

In the memory 121, the image data of the first hierarchy for more than one frame, which is suitable for the learning process (will be referred to as a "learning image" hereinafter) is stored. It should be noted that the mapping coefficients stored in the mapping coefficient memory 114 for constituting the optimum correction data calculating unit 102 (FIG. 24) are calculated, the image data of the second hierarchy is stored in the memory 121.

A block making unit 122 reads the image data stored in the memory 121 and generates a class classifying block like that output from the block making unit 111 shown in FIG. 25, and then supplies the block to an ADRC processing unit 123 and a calculating unit 126.

The ADRC processing unit 123 and the class classifying unit 124 execute operations similar to that of the ADRC processing unit 112 and the class classifying unit 112 (FIG. 25), respectively. As a result, the class information of the block output from the block making unit 122 is output from the class classifying unit 124. Then, this class information is supplied as an address to the mapping coefficient memory 131.

The calculator 126 performs the same calculation as that of the calculating unit 116 of FIG. 25 by employing the pixels for constituting the block supplied from the block making unit 122, and also the mapping coefficients supplied from the mapping coefficient memory 131. Thus, the calculator 126 supplies the resultant correction data (function "f" (●)) to the local decoding unit 127. (The local decoding unit 127 may be any one of the local decoding device shown in FIGS. 9, 21 and 42.)

Based upon the corrected data supplied from the calculating unit 126, the local decoding unit 127 predicts (calculates) a predicted value of an original learning image data (namely, predicted value of pixel values of pixels for constructing block output from block making unit 122) in accordance with the above-described ROM method (i.e., "sequential method"), and then supplies the predicted value to an error calculating unit 128. In the case of use of the sequential method, image data of learning from the memory 12 is provided to the local decoding unit (FIG. 7). The error calculating unit 128 reads a pixel value (true value) of a learning image data corresponding to the predicted value supplied from the local decoding unit 127, calculates (detects) a prediction error of the predicted value with respect to the pixel value of this learning image data, and then supplies this calculated prediction error as error information to a judging unit 129.

The judging unit 129 compares the error information supplied from the error calculating unit 128 with a predetermined threshold value "ϵ1", and then controls a mapping coefficient setting unit 130 in accordance with this comparison result. Under control of the judging unit 129, the mapping coefficient setting unit 130 sets (changes) a set of mapping coefficients, the number of which is identical to the number of classes obtained by the class classifying unit 124, and then supplies the changed set of the mapping coefficients to a mapping coefficient memory 131.

The mapping coefficient memory 131 temporarily stores therein the mapping coefficients for each class supplied from the mapping coefficient setting unit 130. It should be understood that the mapping coefficient memory 131 has storage regions capable of storing mapping coefficients (set of mapping coefficients). The number of storage regions is equal to the number classes to be classified in the class classifying unit 124. In each of the storage regions, when new mapping coefficients for each class are supplied from the mapping coefficient setting unit 130, this new mapping coefficients for each class are preferably stored therein in place of the previously stored mapping coefficients for each class.

Also, the mapping coefficient memory 131 reads the mapping coefficients stored at the address corresponding to the class information supplied from the class classifying unit 124, and then supplies the read mapping coefficients to the calculating unit 126.

Figure 28:
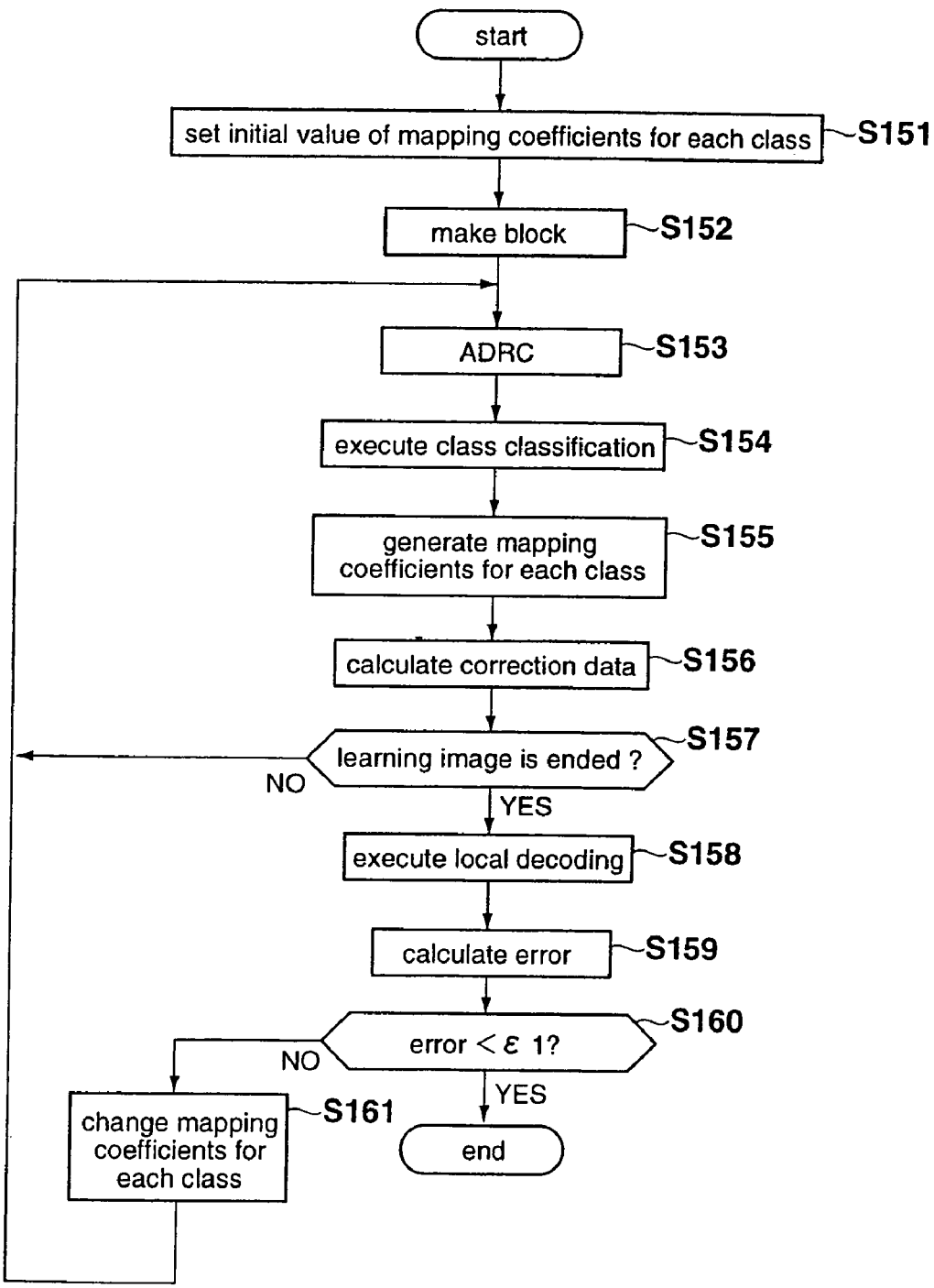
FIG. 28 is a flow chart for explaining operations of the image processing apparatus of FIG. 27.

Referring now to a flow chart shown in FIG. 28, operations thereof will be explained.

First, at step S151, the mapping coefficient setting unit 130 sets a set of initial values of the mapping coefficients by only the number equal to the classes to be classified in the class classifying unit 124, and then supplies the set of these initial values to the mapping coefficient memory 131. In this mapping coefficient memory 131, the mapping coefficients for each class (initial value) derived from the mapping coefficient setting unit 130 is stored a the address of the corresponding class.

Then, at step S152, the block making unit 122 processes all of the learning images stored in the memory 121 to make blocks having 3×3 pixels centered about the noted pixel in a manner similar to that of the block making unit 111 shown in FIG. 25. Furthermore, the block making unit 122 reads out the block from the memory 121, and sequentially supplies the read block to the ADRC processing unit 123 and the calculating unit 126.

At step S153, similar to the processing operation of the ADRC processing unit 112 of FIG. 25, the ADRC processing unit 123 performs the ADRC processing operation of one bit for the block output from the block making unit 122, and then supplies the ADRC-processed block to the class classifying unit 124. At step S154, in the class classifying unit 124, a decision is made of a class of the block supplied from the ADRC processing unit 123, and this class information is supplied as an address to the mapping coefficient memory 131. As a consequence, at step S155, a mapping coefficients are read out from an address of the mapping coefficient memory 131, which corresponds to the class information supplied from the class classifying unit 124, and then the read mapping coefficients are supplied to the calculating unit 126.

At step S156, when the block is received from the block making unit 122, and also the mapping coefficients corresponding to the class of this block is received from the mapping coefficient memory 131, the calculating unit 126 calculates the above-explained function value "f(●)" by employing based on the mapping coefficients and the pixel values of the pixels of the block supplied from the block making unit 122. This calculation result is furnished to the local decoding unit 127 as the corrected data obtained by correcting the pixel value of the central pixel of the block supplied from the block making unit 122.

In other words, for instance, in FIG. 10, assuming now that the block of 3×3 pixels surrounded by the rectangle is outputted from the block making unit 122, the calculating unit 126 calculates corrected data produced by correcting the pixel values of the pixels denoted by symbol "●" in this drawing, and then outputs this calculated corrected data to the local decoding unit 127.

As a consequence, in the calculating unit 126, the number of pixels for constituting the learning image data is thinned by ⅑, and thus the thinned pixel number is supplied to the local decoding unit 127.

After the correction data is calculated at the step S156, processing continues at step S157, where a check is made as to whether the correction data for all of the learning image data stored in the memory 121 have been calculated. When it is judged at step S157 that the corrected data of all of the learning image data are not yet calculated, processing returns to the previous step S153. Then, the processing of steps S153 to S157 are repeated until the correction data about all of the learning image data is calculated.

When it is judged at step S157 that the correction data for all of the learning image data have been calculated (i.e., that a thinned image could be obtained which is produced by thinning all of the learning image data stored in the memory 121 by ⅑, the process operation is advanced to step S158, at which this ⅑-thinned image is local-decoded in the local decoding unit 127, so that a prediction value of the original learning image is calculated. It should be understood that this ⅑-thinned image is not equal to a thinned image produced by simply thinning the learning image by ⅑. Rather, the ⅑-thinned image is equal to another thinned image data obtained by calculating the mapping coefficients to acquire the pixel value. Then, the predicted value is supplied to the error calculating unit 128.

In the error calculating unit 128, the learning image is read out from the memory 121 at step S159, and then a prediction error of the predicted value supplied from the local decoding unit 127 with respect to this read learning image data is calculated. In other words, when the pixel value of the learning image data is expressed as "$Y_{ij}$", and the predicted value thereof outputted from the local decoding unit 127 is expressed as " ", error dispersion (namely, squared summation of error) "Q" indicated by the following formula is calculated in the error calculating unit 128. This error dispersion is supplied as error information to the judging unit 129.

$Q=(Y_{ij}-)^2$, where symbol "Σ" indicates a summation of all pixels of the learning image data.

Upon receipt of the error information from the error calculating unit 128, the judging unit 129 compares this error information with the preselected threshold value "ε1", and judges whether the error information is larger than the threshold value "ε1" at step S160. When it is judged at the step S160 that the error information is not less than the threshold value "ε1" (i.e., no recognition is made that the image constituted by the predicted value obtained in the local decoding unit 127 is substantially equal to the original learning image data), the judging unit 129 outputs a control signal to the mapping coefficient setting unit 130. At step S161, in response to the control signal derived from the judging unit 129, the mapping coefficient setting unit 130 changes the mapping coefficients for each class, and causes this changed mapping coefficients for each class to be newly stored into the mapping coefficient memory 131.

Then, the process operation is returned to the previous step S153, at which the process operations defined after step S153 are again repeated by employing the changed mapping coefficients for each class stored in the mapping coefficient memory 131.

Now, it should be understood that the mapping coefficients may be varied at random in the mapping coefficient setting unit 130. Alternatively, if the present error information becomes smaller than the preceding error information, the mapping coefficients may be changed in accordance with a trend similar to the preceding trend. Also, if the present error information becomes larger than the preceding error information, the mapping coefficients may be changed in accordance with a trend opposite to the previous trend.

Furthermore, the mapping coefficients may be changed as to all of the classes, or a portion of the classes. When only the mapping coefficients as to a portion of the classes is changed, for example, such a class capable of giving a strong influence to error information is detected, and then only such mapping coefficients may be varied. A class capable of giving a strong influence to error information may be detected as follows. First, the process operation is carried out by employing initial value of mapping coefficients to thereby obtain error information thereof. Thereafter, the mapping coefficients are changed by the same amount every one class, and the resulting error information is compared with the error information obtained when the initial values are employed. The class in which the comparison difference becomes not less than predetermined values may be detected as the class capable of giving the strong influence to the error information.

Also, if a plurality of mapping coefficients such as the above-described $k_{1, 2}$, - - - are set as one set, only the mapping coefficient capable of giving the strong influence to the error information among then may be changed.

Furthermore, in the above case, the mapping coefficients are set every class. Alternatively, the mapping efficients may be independently set with respect to, for instance, each of the blocks, or in unit of the adjoining blocks.

It should be noted that, for example, when the mapping coefficients are independently set every block, it is possible that plural sets of mapping coefficients are acquired with respect to a certain single class (conversely, it is possible that a class will occur where a set of mapping coefficient could not be obtained). Finally, since the mapping coefficients should be determined every class, as explained before, when plural sets of mapping coefficients are obtained as to a certain class, a certain process operation is carried out for the plural sets of mapping coefficients, so that one set of mapping coefficients must be determined.

On the other hand, when it is judged at the step S160 that the error information has become smaller than the threshold value "ε1", namely when a recognition is made that the image constituted by the predicted value obtained in the local decoding unit 127 is substantially identical to the original learning image data, the process operation is completed.

At this time, the mapping coefficients of every class, which have been stored in the mapping coefficient memory 131, are set into the mapping coefficient memory 114 of FIG. 25 as the optimum mapping coefficients capable of obtaining the corrected data by which the decoded image data (predicted value) recognizable as substantially the same image as the original image data can be reproduced.

As a consequence, in accordance with the optimum correction data obtained by using such a mapping coefficients, it is possible to obtain the image data substantially identical to the original image data.

As previously described, in the embodiment of FIG. 27, the image is subdivided into the block constituted by 9 pixels centered about the noted pixel (3×3 pixels) by the block making unit 122, whereas the ADRC processing operation of one bit is carried out for the image block in the ADRC processing unit 123. As a consequence, the number of classes obtained by the class classification by the class classifying unit 124 is equal to 512 (=$(2_1)_9$). Accordingly, 512 sets of mapping coefficients are obtained.

The FIG. 46 predicting unit 73 may be employed, as part of the receiving apparatus 4, for decoding the coded image data (more specifically, the coded image data of the third hierarchy) produced by the FIG. 24 transmitting apparatus.

Figure 29:
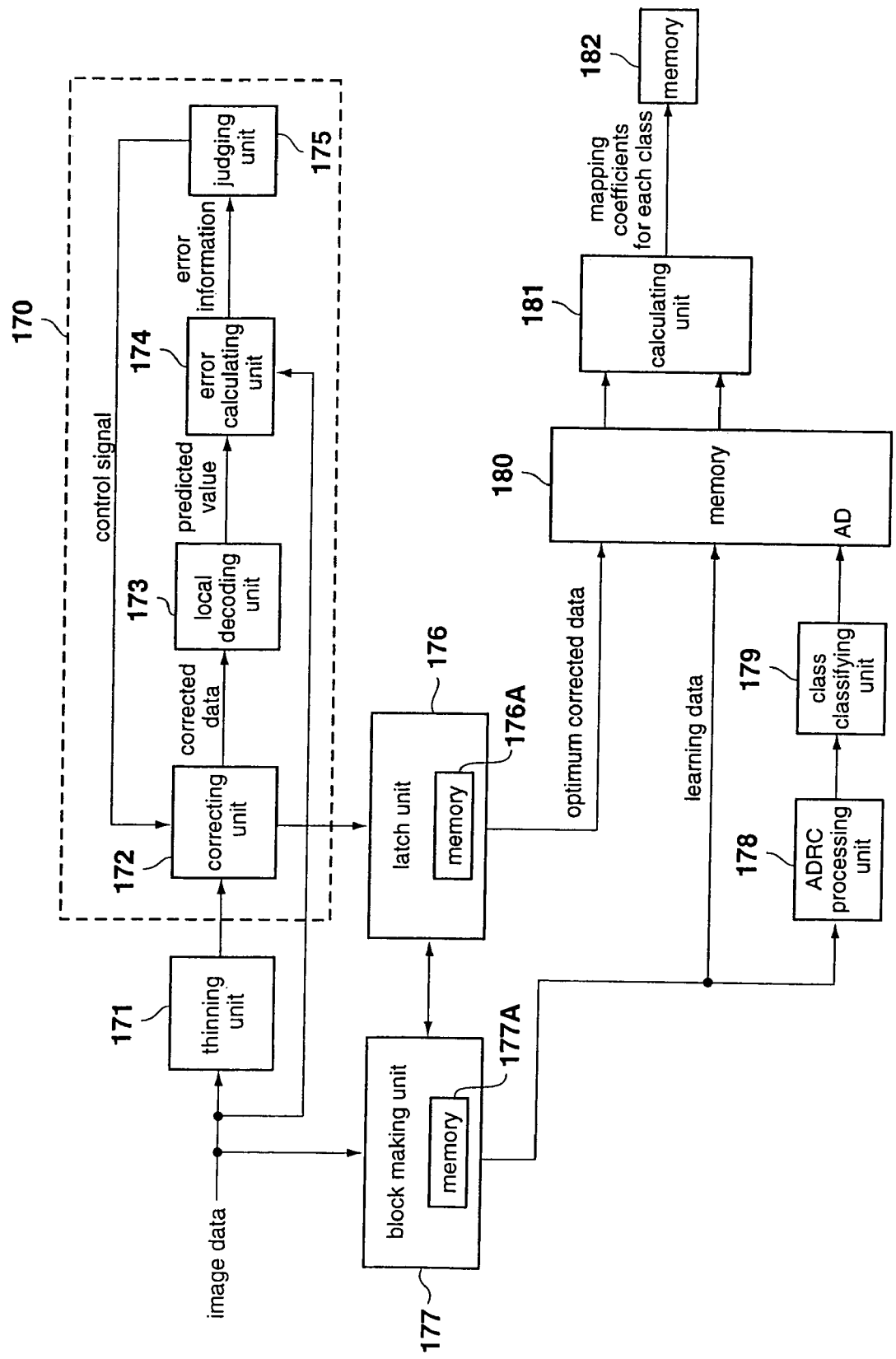
FIG. 29 is a block diagram for showing an arrangement of an image processing apparatus, according to a second embodiment, for performing the learning operation used to obtain the mapping coefficient.

FIG. 29 shows another structural example of an image processing apparatus for performing learning (mapping coefficients learning) process operation used to calculate the mapping coefficients stored in the mapping coefficient memory 114 of FIG. 25.

It should be noted that according to the image processing apparatus of FIG. 27, even when the function "f" is expressed by, for instance, a linear equation, and further the non-linear equation, and the secondary, or more equations, the optimum prediction coefficient may be obtained. On the other hand, in the image processing apparatus of FIG. 29, only when the function "f" is expressed by the linear equation may the optimum prediction coefficient be calculated.

In other words, the image processing apparatus of FIG. 29 may be used in the following case. That is, in FIG. 25, when the pixel values of the respective pixels for constituting the block made of 3×3 pixels output from the block making unit 111 are set to $y_1, y_2, ---, y_9$, and the mapping coefficients output from the mapping coefficient memory 114 are set to $k_1, k_2, k_3, ---, k_9$, the calculating unit 116 calculates the function "f" $(y_1, y_2, ---, k_1, k_2, ---)$ in accordance with the below-mentioned formula to obtain corrected data.

$$f(\bullet) = k_1 y_1 + k_2 y_2 + \bullet\bullet\bullet + k_9 y_9$$

Image data of a first hierarchy, functioning as a learning image data suitable for a learning purpose, is supplied in units of (for example) one frame to a thinning unit 171. In the thinning unit 171, the pixel number of the image data of the first hierarchy is thinned, so that image data of a second hierarchy is produced. It should be understood that when the mapping coefficients are calculated to be stored in the mapping coefficient memory 114 for later use by the optimum corrected data calculating unit 102 (FIG. 24), the image data of the second hierarchy is supplied to the thinning unit 171 so that the image data of the third hierarchy is formed.

The image data of the second hierarchy obtained in the thinning unit 171 is supplied to an optimum corrected data calculating unit 170. The optimum corrected data calculating unit 170 is arranged by a correcting unit 172, a local decoding unit 173, an error calculating unit 174 and a judging unit 175 (which are similar to the above-described correcting unit 21, local decoding unit 22, error calculating unit 23, and judging unit 24, respectfully—either of FIG. 5, FIG. 38 or FIG. 40). In this optimum corrected data calculating unit 170, the optimum corrected data as to the input image, namely, the image of the second hierarchy is produced and then is supplied to a latch unit 176. In the case of using the optimum corrected data calculating unit of FIG. 5, image data for learning is provided to the local decoding unit.

The latch unit 176 includes a memory 176A for storing therein the optimum corrected data supplied from the optimum corrected data calculating unit 170. Furthermore, the latch unit 176 reads out such an optimum corrected data corresponding to the central pixel of the block read from a memory 177A of a block making unit 177, among the optimum corrected data stored in the memory 176A. It should be noted that when the correction data for one frame is stored in the memory 176A, the latch unit 176A outputs to the block making unit 177 a control signal for indicating this data storage.

The same image data as the image data supplied to the thinning unit 171, namely the image data of the first hierarchy, is supplied to the block making unit 177 in units of one frame. The block making unit 177 contains a memory 177A for storing therein the learning image data supplied thereto. Upon receipt of the control signal sent from the latch unit 176, the block making unit 177 subdivides the learning image data stored in the memory 177A into a block constructed of 3×3 pixels, centered about the noted pixel, in a similar manner to that of the block making unit 111 of FIG. 25. Then, this block is sequentially read to be supplied to an ADRC processing unit 178 and a memory 180.

When the block is read from the memory 177A contained in the block making unit 177, the block making unit 177 supplies a control signal, indicative of a position of the block, to the latch unit 176. In the latch unit 176, the block of 3×3 pixels read from the memory 177A is recognized in response to this control signal, and then, as previously explained, the optimum correction data corresponding to the central pixel of this block is read from the memory 176A. That is, as a result, both a certain block having 3×3 pixels and the optimum correction data corresponding to this block are supplied at the same time to the memory 180.

The ADRC processing unit 178 and the class classifying unit 179 are similar to the ADRC processing unit 112 and the class classifying unit 113 of FIG. 25, respectively. Then, the class information about the block derived from the block making unit 177, output from the, class classifying unit 179, is supplied as the address to a memory 180.

The memory 180 stores therein the optimum corrected data supplied from the latch unit 176, and the block supplied from the block making unit 177, establishing a relationship of an address corresponding to the class information supplied from the class classifying unit 179. Note that in the memory 180, a plurality of information can be stored at one address. As a result, plural sets of both the optimum corrected data and the block corresponding to certain class information can be stored.

A calculating unit 181 reads out both the nine pixels $Y_1, Y_2, ---, y_9$ of the block of 3×3 pixels of the learning image, and the optimum corrected data y' corresponding to this block, stored in the memory 180. Then, the minimum square method is applied to them, so that the mapping coefficients $k_1$, to $k_9$ are calculated every class to be supplied to a memory 182. The memory 182 stores therein the mapping coefficients $k_1$ to $k_9$ every class supplied from the calculating unit 181 at the address corresponding to this class.

Figure 30:
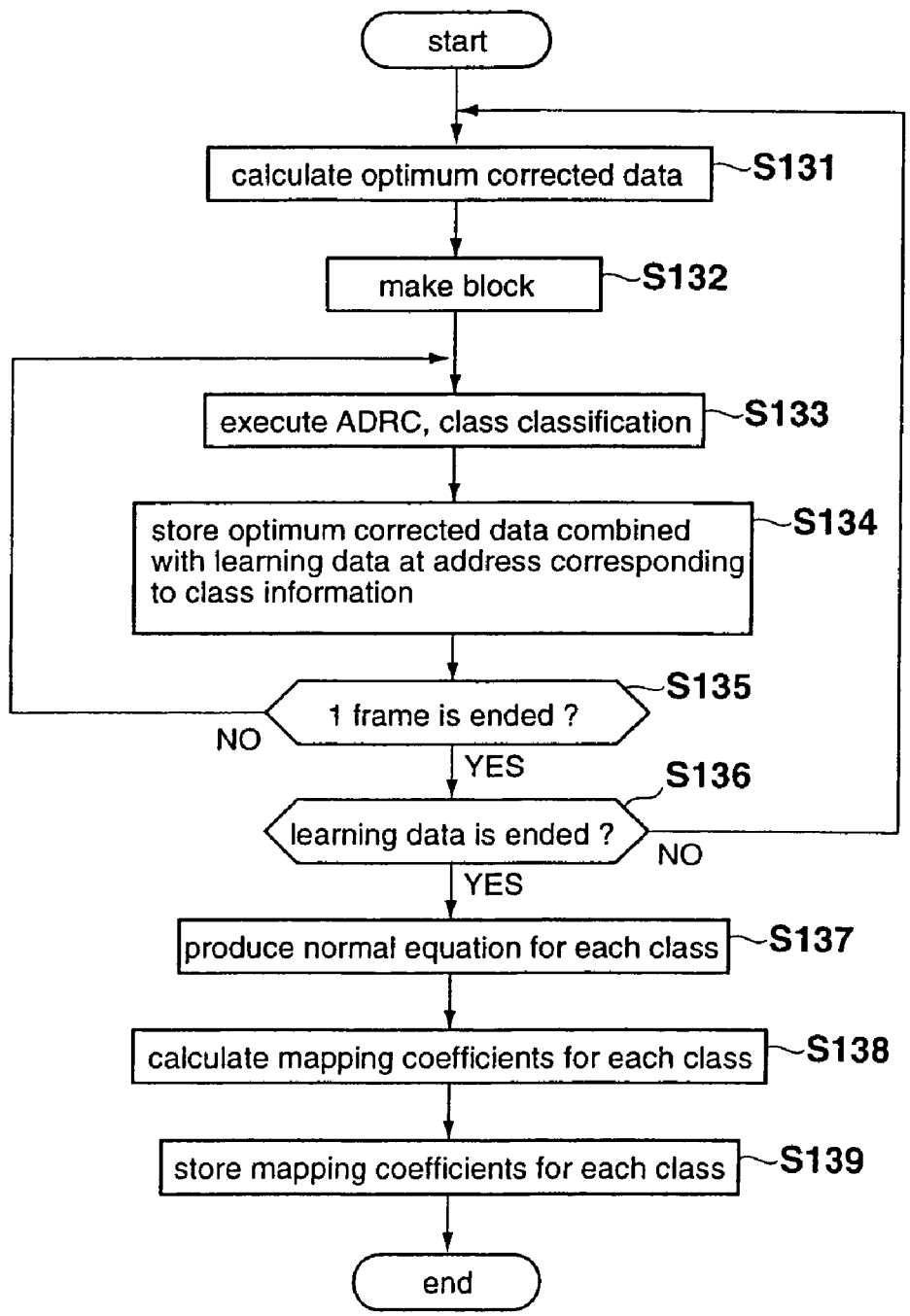
FIG. 30 is a flow chart for explaining operations of the image processing apparatus of FIG. 29.

Referring now to the flow chart shown in FIG. 30, operation of the FIG. 29 apparatus is described.

When the image data of the first hierarchy is inputted as the learning image data, this learning image data is stored in the memory 177A of the block making unit 177, and supplied to the thinning unit 171. In this thinning unit 171, the image data of the second hierarchy is formed from the image data of the first hierarchy, and then is supplied to the optimum corrected data calculating unit 170.

Upon receipt of the image data of the second hierarchy, the optimum corrected data calculating unit 170 calculates the optimum corrected data of the second hierarchy at step S131, and supplies the calculated optimum corrected data to the memory 176A of the latch unit 176 so as to be stored therein.

Then, when the optimum corrected data for one frame is stored in the memory 176A, the latch unit 176 outputs the control signal to the block making unit 177. Upon receipt of the control signal derived from the latch unit 176, at step S132, the block making unit 177 subdivides the learning image data stored in the memory 177A into the block constructed of 3×3 pixels. Then, the block making unit 177 reads out the block of the learning image data stored in the memory 177A, and supplies this read block to the ADRC processing unit 178 and the memory 180.

At the same time, when the block is read out from the memory 177A, the block making unit 177 supplies the control signal indicative of the position of this block to the latch unit 176. In response to the control signal, the latch unit 176 recognizes the block of 3×3 pixels read from the memory 177A, reads out the optimum corrected data corresponding to the central pixel of this block, and then supplies this read optimum corrected data to the memory 180.

Then, at step S133, the block derived from the block making unit 177 is ADRC-processed, and further, this block is class-classified in the class classifying unit 179. This classification result is supplied as the address to the memory 180.

At step S134, the memory 180 stores therein the optimum corrected data supplied from the latch unit 176, and the block (learning data) supplied from the block making unit 177 with having the corresponding relationship at the address corresponding to the class information supplied from the class classifying unit 179.

Then, the process operation is advanced to step S135, at which a check is done as to whether or not both the block for one frame and the optimum corrected data are stored in the memory 180. When it is so judged at the step S135 that both the block for one frame and the optimum corrected data are not yet stored in the memory 180, the next block is read out from the block making unit 177, and also the optimum corrected data corresponding to this read block is read from the latch unit 176. Then, processing returns to step S133, where the processing operations defined after step S133 are repeated.

On the other hand, when it is judged at step S135 that the block for one frame and the optimum corrected data have been stored in the memory 180, processing proceeds at step S136, where a check is performed as to whether the processing for all of the learning images has been completed. If it is judged that the processing operations for all of the learning images have not yet been completed, processing returns to step S131, and the steps thereafter are repeated for the next learning image data.

On the other hand, when it is judged at step S136 that the process operations for all of the learning images data has been completed, processing is advanced to step S137, where the calculating unit 181 reads both the optimum corrected data and the block stored in the memory 180 for every class, and then establishes the normal equation shown in the formula (7) based on these data and block. Furthermore, at step S138, the calculating unit 181 solves this normal equation to calculate the mapping coefficients capable of minimizing the error for every class. At step S139, the calculated mapping coefficients are supplied to the memory 182 for storage therein. Then, processing ends.

If the function "f" is expressed by the linear equation, the mapping coefficients stored in the memory 182 in the above-described manner are stored into the mapping coefficient memory 114 of FIG. 25, and the optimum corrected data can be obtained by using these mapping coefficients.

However, in some cases, a sufficient number of normal equations capable of obtaining the mapping coefficients cannot be obtained. In these cases, in the calculating unit 116 of FIG. 25, mapping coefficients are set as a default value, namely $k_1$ to $k_9 = \frac{1}{9}$, from which for example, an average value of the 9 pixels for the block of 3×3 pixels outputted from the block making unit 111 is output.

The structure of a receiving apparatus for each of fourth and fifth embodiments is similar to the structure of FIG. 18. Also, each structure of predicting units for a second and third hierarchy is similar to the structure of FIG. 23 and FIG. 46. However, predictive coefficients for each class stored in predictive coefficients ROM corresponds to (is the same as) the predictive coefficients used in the mapping coefficients learning device.

Figure 31A:
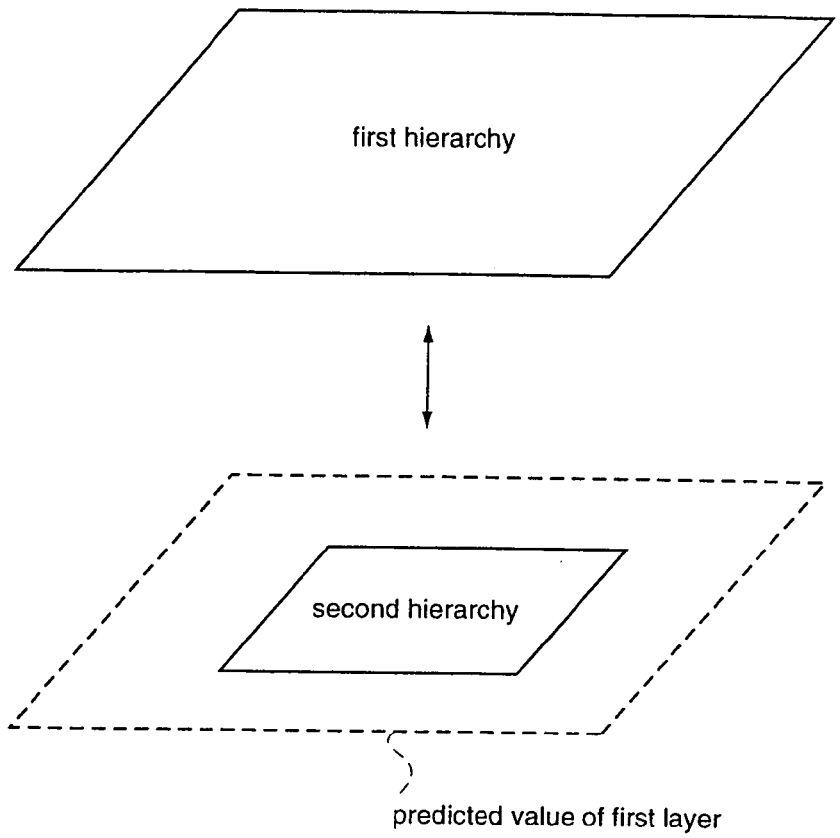
FIGS. 31A and 31B are diagrams for explaining a method for decoding a first hierarchy according to the present invention.
Figure 31B:
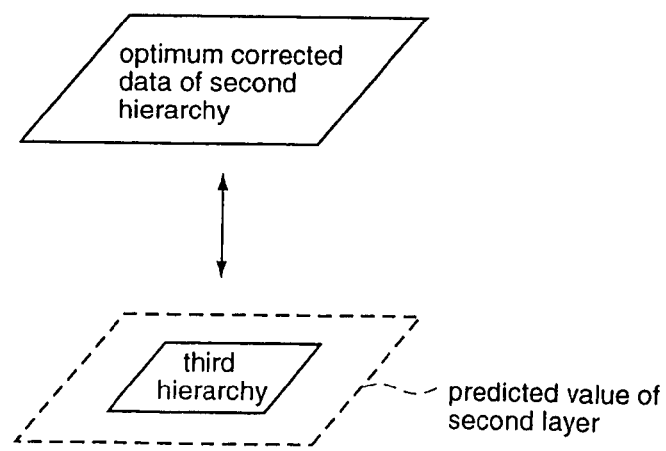
Figure 32:
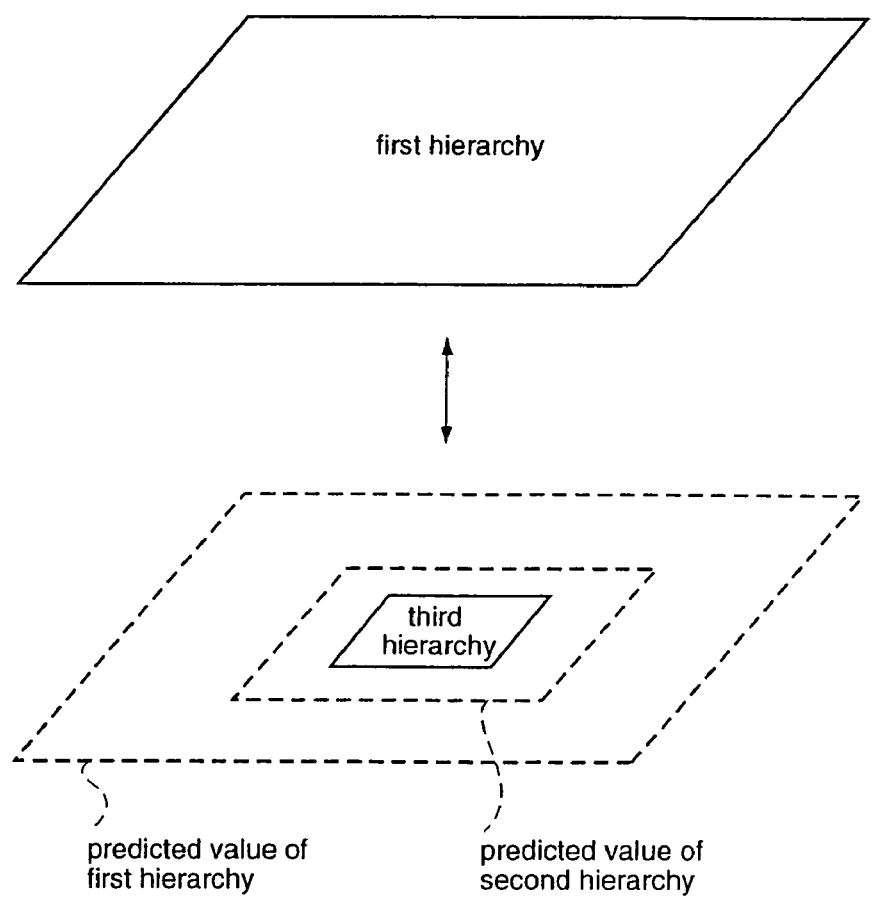
FIG. 32 is a diagram for explaining a method for decoding a second hierarchy according to the present invention.

In the case of FIG. 2, first, as illustrated in FIG. 31A, the following optimum corrected data is calculated in the optimum corrected data calculating unit 13. This corrected data is produced by correcting the image data of the second hierarchy, capable of obtaining the predicted value of the first hierarchy in which the error (error information) from the image data of the first hierarchy is made to be smaller than a preselected threshold value "$\epsilon$". Thereafter, as shown in FIG. 31B, the following optimum corrected data is calculated in the optimum corrected data calculating unit 14. This corrected data is produced by correcting the image data of the third hierarchy, capable of obtaining the predicted value of the second hierarchy in which the error (error information) from the optimum corrected data of the second hierarchy is made to be smaller than a preselected threshold value "$\epsilon$". For example, as shown in FIG. 32, alternatively, the optimum correction data of the third hierarchy corresponding to the lower most hierarchy may be obtained.

That is to say, the predicted value of the second hierarchy is calculated from the corrected data produced by correcting the image data of the third hierarchy. Furthermore, the predicted value of the first hierarchy is calculated by directly using the calculated predicted value of the second hierarchy. Then, such a corrected data that the predicted error (error information) of this prediction value of the first hierarchy is made smaller than a predetermined threshold value "$\epsilon$" is used as the optimum corrected data of the third hierarchy.

Figure 33:
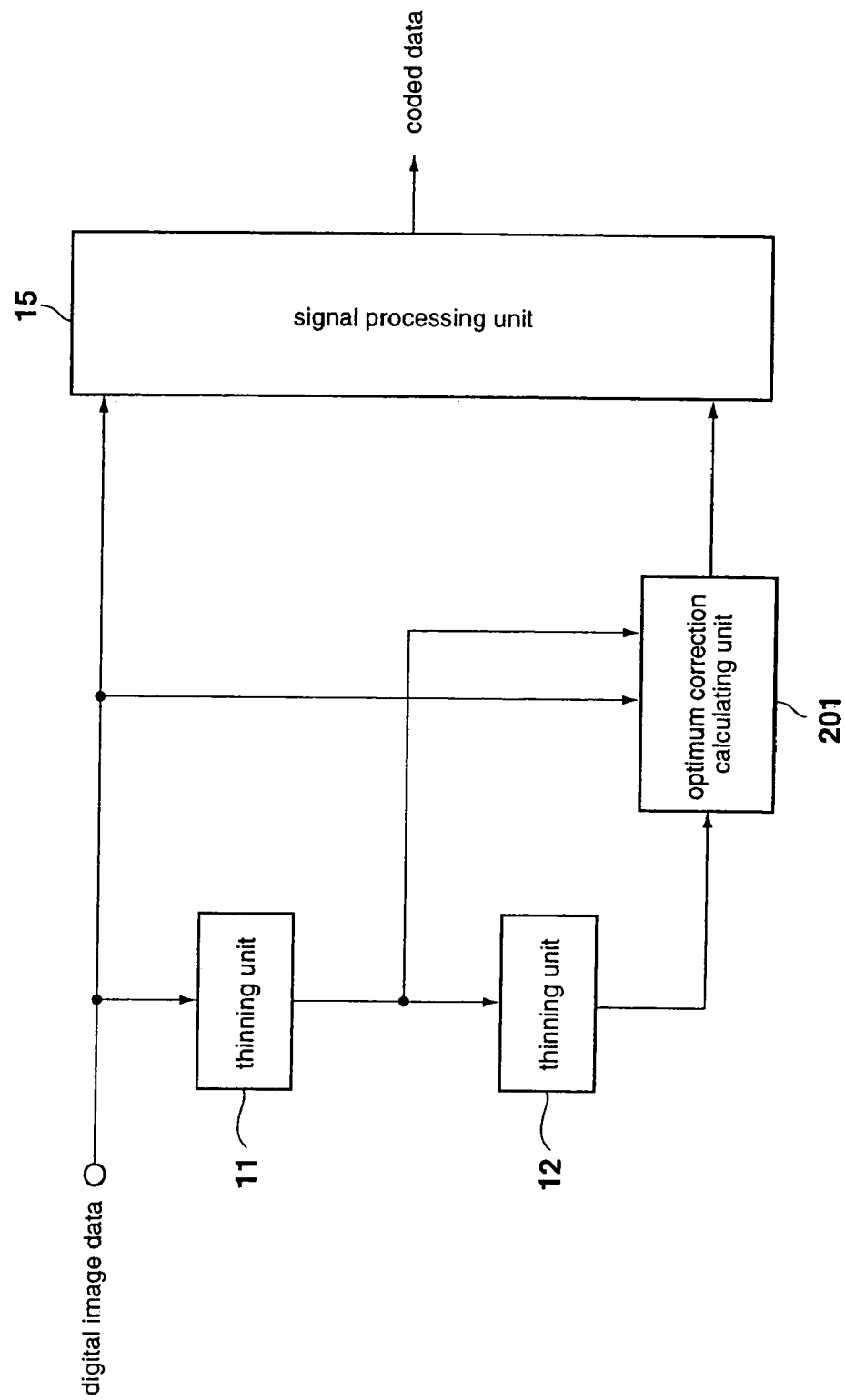
FIG. 33 is a diagram for showing an arrangement of the transmitter apparatus 1 of FIG. 1, according to a third embodiment.

FIG. 33 illustrates a sixth embodiment of the transmitting apparatus 1 capable of obtaining the optimum corrected data of the third hierarchy in the above-described manner. It should be noted that the same reference numerals shown in FIG. 2 are employed to denote corresponding portions of FIG. 33.

In the FIG. 33 embodiment, the image data of the first to third hierarchies are supplied to an optimum corrected calculating unit 201. In the calculating unit 201, a predicted value of a second hierarchy is calculated from the corrected data obtained by correcting the image data of the third hierarchy. Furthermore, a predicted value of a first hierarchy is calculated by directly using the calculated predicted value of the second hierarchy. Then, when corrected data is obtained such that the prediction error (error information) of the predicted value of the first hierarchy is made to be smaller than a predetermined threshold value "$\epsilon$", the optimum corrected data calculating unit 201 outputs, to the signal processing unit 15, this calculated corrected data as the optimum corrected data of the third hierarchy and the coded data of the third hierarchy.

In the embodiment of FIG. 33, the image data of the first hierarchy is directly supplied as the coded data of the first hierarchy to the signal processing unit 15. However, the image data of the second hierarchy is not provided to the signal processing unit. In an enhanced embodiment, the image data of the second embodiment may be provided thereto as the coded data of the second hierarchy.

Figure 34:
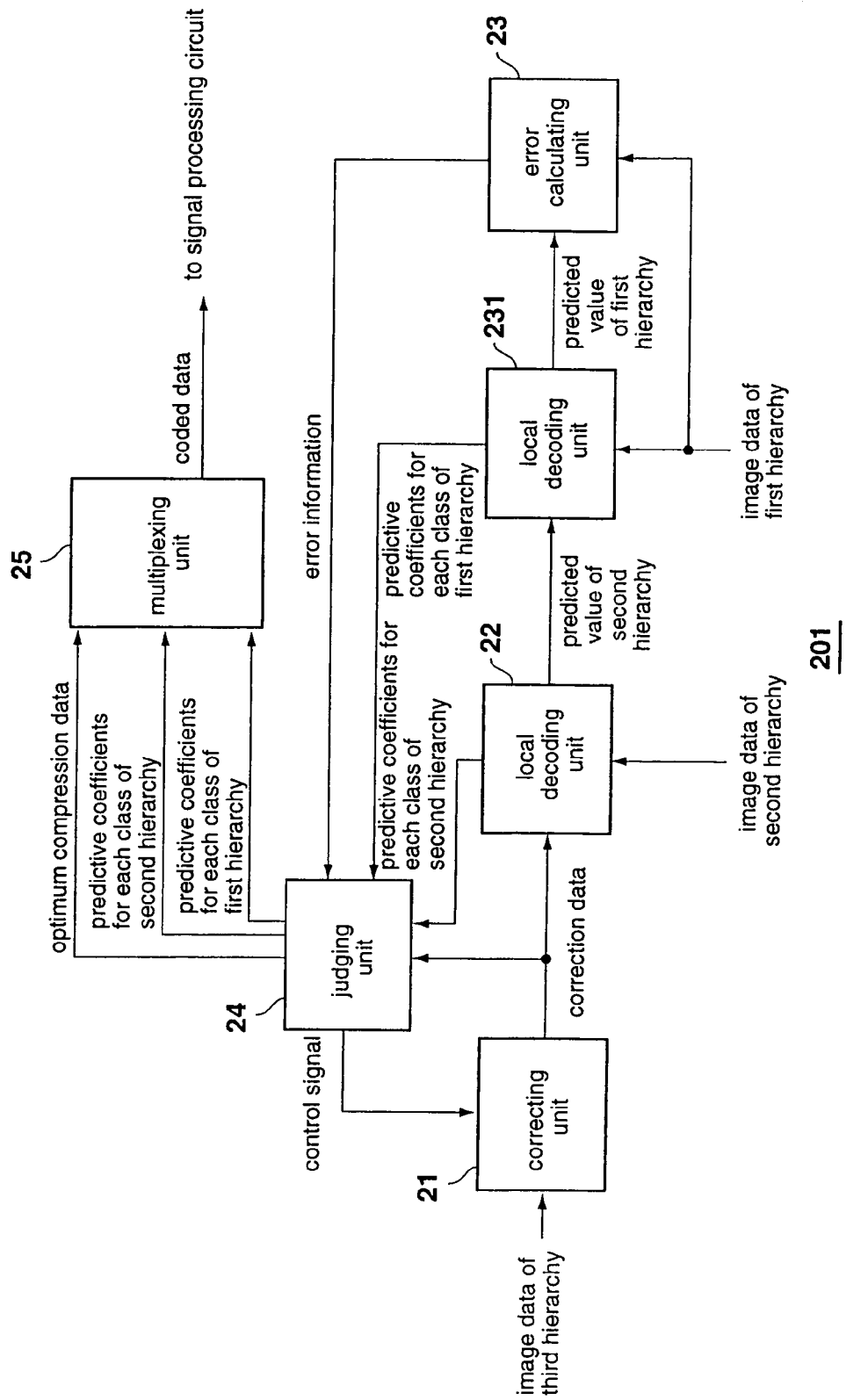
FIG. 34 is a block diagram for showing a structural example of the optimum corrected data calculating unit 201 of FIG. 33.

Next, FIG. 34 shows an example embodiment of the optimum corrected data calculating unit 201 of FIG. 33. The same reference numerals shown in FIG. 5 are employed in FIG. 33 to denote corresponding portions of FIG. 33. Furthermore, the optimum corrected data calculating unit 201 is similar to the optimum corrected data calculating unit 13 of FIG. 5, except that the local decoding unit 231 is somewhat different from the local decoding unit 22 of FIG. 5.

In the FIG. 33 embodiment, image data of the third hierarchy is input to the correcting unit 21, and corrected data obtained by correcting this image data of the third hierarchy is output. Both the corrected data output from the correcting unit 21, and the image data of the second hierarchy, are provided to the local decoding unit 22. In this decoding unit 22, the predicted value of the second hierarchy is calculated to be outputted. In addition, the predicted value of the second hierarchy outputted from the local decoding unit 22, and also the image data of the first hierarchy are inputted into the local decoding unit 231, in which the prediction value of the first hierarchy is calculated to be derived.

In accordance with this embodiment, the predicted values are calculated by the "sequential method", previously described, in the local decoding units 22 and 231. Alternatively, the predicted values may be calculated by the "ROM method" (FIG. 21), previously described, in the local decoding units 22 and 231.

Figure 35:
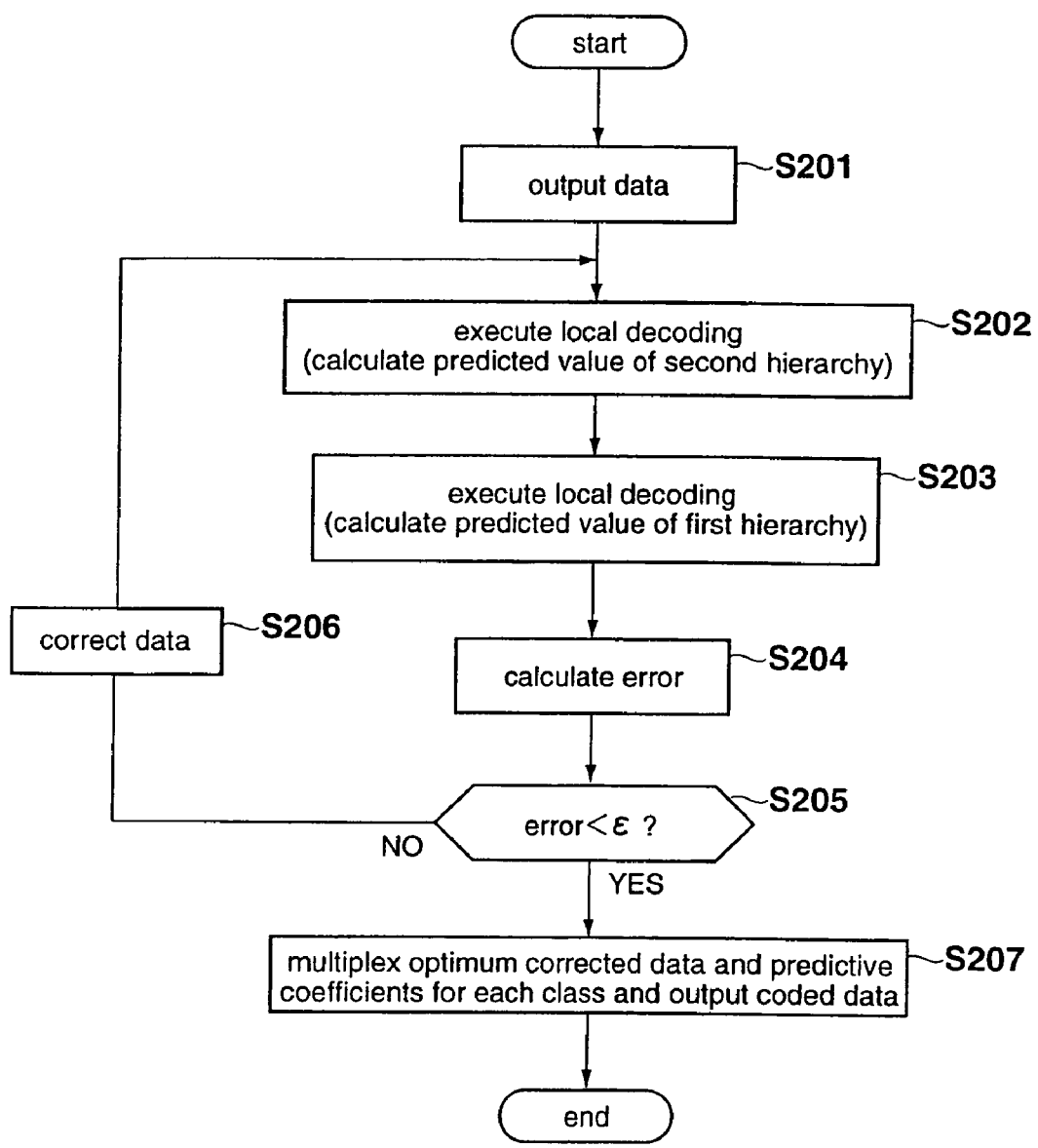
FIG. 35 is a flow chart for describing operations of the optimum corrected data calculating unit 201 of FIG. 34.
Figure 36:
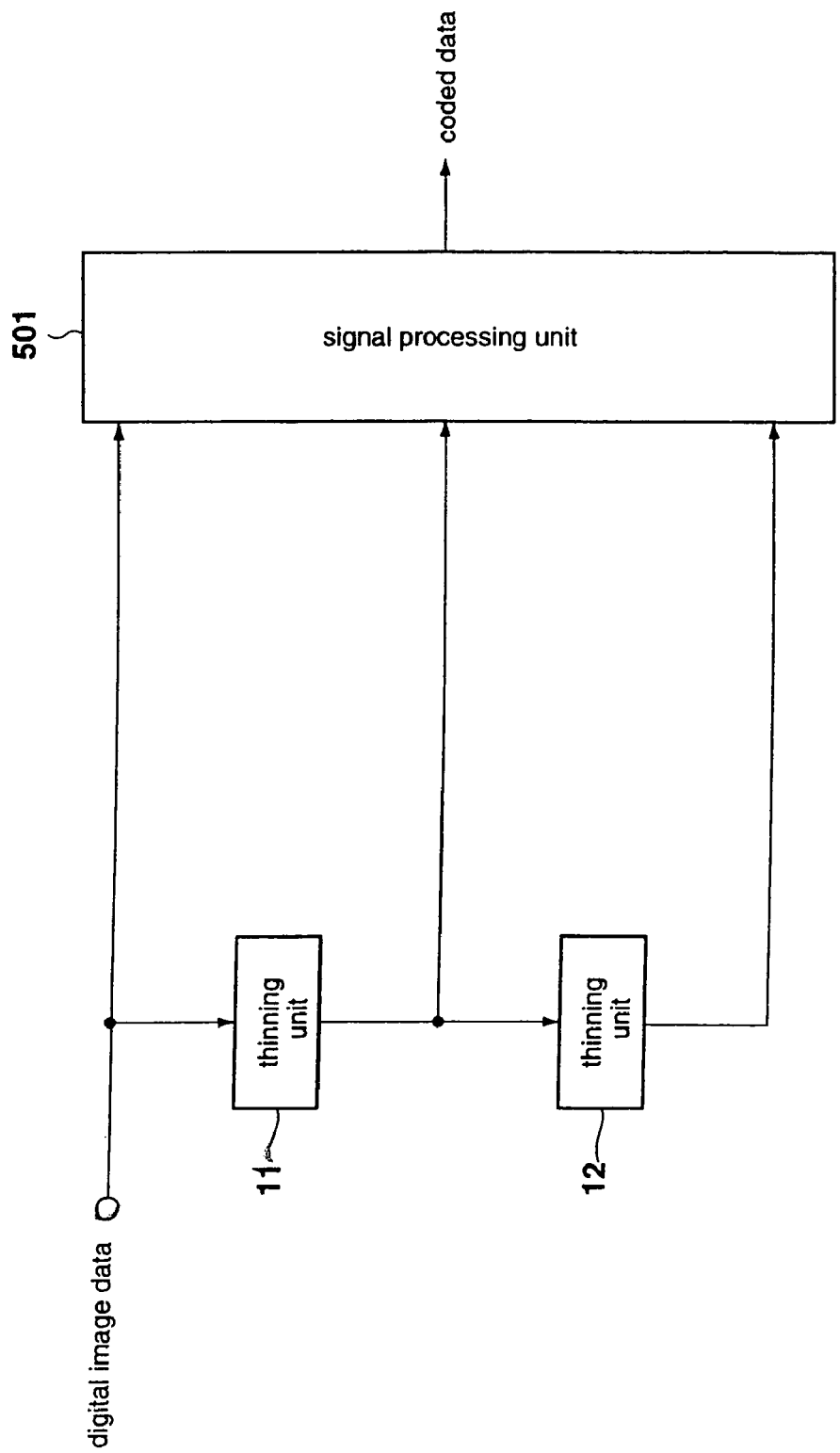
FIG. 36 is a block diagram for showing one structural example of the conventional image coding apparatus for performing the hierarchical coding operation.
Figure 37:
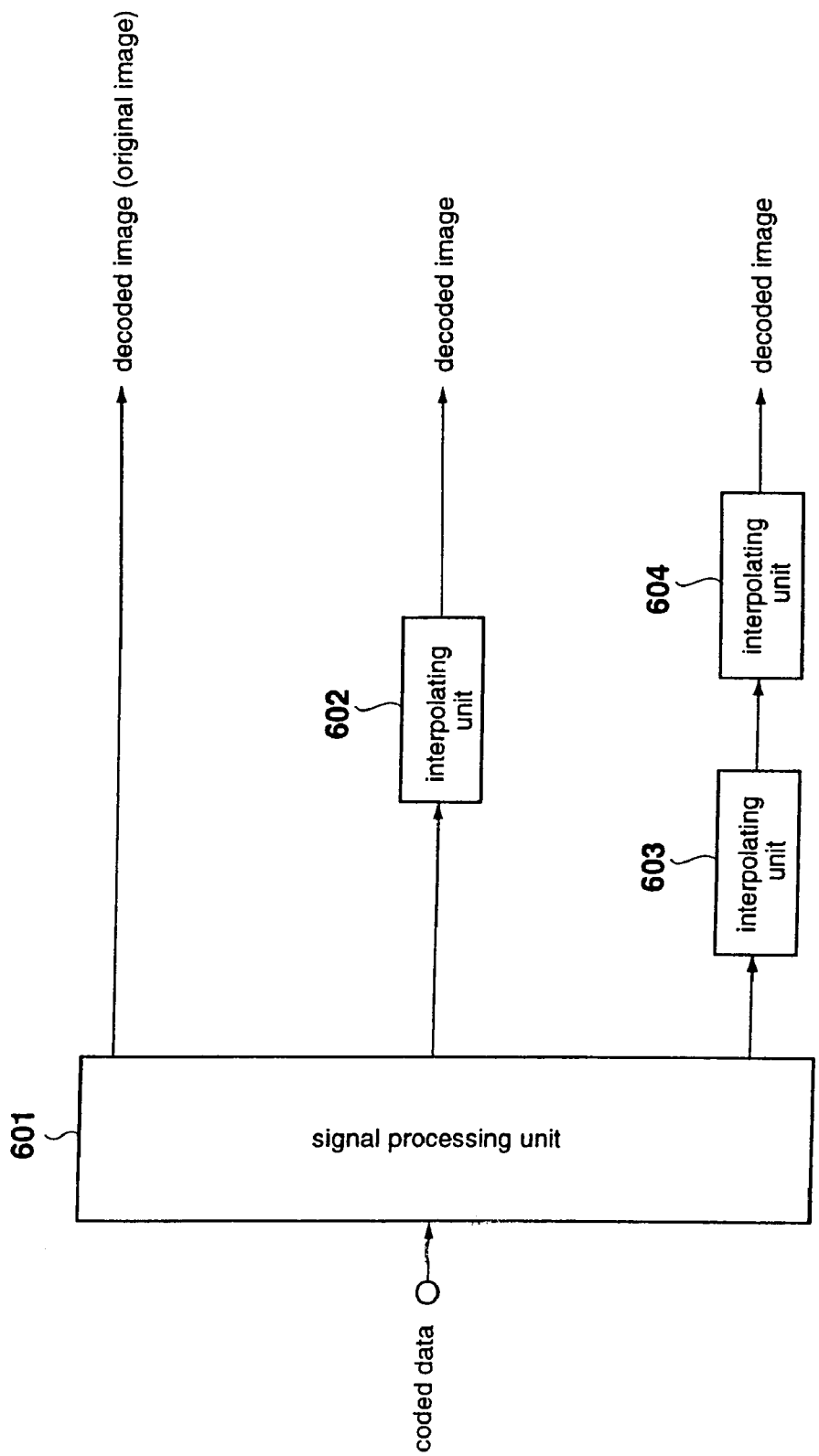
FIG. 37 is a block diagram for showing one structural example of the conventional image decoding apparatus for performing the hierarchical decoding operation.

The processing of the optimum corrected data calculating unit of FIG. 34 is described with reference to the flow chart FIG. 35.

When the image data of the third hierarchy is supplied to the correcting unit 21, at step S201, the correcting unit 21 does not first execute the correcting operation. Rather, the correcting unit 21 first directly outputs the image of the third hierarchy to the local decoding unit 22 and to the judging unit 24. At step S202, in the local decoding unit 22, the corrected data (as explained above, image data of third hierarchy itself is outputted when the process first starts) output from the correcting unit 21 is local-decoded.

In other words, in a manner similar to the processing of FIG. 9, at step S202, the prediction coefficients of each class of the second hierarchy is calculated. Furthermore, based on this prediction coefficients, the predicted value of the second hierarchy is calculated and supplied to the local decoding unit 231.

In the local decoding unit 231, at step S203, the predicted value of the second hierarchy from the local decoding unit 22 is local-decoded.

That is, similar to the processing in the local decoding unit 22, at step S203, the prediction coefficients of each class of the first hierarchy is calculated, and further, the predicted value of the first hierarchy is calculated based on this prediction coefficients and then supplied to the error calculating unit 23.

Subsequently, the processing at steps S204 to S207 is similar to the processing of steps S3 to S6 of the FIG. 6 flowchart. As a consequence, it is possible to obtain the optimum corrected data of the third hierarchy capable of reducing the predicted value of the first hierarchy lower than the threshold value "ϵ".

As a consequence, even when the optimum corrected data of the third hierarchy obtained in this manner is employed, the decoded image with the high image quality can be obtained.

It should be understood that in the embodiment shown in FIG. 33, the image data of the second hierarchy is not provided. Alternatively, for instance, the predicted value of the second hierarchy outputted from the local decoding unit 22 may be used as the decoded data of the second hierarchy. Also, for example, the optimum corrected data calculating unit 13 shown in FIG. 2 is employed, and the optimum corrected data of the second hierarchy outputted therefrom may be used as the coded data of the second hierarchy.

Also, in the case of the embodiment of FIG. 33, all of the coded data of the first hierarchy to the third hierarchy need not be included in the coded data derived from the signal processing unit 15. For example, only the coded data of the third hierarchy may be contained.

The coded data output from the transmitting apparatus shown in FIG. 33 may be decoded by the receiving apparatus 4 shown in FIG. 18 and predicting unit shown in FIG. 20.

Figure 47:
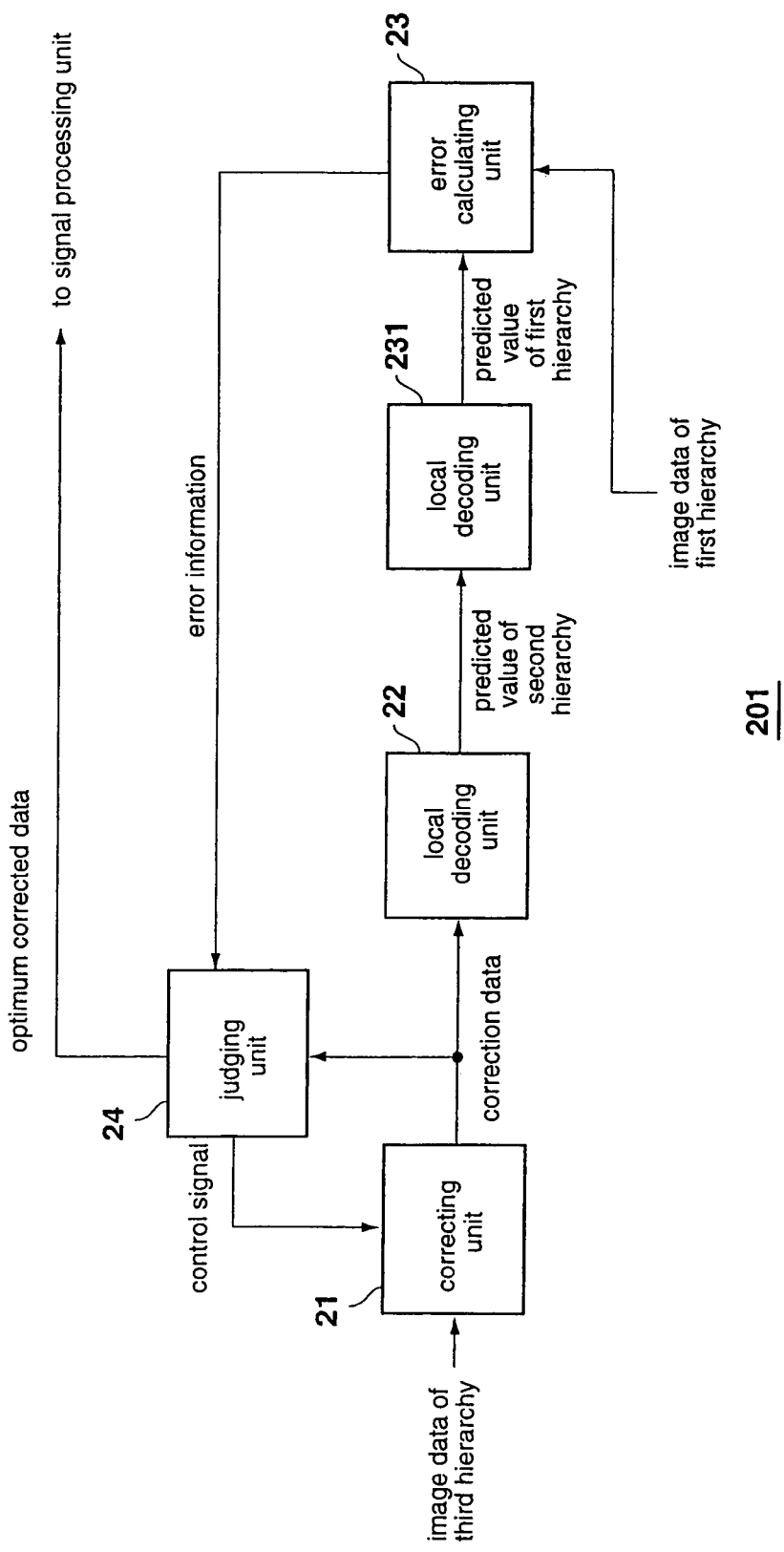
FIG. 47 is a block diagram of an alternate embodiment of an optimum corrected data calculating unit.

In accordance with a seventh embodiment, the optimum correcting data calculating unit 201 of the FIG. 33 transmitting apparatus is as shown in FIG. 47. The FIG. 47 optimum correcting data calculating unit 201 is very similar to FIG. 34 optimum correcting data calculating unit, except that with the FIG. 47 optimum corrected data calculating unit, the local decoding unit 231 does not utilize the image data of the first hierarchy.

Figure 48:
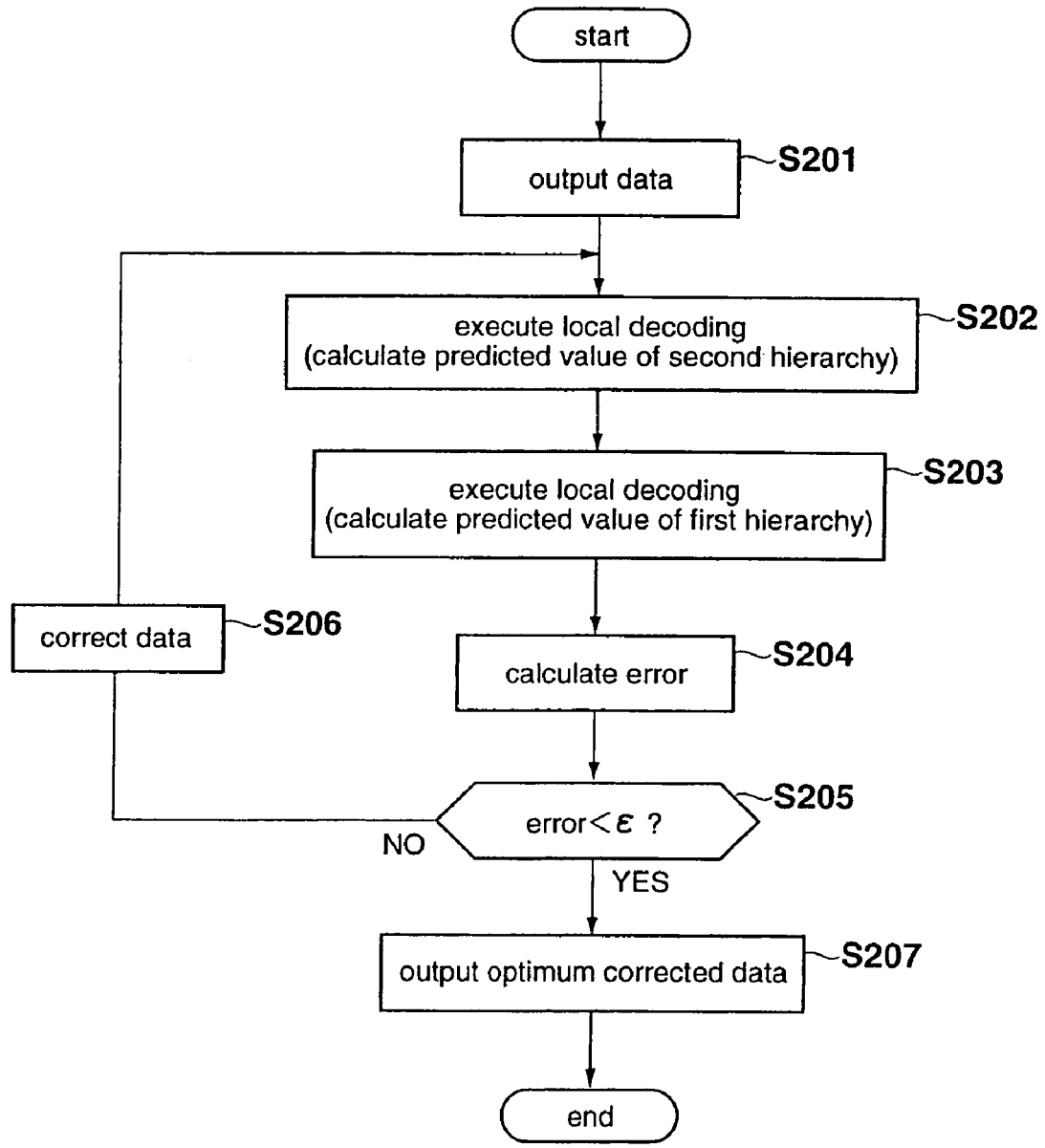
FIG. 48 is a flow chart describing operations of the optimum corrected data calculating unit of FIG. 47.

FIG. 48 is a flowchart that illustrates the operation of the FIG. 47 optimum corrected data calculating unit 201. The flowchart is similar to the FIG. 35 flowchart that illustrates the operation of the FIG. 34 optimum corrected data calculating unit, except that step S207 of the FIG. 48 flowchart is a step for outputting optimum corrected data. (Step S207 of the FIG. 35 flowchart includes multiplexing optimum corrected data and predictive coefficients for each class and outputting coded data.)

It should be noted that embodiments of the invention may be utilized to code and decode many different kinds of image signals, from television signals in standard formats (e.g., NTSC) to high-definition television signals that include a relatively large amount of data. Furthermore, in these embodiments, although each process has been described as being carried out for one frame, each process may be carried out for one field, or for two or more frames.

In addition, while block coding has been described as being carried out on images one frame at a time, the blocks can also be, for example, configured by gathering together pixels of the same position in a plurality of time-sequence frames.

Furthermore, the error information has been described as being the square sum of the error but, for example, the absolute value of the error or the sum of the cube (or higher order) of the error can also be used as error information. Which type of information to use as the error information can be decided based on statistical properties (e.g., the convergence).

Furthermore, although the images are described as being coded in the three hierarchies, the number of hierarchies is not limited to being three.

As to the optimum correction data of the third hierarchy (equal to the lowermost hierarchy), for example, the prediction errors of the prediction values in the respective hierarchies may be calculated, and correction data calculated such that the total error for all or some of the prediction values combined is lower than a preselected value.

What is claimed is:

1. An apparatus for performing a hierarchy coding comprising:
   means for extracting a plurality of pixels of image data of a first hierarchy and generating class information corresponding to characteristics of the extracted plurality of pixels;
   means for storing mapping coefficients for each class; and
   means for reading mapping coefficients corresponding to the class information and predicting image data of a second hierarchy using the image data of the first hierarchy and the read mapping coefficients, the image data of the second hierarchy having a number of pixels which is smaller than that of the image data of the first hierarchy.

2. An apparatus according to claim 1, wherein said predicting means includes:
   means for extracting a plurality of pixels from the image data of the first hierarchy; and
   means for predicting the image data of the second hierarchy where a number of pixels of the image data of the first hierarchy is reduced, based upon the extracted plurality of pixels and the read mapping coefficients.

3. An apparatus according to claim 1, wherein the mapping coefficients for each class are generated using an image data for learning.

4. An apparatus according to claim 1, wherein the mapping coefficients for each class are generated so that a predicted error between predicted data of the image data of the first hierarchy for learning predicted using the image data of the second hierarchy and the image data of the first hierarchy for learning is minimum.

5. An apparatus according to claim 1, wherein the mapping coefficients for each class are generated so that predicted error between predicted data of the image data of the first hierarchy for learning predicted using the image data of the second hierarchy and the image data of the first hierarchy for learning is less than a prescribed threshold value.

6. An apparatus according to claim 1, wherein the mapping for each class is generated by the steps of:
   extracting a plurality of pixels of image data of a first hierarchy for learning and generating class information corresponding to the characteristics of the extracted plurality of pixels;
   predicting image data of the second hierarchy where a number of pixels for the image data of the first hierarchy for learning is reduced using the image data of the first hierarchy for learning and mapping coefficients corresponding to the class information;
   predicting the image data of the first hierarchy for learning in accordance with the image data of the second hierarchy and generating predicted data having a plurality of predicted pixels;
   generating a predicted error of the predicted data of the image of the first hierarchy for learning with respect to the image data of the first hierarchy for learning;
   updating the mapping coefficients in accordance with the predicted error until the mapping coefficients are optimum mapping coefficients; and
   determining the optimum mapping coefficients.

7. An apparatus according to claim 1, wherein the mapping for each class is generated by the steps of:
   forming an image data of the second hierarchy having a number of pixels that is smaller than that of an image data of the first hierarchy for learning;
   correcting the image data of the second hierarchy and generating a corrected data;
   predicting the image data of the first hierarchy for learning in accordance with the corrected data and generating a predicted data of the first hierarchy for learning having a plurality of predicted pixels;
   calculating a predicted error of the predicted data of the first hierarchy for learning with respect to the image data of the first hierarchy;
   determining suitability of the corrected data in accordance with the predicted error;
   repeating the correcting step until the corrected data is an optimum corrected data; and
   generating optimum mapping coefficients for each class using the image data of the first hierarchy for learning and the optimum corrected data.

8. An apparatus for decoding a coded data hierarchical coding an image data comprising:
   means for receiving the coded data including at least image data of a second hierarchy, the image data of the second hierarchy having a number of pixels which is smaller than that of an image data of the first hierarchy; and
   means for decoding the image data of a first hierarchy from image data of the second hierarchy, said coded data generated by the steps of:
   extracting a plurality of pixels of an image data of a first hierarchy and generating class information corresponding to characteristics of the extracted plurality of pixels; and
   reading mapping coefficients corresponding to the class information from a memory in which mapping coefficients for each class are stored and predicting an image data of the second hierarchy using the image data of the second hierarchy having a number of pixels which is smaller than that of the image data of the first hierarchy.

9. An apparatus according to claim 8, wherein said decoding means includes:
   memory for storing predicted coefficients for each class used to generate the mapping coefficients for each class;
   means for extracting a plurality of pixels of the image data of the second hierarchy and generating class information corresponding to the extracted plurality of pixels; and
   means for reading predicted coefficients corresponding to the class information and predicting a decoded image data of a first hierarchy using the image data of the second hierarchy and the read predicted coefficients.

10. An apparatus according to claim 9, wherein the predicted coefficients for each class are generated using an image data for learning.

11. An apparatus according to claim 8, wherein the mapping coefficients for each class are generated using an image data for learning.

12. An apparatus according to claim 8, wherein the mapping coefficients for each class are generated so that predicted error between predicted data of the image data of the first hierarchy for learning is predicted using the image data of the second hierarchy and the image data of the first hierarchy for learning is minimum.

13. An apparatus according to claim 8, wherein the mapping coefficients for each class are generated so that predicted error between predicted data of the image data of the first hierarchy for learning is predicted using image data of the second hierarchy and the image data of the first hierarchy for learning is less than prescribed threshold values.

14. A method of performing a hierarchy coding comprising:
   extracting a plurality of pixels of image data of a first hierarchy and generating class information corresponding to characteristics of the extracted plurality of pixels;
   storing mapping coefficients for each class; and
   reading mapping coefficients corresponding to the class information and predicting image data of a second hierarchy using the image data of the first hierarchy and the read mapping coefficients, the image data of the second hierarchy having a number of pixels which is smaller than that of the image data of the first hierarchy.

15. A method according to claim 14, wherein said predicting step includes:
   extracting a plurality of pixels from the image data of the first hierarchy; and
   predicting the image data of the second hierarchy where a number of pixels of the image data of the first hierarchy is reduced, based upon the extracted plurality of pixels and the read mapping coefficients.

16. A method according to claim 14, wherein the mapping coefficients for each class are generated using an image data for learning.

17. A method according to claim 14, wherein the mapping coefficients for each class are generated so that a predicted error between predicted data of the image data of the first hierarchy for learning predicted using the image data of the second hierarchy and the image data of the first hierarchy for learning is minimum.

18. A method according to claim 14, wherein the mapping coefficients for each class are generated so that predicted error between predicted data of the image data of the first hierarchy for learning predicted using the image data of the second hierarchy and the image data of the first hierarchy for learning is less than a prescribed threshold value.

19. A method according to claim 14, wherein the mapping for each class is generated by the steps of:
   extracting a plurality of pixels of image data of a first hierarchy for learning and generating class information corresponding to the characteristics of the extracted plurality of pixels;
   predicting image data of the second hierarchy where a number of pixels for the image data of the first hierarchy is greater than a number of pixels for the image data of the second hierarchy using the image data of the first hierarchy and mapping coefficients corresponding to the class information;
   predicting the image data of the first hierarchy in accordance with the image data of the second hierarchy and generating predicted data having a plurality of predicted pixels;
   generating a predicted error of the predicted data of the image of the first hierarchy with respect to the image data of the first hierarchy;
   updating the mapping coefficients in accordance with the predicted error until the mapping coefficients are optimum mapping coefficients; and
   determining the optimum mapping coefficients.

20. A method according to claim 14, wherein the mapping for each class is generated by the steps of:
   forming image data of the second hierarchy having a number of pixels that is smaller than that of image data of the first hierarchy;
   correcting the image data of the second hierarchy and generating corrected data;
   predicting the image data of the first hierarchy in accordance with the corrected data and generating predicted data of the first hierarchy having a plurality of predicted pixels;
   calculating a predicted error of the predicted data of the first hierarchy with respect to the image data of the first hierarchy;
   determining suitability of the corrected data in accordance with the predicted error;
   repeating the correcting step until the corrected data is optimum; and
   generating optimum mapping coefficients for each class using the image data of the first hierarchy and the optimum corrected data.

21. A method of decoding a coded data hierarchical coding an image data comprising: receiving the coded data including at least image data of a second hierarchy, the image data of the second hierarchy having a number of pixels which is smaller than that of an image data of a first hierarchy; and
   decoding the image data of the first hierarchy from image data of the second hierarchy, said coded data generated by the steps of:
   extracting a plurality of pixels of an image data of a first hierarchy and generating class information corresponding to characteristics of the extracted plurality of pixels; and
   reading mapping coefficients corresponding to the class information from a memory in which mapping coefficients for each class are stored and predicting an image data of the second hierarchy using the image data of the second hierarchy having a number of pixels which is smaller than that of the image data of the first hierarchy.

22. A method according to claim 21, wherein said decoding step includes:
   extracting a plurality of pixels of the image data of the second hierarchy and generating class information corresponding to the extracted plurality of pixels; and
   reading from a memory predicted coefficients corresponding to the class information and predicting a decoded image data of a first hierarchy using the image data of the second hierarchy and the read predicted coefficients.

23. A method according to claim 22, wherein the predicted coefficients for each class are generated using an image data for learning.

24. A method according to claim 21, wherein the mapping coefficients for each class are generated using an image data for learning.

25. A method according to claim 21, wherein the mapping coefficients for each class are generated so that predicted error between predicted data of the image data of the first hierarchy for learning predicted using the image data of the second hierarchy and the image data of the first hierarchy for learning is minimum.

26. A method according to claim 21, wherein the mapping coefficients for each class are generated so that predicted error between predicted data of the image data of the first hierarchy for learning predicted using image data of the second hierarchy and the image data of the first hierarchy for learning is less than prescribed threshold values.

27. A method of transmitting hierarchically coded image data, the method comprising:

receiving the hierarchically coded image data, and transmitting the hierarchically coded image data, wherein the hierarchically coded image data has been formed by steps of:

extracting a plurality of pixels of image data of a first hierarchy and generating class information corresponding to characteristics of the extracted plurality of pixels;

storing mapping coefficients for each class; and reading mapping coefficients corresponding to the class information and predicting image data of a second hierarchy using the image data of the first hierarchy and the read mapping coefficients, the image data of the second hierarchy having a number of pixels which is smaller than that of the image data of the first hierarchy.

28. The method according to claim 27, wherein said predicting step includes:

extracting a plurality of pixels from the image data of the first hierarchy; and predicting the image data of the second hierarchy where a number of pixels of the image data of the first hierarchy is reduced, based upon the extracted plurality of pixels and the read mapping coefficients.

29. The method according to claim 27, wherein the mapping coefficients for each class are generated using an image data for learning.

30. The method according to claim 27, wherein the mapping coefficients for each class are generated so that a predicted error between predicted data of the image data of the first hierarchy for learning predicted using the image data of the second hierarchy and the image data of the first hierarchy for learning is minimum.

31. The method according to claim 27, wherein the mapping coefficients for each class are generated so that predicted error between predicted data of the image data of the first hierarchy for learning predicted using the image data of the second hierarchy and the image data of the first hierarchy for learning is less than a prescribed threshold value.

32. The method according to claim 27, wherein the mapping for each class is generated by the steps of:

extracting a plurality of pixels of image data of a first hierarchy for learning and generating class information corresponding to the characteristics of the extracted plurality of pixels;

predicting image data of the second hierarchy where a number of pixels for the image data of the first hierarchy for learning is greater than a number of pixels for the image data of the second hierarchy using the image data of the first hierarchy for learning and mapping coefficients corresponding to the class information;

predicting the image data of the first hierarchy for learning in accordance with the coded image data and generating predicted data having a plurality of predicted pixels;

generating a predicted error of the predicted data of the image of the first hierarchy for learning with respect to the image data of the first hierarchy for learning;

updating the mapping coefficients in accordance with the predicted error until the mapping coefficients are optimum mapping coefficients; and determining the optimum mapping coefficients.

33. The method according to claim 27, wherein the mapping for each class is generated by the steps of:

forming an image data of the second hierarchy having a number of pixels that is smaller than that of an image data of the first hierarchy for learning;

correcting the image data of the second hierarchy and generating a corrected data;

predicting the image data of the first hierarchy for learning in accordance with the corrected data and generating a predicted data of the first hierarchy for learning having a plurality of predicted pixels;

calculating a predicted error of the predicted data of the first hierarchy for learning with respect to the image data of the first hierarchy;

determining suitability of the corrected data in accordance with the predicted error;

repeating the correcting step until the corrected data is an optimum corrected data; and generating optimum mapping coefficients for each class using the image data of the first hierarchy for learning and the optimum corrected data.

34. An article of manufacture having recorded thereon hierarchically coded image data, the hierarchically coded image data formed by the steps of: extracting a plurality of pixels of image data of a first hierarchy and generating class information corresponding to characteristics of the extracted plurality of pixels; storing mapping coefficients for each class; and reading mapping coefficients corresponding to the class information and predicting image data of a second hierarchy using the image data of the first hierarchy and the read mapping coefficients, the image data of the second hierarchy having a number of pixels which is smaller than that of the image data of the first hierarchy.

35. The article of manufacture according to claim 34, wherein said predicting step includes:

extracting a plurality of pixels from the image data of the first hierarchy; and predicting the image data of the second hierarchy where a number of pixels of the image data of the first hierarchy is reduced, based upon the extracted, plurality of pixels and the read mapping coefficients.

36. The article of manufacture according to claim 34, wherein the mapping coefficients for each class are generated using an image data for learning.

37. The article of manufacture according to claim 34, wherein the mapping coefficients for each class are generated so that a predicted error between predicted data of the image data of the first hierarchy for learning predicted using the image data of the second hierarchy and the image data of the first hierarchy for learning is minimum.

38. The article of manufacture according to claim 34, wherein the mapping coefficients for each class are generated so that predicted error between predicted data of the image data of the first hierarchy for learning predicted using the image data of the second hierarchy and the image data of the first hierarchy for learning is less than a prescribed threshold value.

39. The article of manufacture according to claim 34, wherein the mapping for each class is generated by the steps of:

extracting a plurality of pixels of image data of a first hierarchy for learning and generating class information corresponding to the characteristics of the extracted plurality of pixels;

predicting image data of the second hierarchy where a number of pixels for the image data of the first hierarchy for learning is greater than a number of pixels for the image data of the second hierarchy using the image data of the first hierarchy for learning and mapping coefficients corresponding to the class information;

predicting the image data of the first hierarchy for learning in accordance with the coded image data and generating predicted data having a plurality of predicted pixels;

generating a predicted error of the predicted data of the image of the first hierarchy for learning with respect to the image data of the first hierarchy for learning;

updating the mapping coefficients in accordance with the predicted error until the mapping coefficients are optimum mapping coefficients; and determining the optimum mapping coefficients.

40. The article of manufacture according to claim 34, wherein the mapping for each class is generated by the steps of:

forming an image data of the second hierarchy having a number of pixels that is smaller than that of an image data of the first hierarchy for learning;

correcting the image data of the second hierarchy and generating a corrected data;

predicting the image data of the first hierarchy for learning in accordance with the corrected data and generating a predicted data of the first hierarchy for learning having a plurality of predicted pixels;

calculating a predicted error of the predicted image data of the first hierarchy for learning with respect to the image data of the first hierarchy;

determining suitability of the corrected data in accordance with the predicted error;

repeating the correcting operation until the corrected data is an optimum corrected data; and generating optimum mapping coefficients for each class using the image data of the first hierarchy for learning and the optimum corrected data.

41. An apparatus for performing a hierarchical coding, comprising:

means for forming an image data of a second hierarchy having a number of pixels which is smaller than that of an image data of a first hierarchy;

means for correcting the image data of the second hierarchy and generating a corrected data;

means for predicting the image data of the first hierarchy in accordance with the corrected data and generating a predicted data of the first hierarchy having a plurality of predicted pixels;

means for calculating predictive error of the predicted data of the first hierarchy with respect to the image data of the first hierarchy;

means for determining suitability of the corrected data in accordance with the predicted error; and means for outputting the corrected data as the image data of the second hierarchy in accordance with the determined result.

42. An apparatus for performing a hierarchical coding comprising:

means for forming an image data of a second hierarchy having a number of pixels which is smaller than that of an image data of a first hierarchy;

means for forming an image data of a third hierarchy having a number of pixels which is smaller than that of an image data of the second hierarchy;

means for correcting the image data of the third hierarchy and generating a corrected data of the third hierarchy;

first predicting means for generating a prediction value of the second hierarchy, having a plurality of pixels, in accordance-with the corrected data of the third hierarchy;

second predicting means for generating a prediction value of the first hierarchy, having a plurality of pixels, in accordance with the prediction value of the second hierarchy;

error generating means for generating a predicted error of the prediction value of the first hierarchy with respect to the image data of the first hierarchy;

means for determining suitability of the corrected data of the third hierarchy in accordance with the predicted error; and means for outputting the corrected data as the image data of the third hierarchy in accordance with the determined result.

43. A method of performing a hierarchical coding, comprising:

forming an image data of a second hierarchy having a number of pixels which is smaller than that of an image data of a first hierarchy;

correcting the image data of the second hierarchy and generating a corrected data;

predicting the image data of the first hierarchy in accordance with the corrected data and generating a predicted data of the first hierarchy having a plurality of predicted pixels;

calculating a predicted error of the predicted data of the first hierarchy with respect to the image data of the first hierarchy;

determining suitability of the corrected data in accordance with the predicted error; and outputting the corrected data as the image data of the second hierarchy in accordance with the determined result.

44. A method of decoding data represented by a hierarchical coding of an image, comprising:

receiving the coded data including at least image data of a second hierarchy having a number of pixels which is smaller than that of an image data of a first hierarchy;

decoding the image data of the first hierarchy from image data of the second hierarchy by steps of:

forming the image data of the second hierarchy and generating a corrected data;

predicting the image data of the first hierarchy in accordance with the corrected data and generating a predicted data of the first hierarchy having a plurality of predicted pixels;

calculating a predicted error of the predicted data of the first hierarchy with respect to the image data of the first hierarchy;

determining suitability of the corrected data in accordance with the predicted error;

repeating the step of generating corrected data as necessary until the corrected data becomes an optimum corrected data; and outputting the optimum corrected data as the image data of the second hierarchy.

45. A method of performing a hierarchical coding, comprising:

forming an image data of a second hierarchy having a number of pixels which is smaller than that of an image data of a first hierarchy;

forming an image data of a third hierarchy having a number of pixels which is smaller than that of an image data of the second hierarchy;

correcting the image data of the third hierarchy and generating a corrected data of the third hierarchy;

first predicting step for generating predicted data of the second hierarchy, having a plurality of pixels, in accordance with the corrected data of the third hierarchy;

second predicting step for generating a prediction value of the first hierarchy, having a plurality of pixels, in accordance with the prediction value of the second hierarchy;

error generating step for generating a predicted error of the prediction value of the first hierarchy with respect to the image data of the first hierarchy;

determining suitability of the corrected data of the third hierarchy in accordance with the predicted error; and outputting the corrected data as the image data of the third hierarchy in accordance with the determined result.

\* \* \* \* \*